United States Patent
Maas et al.

(10) Patent No.: US 10,894,340 B2
(45) Date of Patent: Jan. 19, 2021

(54) PREFORMS FOR FLAIR APPLICATIONS

(75) Inventors: Wilhelmus Johannes Joseph Maas, Someren (NL); Petrus Lambertus Wilhelmus Hurkmans, Someren (NL); Aaron S. Haleva, Oakhurst, NJ (US)

(73) Assignee: Dispensing Technologies B.V., Helmond (NL)

(*) Notice: Subject to any disclaimer, the term of this patent is extended or adjusted under 35 U.S.C. 154(b) by 0 days.

(21) Appl. No.: 13/330,632

(22) Filed: Dec. 19, 2011

(65) Prior Publication Data

US 2012/0187067 A1 Jul. 26, 2012

Related U.S. Application Data

(60) Provisional application No. 61/459,712, filed on Dec. 17, 2010.

(51) Int. Cl.
*B32B 1/02* (2006.01)
*B29B 11/14* (2006.01)
(Continued)

(52) U.S. Cl.
CPC .......... *B29B 11/14* (2013.01); *B29C 49/06* (2013.01); *B65D 1/0246* (2013.01);
(Continued)

(58) Field of Classification Search
CPC .......... B29B 11/14; B29B 2911/1402; B29B 2911/14093; B29B 2911/14113; B29B 2911/14486; B29B 2911/14273; B29B 2911/1442; B29B 2911/1412; B29B 2911/1446; B29B 2911/14326; B29B 2911/14333; B65D 41/065; B65D 49/02; B65D 77/06; B65D 83/0055;
(Continued)

(56) References Cited

U.S. PATENT DOCUMENTS 5,894,041 A * 4/1999 Cornell .................. 428/35.7
6,467,653 B1 * 10/2002 Hamamoto ............ A45D 19/02
222/105

(Continued)

FOREIGN PATENT DOCUMENTS

JP 2002-361717 * 12/2002 .......... B29C 49/22
WO WO 2009041809 A1 * 4/2009 ........ B65D 83/0055

OTHER PUBLICATIONS

Machine Translation of JP 2002-361717 (Dec. 2002).*

*Primary Examiner* — Gerard Higgins
*Assistant Examiner* — Kevin C Ortman, Jr.
(74) *Attorney, Agent, or Firm* — Patterson + Sheridan, LLP

(57) ABSTRACT

A preform can be made from two different materials that do not bond together by a bi-injection process, using the same mold. First an outer preform can be fashioned, then an inner preform molded through a center hole in the bottom of the outer preform, and the preforms connected. Inner/outer preform materials can be different, e.g., PET/polyolefin or polyamide, or same, e.g., PET/PET. To prevent mutual bonding during molding of the second, a non-stick coating can be sprayed on a surface portion of the first preform prior to molding the second. Manufacturing order can be either outer/inner, or inner/outer, and the non-stick coating sprayed on the inside/outside of the preform first molded.

19 Claims, 84 Drawing Sheets

Begin separating the layers via air pressure

(51) Int. Cl.
*B29C 49/06* (2006.01)
*B65D 77/06* (2006.01)
*B65D 1/02* (2006.01)
*B65D 41/04* (2006.01)
*B65D 41/06* (2006.01)
*B65D 83/00* (2006.01)
*B65D 49/02* (2006.01)
*B29K 23/00* (2006.01)
*B29K 67/00* (2006.01)
*B29C 65/00* (2006.01)
*B29L 31/00* (2006.01)
*B29L 9/00* (2006.01)
*B29B 11/04* (2006.01)
*B29L 31/56* (2006.01)
*B29C 49/00* (2006.01)
*B29C 65/60* (2006.01)
*B29C 65/48* (2006.01)
*B29C 65/08* (2006.01)
*B29C 65/06* (2006.01)

(52) U.S. Cl.
CPC ....... *B65D 41/0471* (2013.01); *B65D 41/065* (2013.01); *B65D 49/02* (2013.01); *B65D 77/06* (2013.01); *B65D 83/0055* (2013.01); *B29B 11/04* (2013.01); *B29B 2911/1402* (2013.01); *B29B 2911/143* (2013.01); *B29B 2911/1408* (2013.01); *B29B 2911/1412* (2013.01); *B29B 2911/1414* (2013.01); *B29B 2911/1424* (2013.01); *B29B 2911/1442* (2013.01); *B29B 2911/1446* (2013.01); *B29B 2911/14066* (2013.01); *B29B 2911/14093* (2013.01); *B29B 2911/14113* (2013.01); *B29B 2911/14273* (2013.01); *B29B 2911/14326* (2013.01); *B29B 2911/14333* (2013.01); *B29B 2911/14433* (2013.01); *B29B 2911/14473* (2013.01); *B29B 2911/14486* (2013.01); *B29B 2911/14493* (2013.01); *B29C 65/0672* (2013.01); *B29C 65/08* (2013.01); *B29C 65/48* (2013.01); *B29C 65/606* (2013.01); *B29C 66/1284* (2013.01); *B29C 66/12261* (2013.01); *B29C 66/12861* (2013.01); *B29C 66/1312* (2013.01); *B29C 66/21* (2013.01); *B29C 66/542* (2013.01); *B29C 66/545* (2013.01); *B29C 66/71* (2013.01); *B29C 2049/001* (2013.01); *B29K 2023/12* (2013.01); *B29K 2067/003* (2013.01); *B29L 2009/001* (2013.01); *B29L 2031/565* (2013.01); *B29L 2031/7282* (2013.01); *B29L 2031/7506* (2013.01)

(58) Field of Classification Search
CPC .. B65D 1/0246; B65D 41/0471; B29C 49/06; B65C 41/0471
USPC ..... 428/35.7, 36.92, 542.8, 34.1, 36.6, 36.5, 428/36.9, 36.91, 35.8, 36.7, 480, 500, 428/516, 523, 323, 36.4, 411.1, 131, 200, 428/213, 220, 221, 29, 304.4, 339, 341, 428/34.5, 34.7, 35.4, 35.9, 36.8, 412, 413, 428/423.1, 423.7, 424.2, 426, 446, 457, 428/461, 474.4, 483, 484.1, 520, 522; 215/12.1, 35.7, 36.92, 542.8, 34.1, 36.6, 215/36.5, 36.9, 36.91, 35.8, 36.7, 480, 215/500, 516, 523, 323, 36.4, 411.1, 131, 215/200, 213, 220, 221, 29, 304.4, 339, 215/341, 34.5, 34.7, 35.4, 35.9, 36.8, 412, 215/413, 423.1, 423.7, 424.2, 426, 446, 215/457, 461, 474.4, 483, 484.1, 520, 215/522; 222/95, 389
See application file for complete search history.

(56) References Cited

U.S. PATENT DOCUMENTS

| 6,581,803 | B1* | 6/2003 | Yoshimoto | B65D 83/0055 222/105 |
|---|---|---|---|---|
| 2005/0037210 | A1* | 2/2005 | Bertry et al. | 428/447 |
| 2006/0054635 | A1* | 3/2006 | Iwahashi et al. | 222/107 |

* cited by examiner

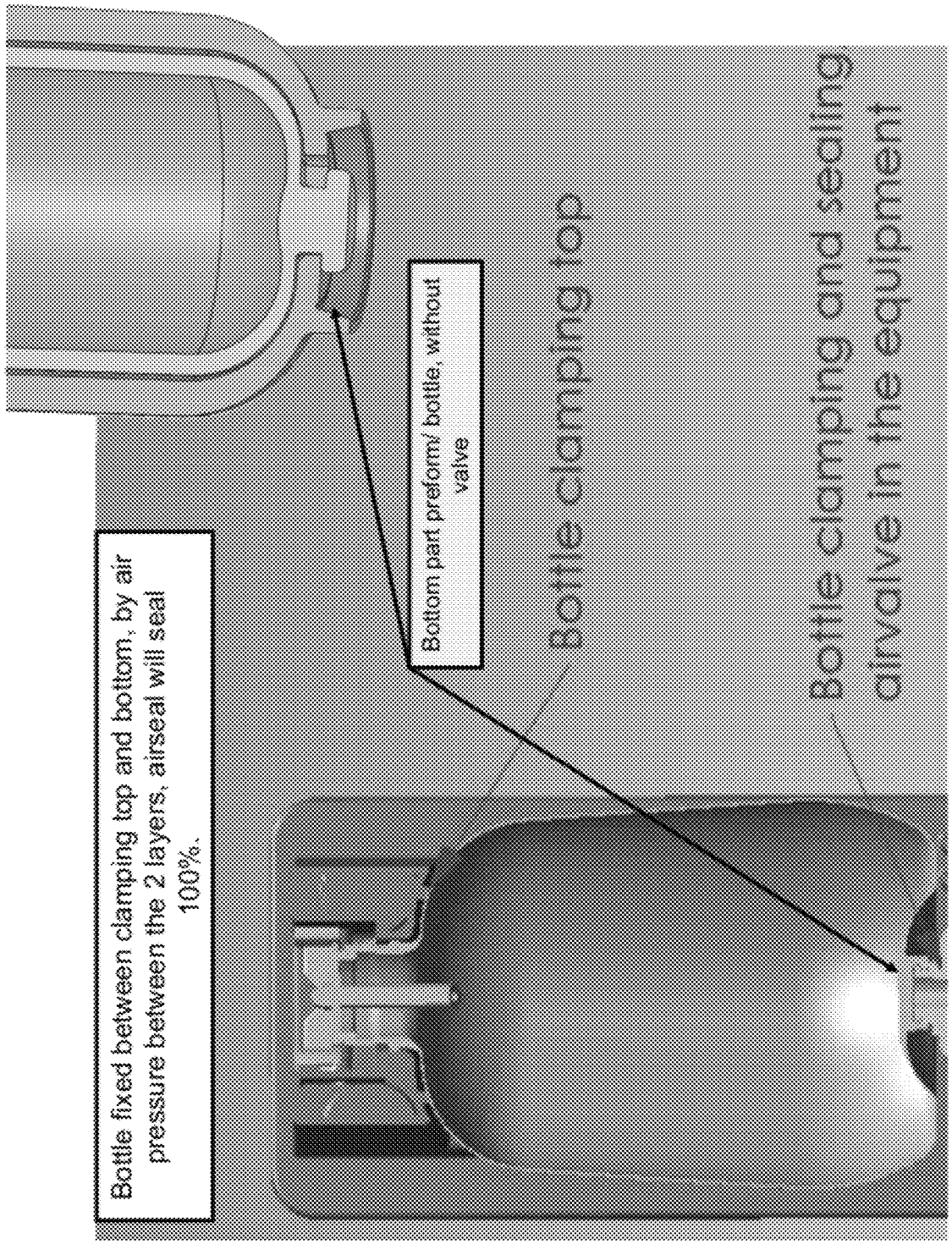
Fig. 1 - Bottle Without Airvalve (Airvalve in Appliance)

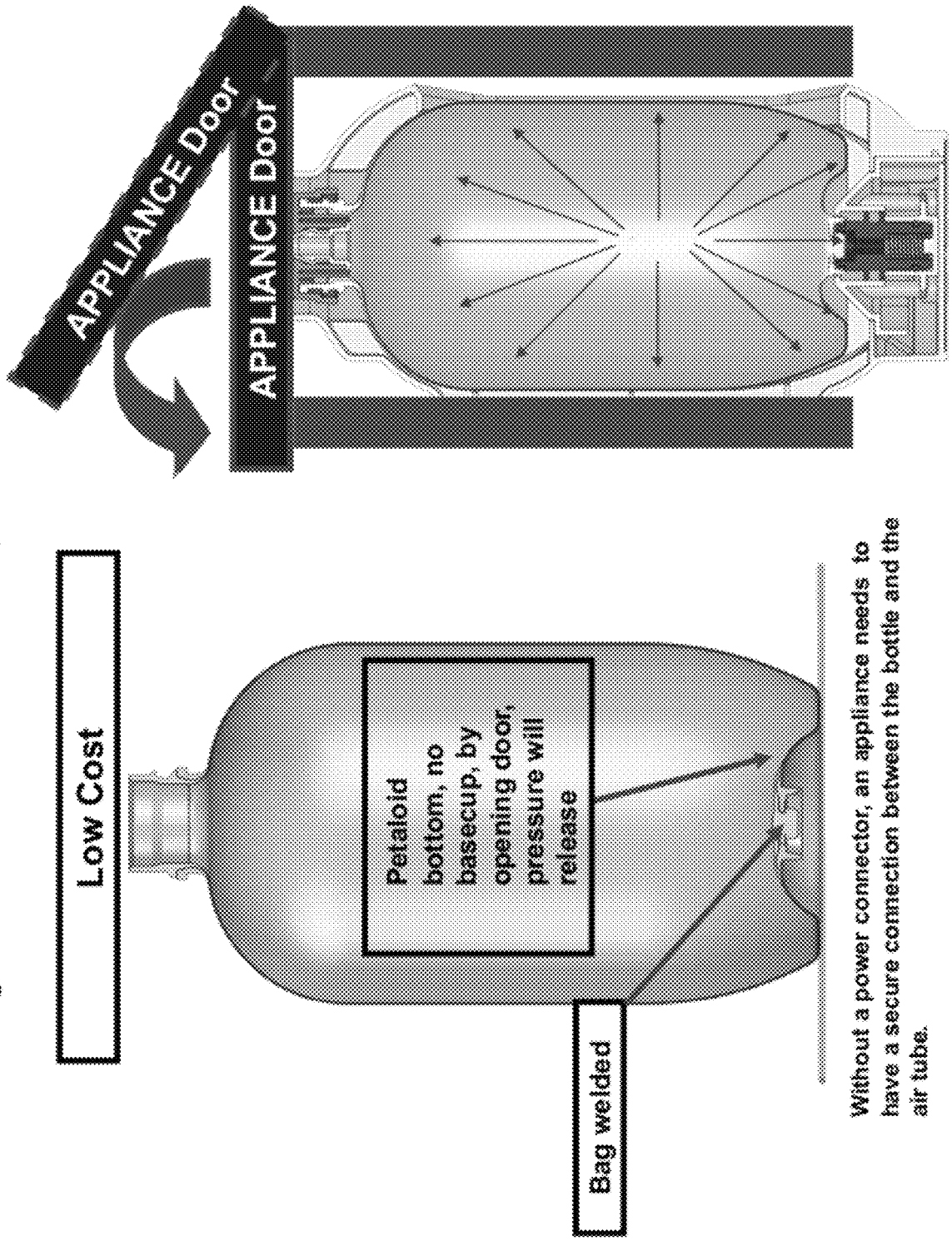
Fig. 2 - Holder Withstands Forces, No Valve Or Power Connector

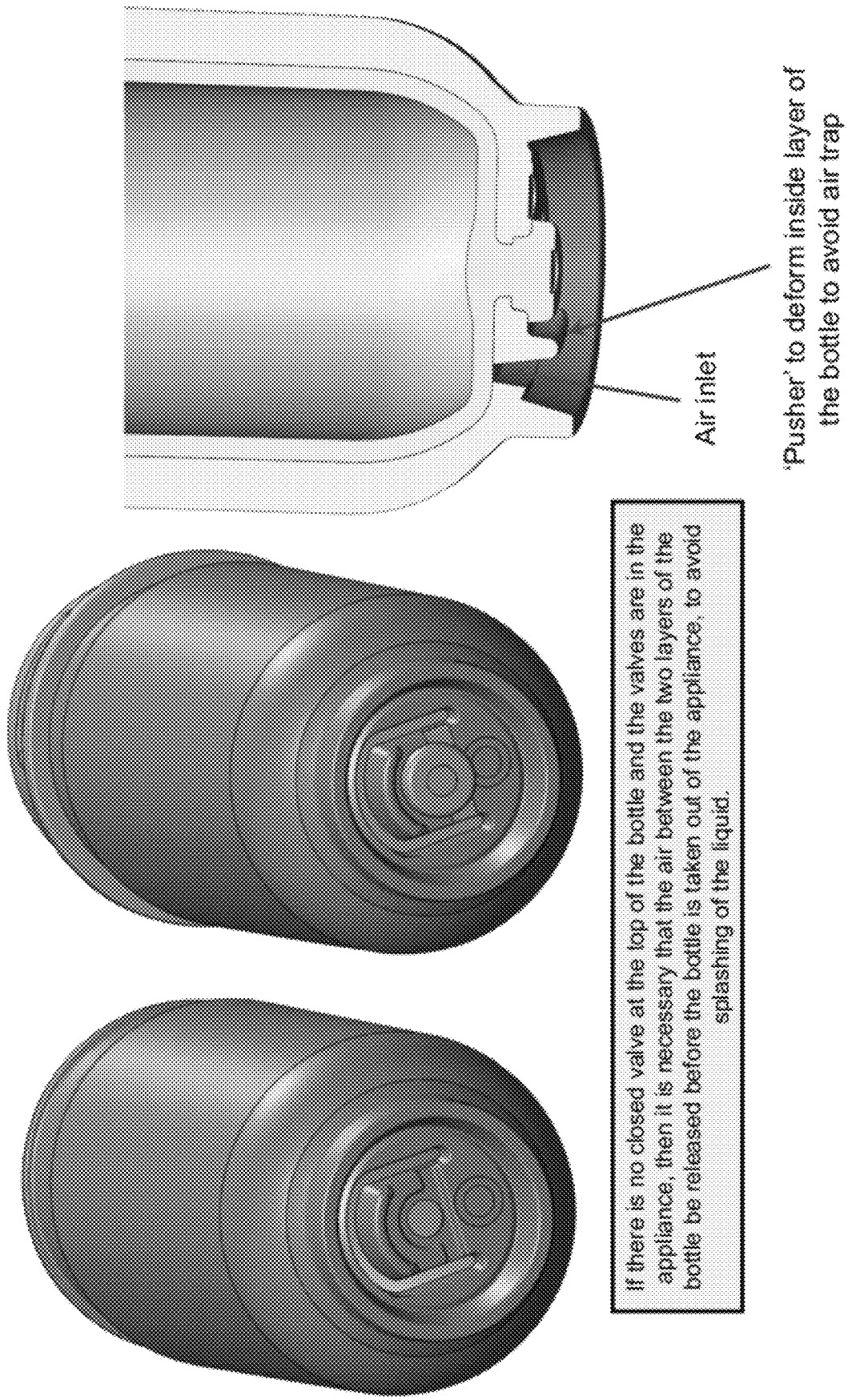
Fig. 3 — Preform Without Airvalve; Airvalve In Appliance

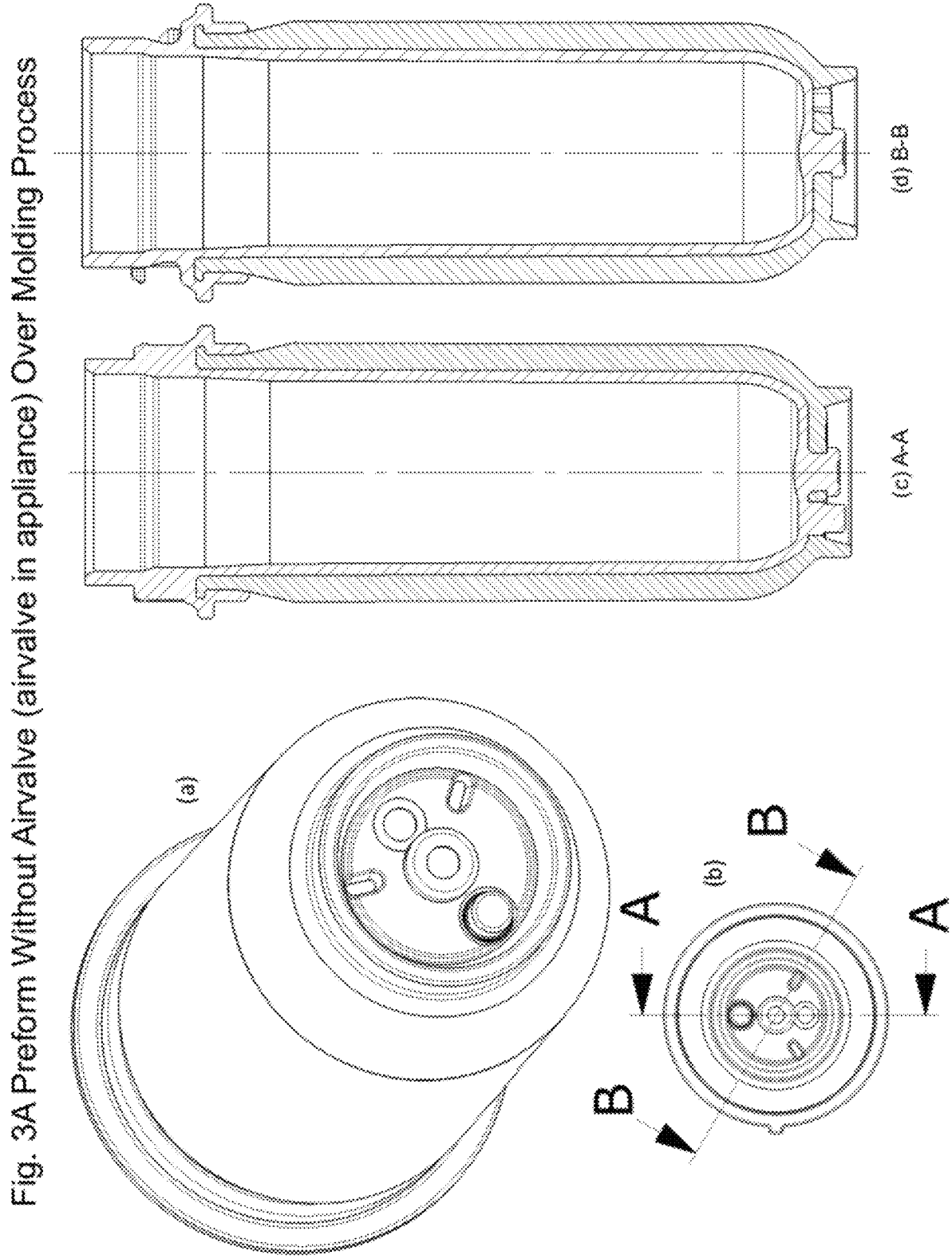

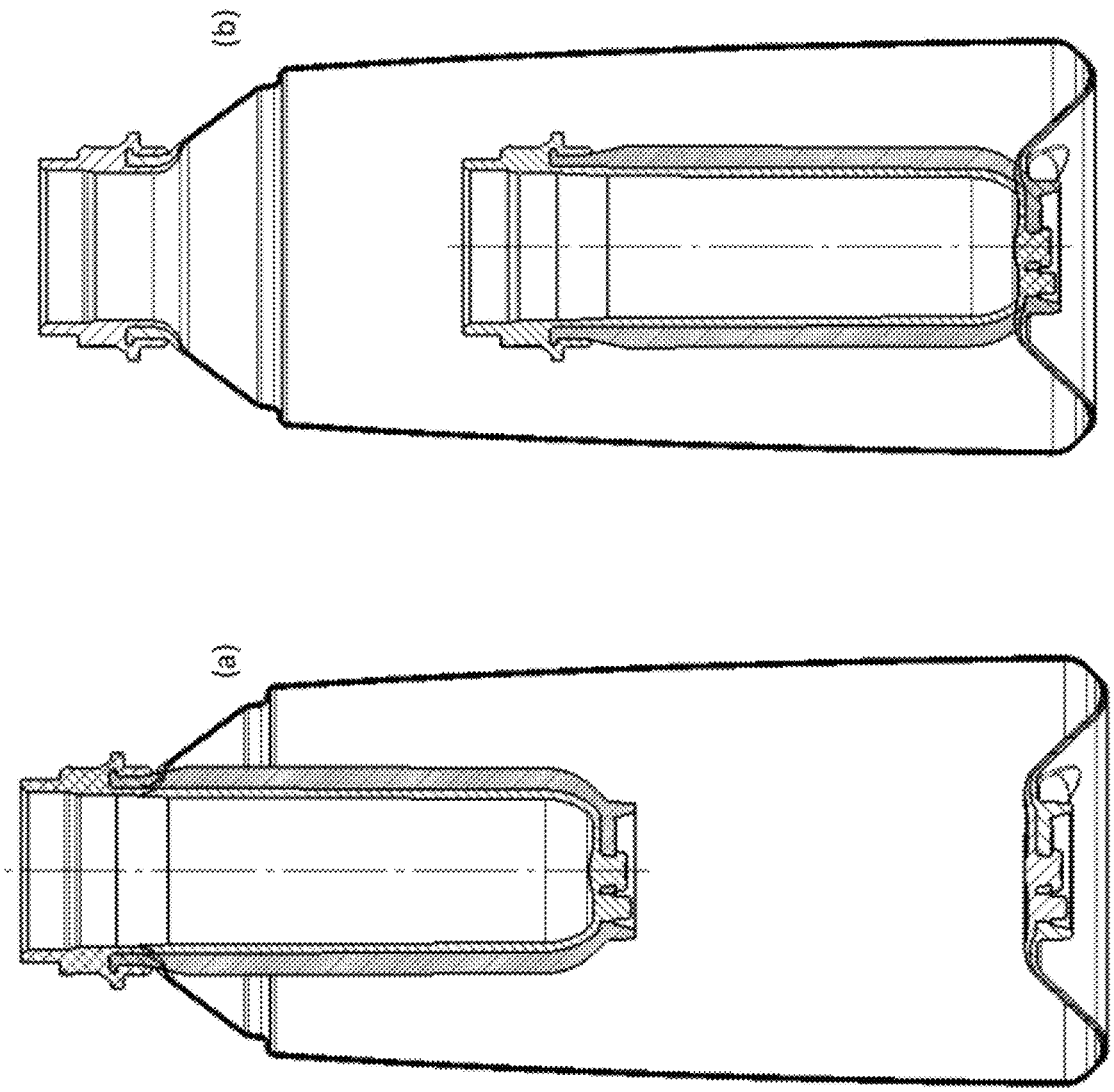
Fig. 3B - Blowing bottle from preform

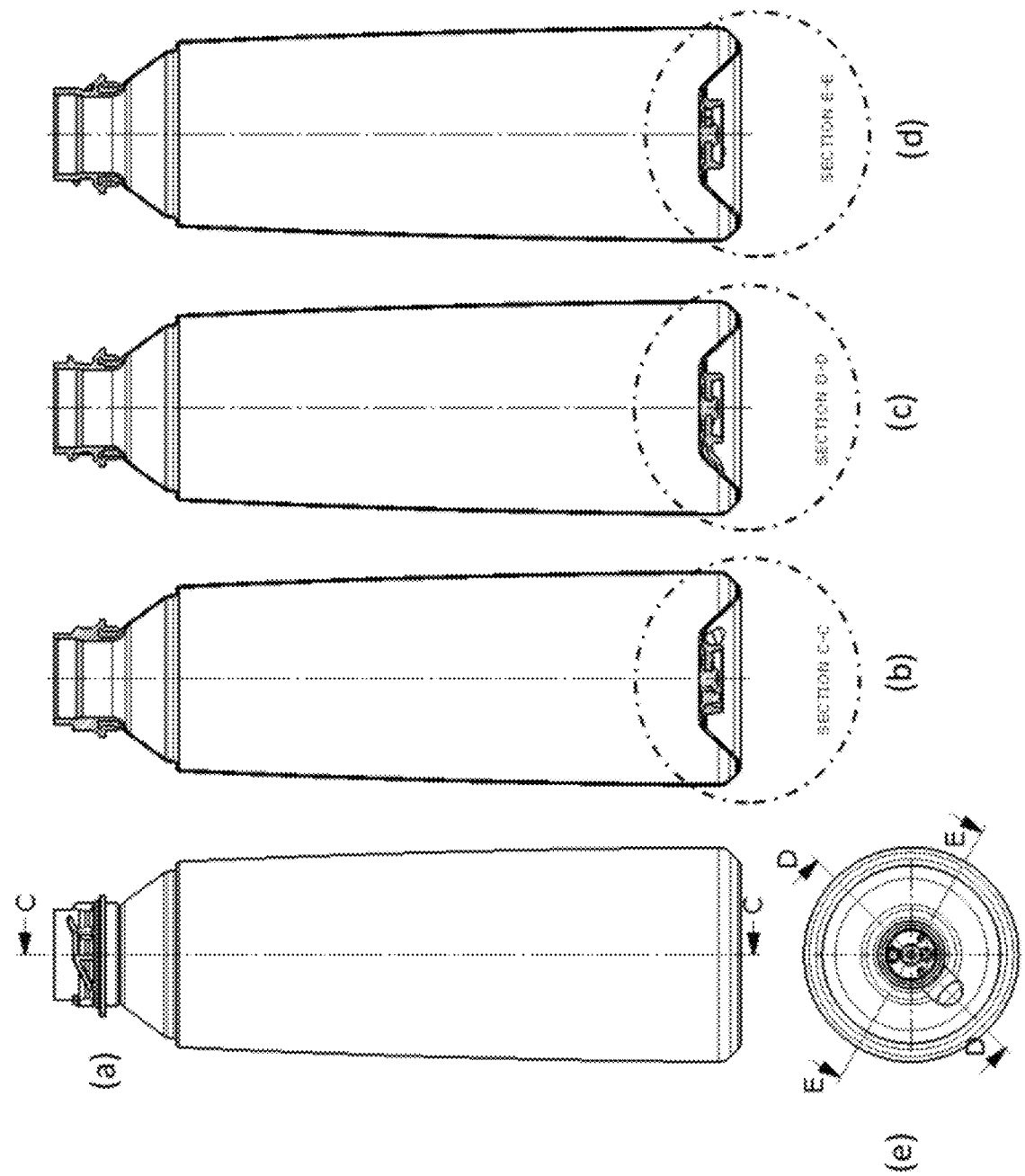

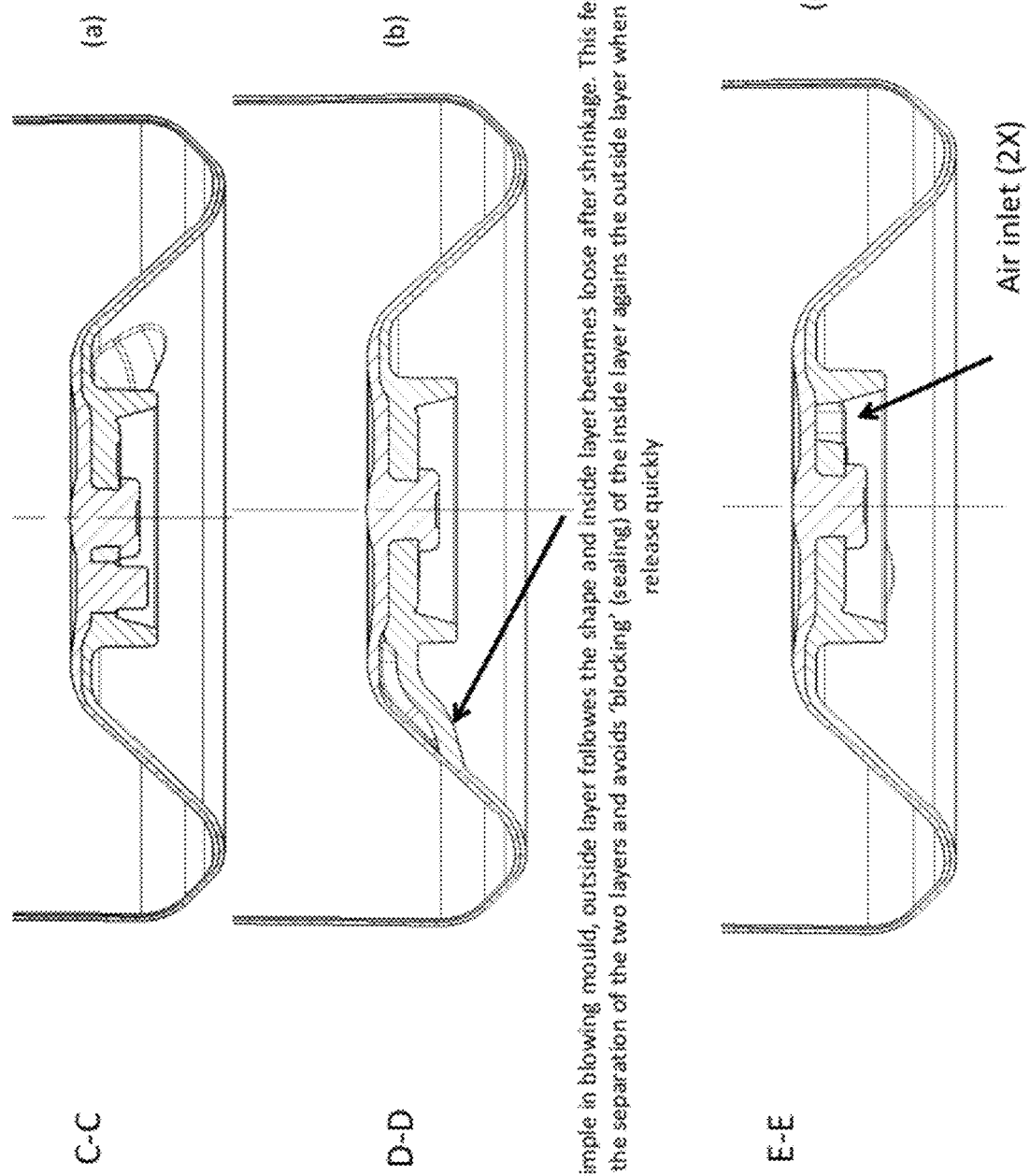

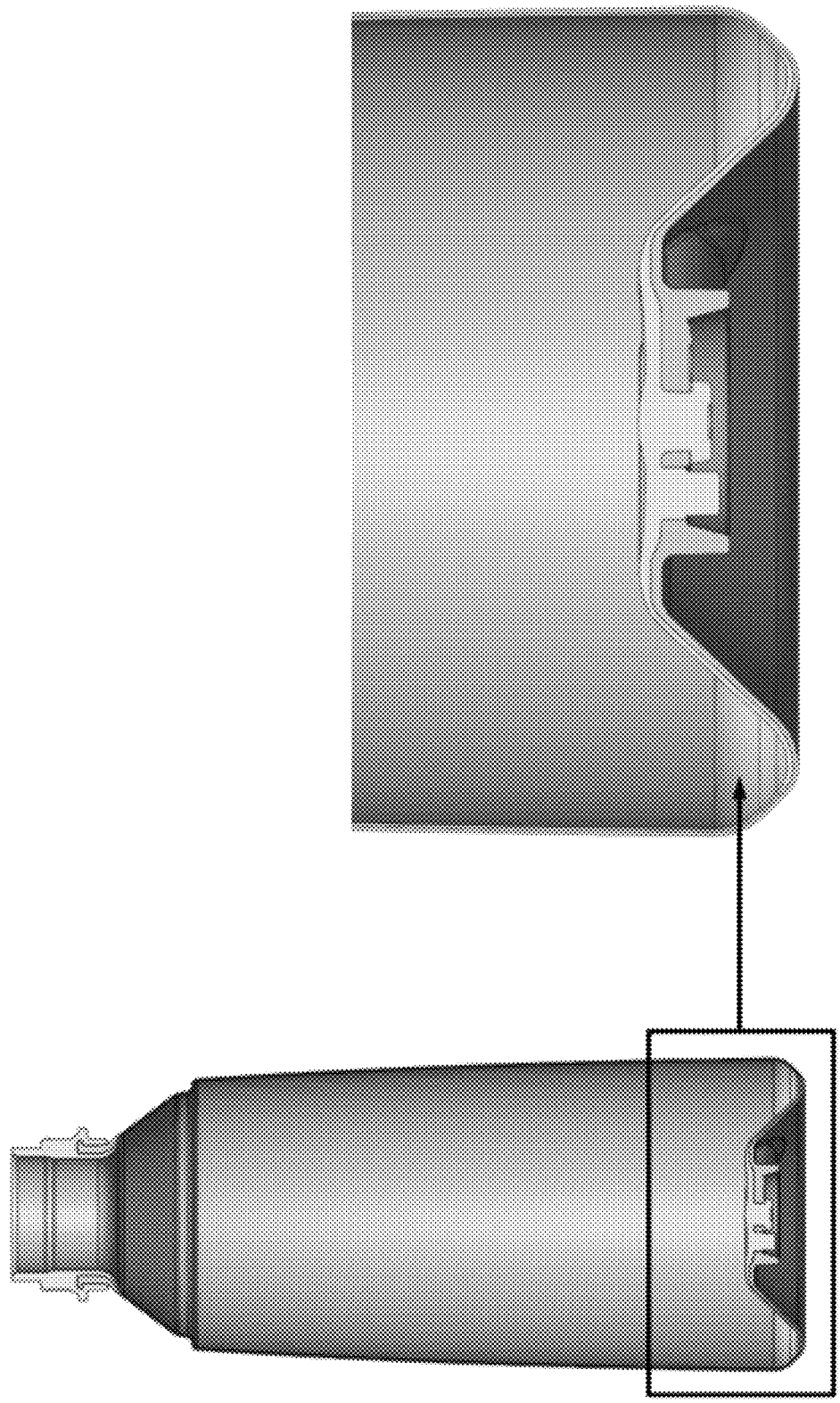
Fig. 3E - Separation of Layers In The Bottle

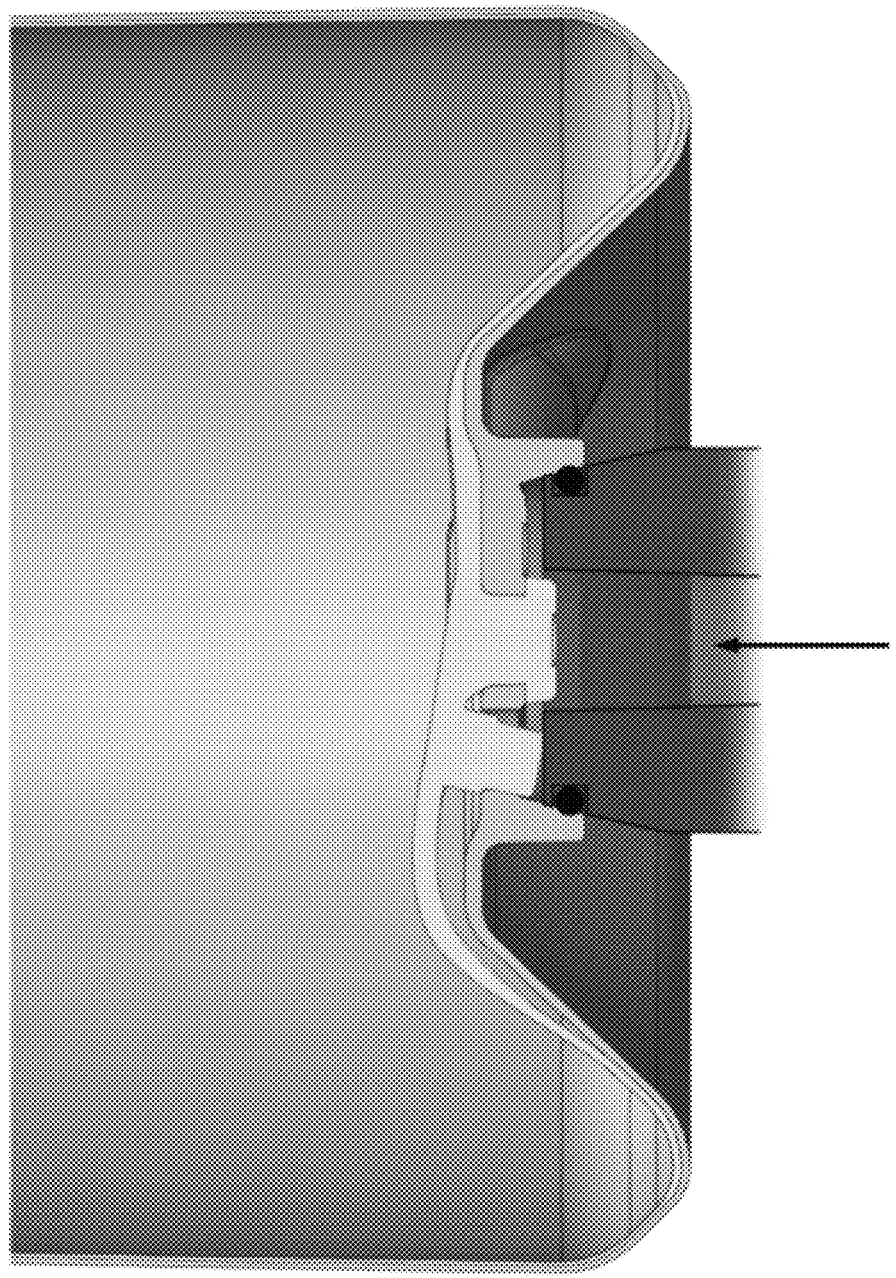
Fig. 3F - Separation of Layers In The Bottle

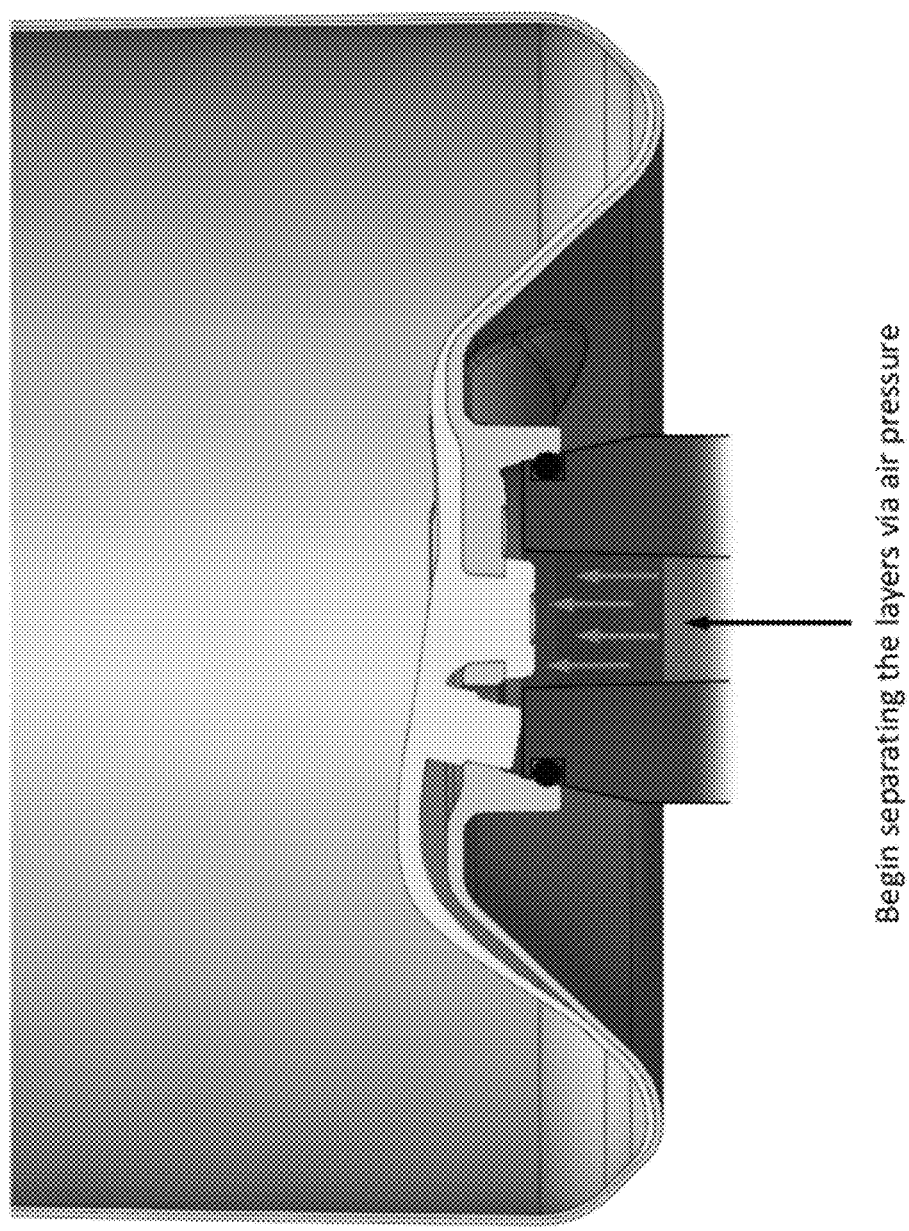
Fig. 3G - Separation of Layers In The Bottle

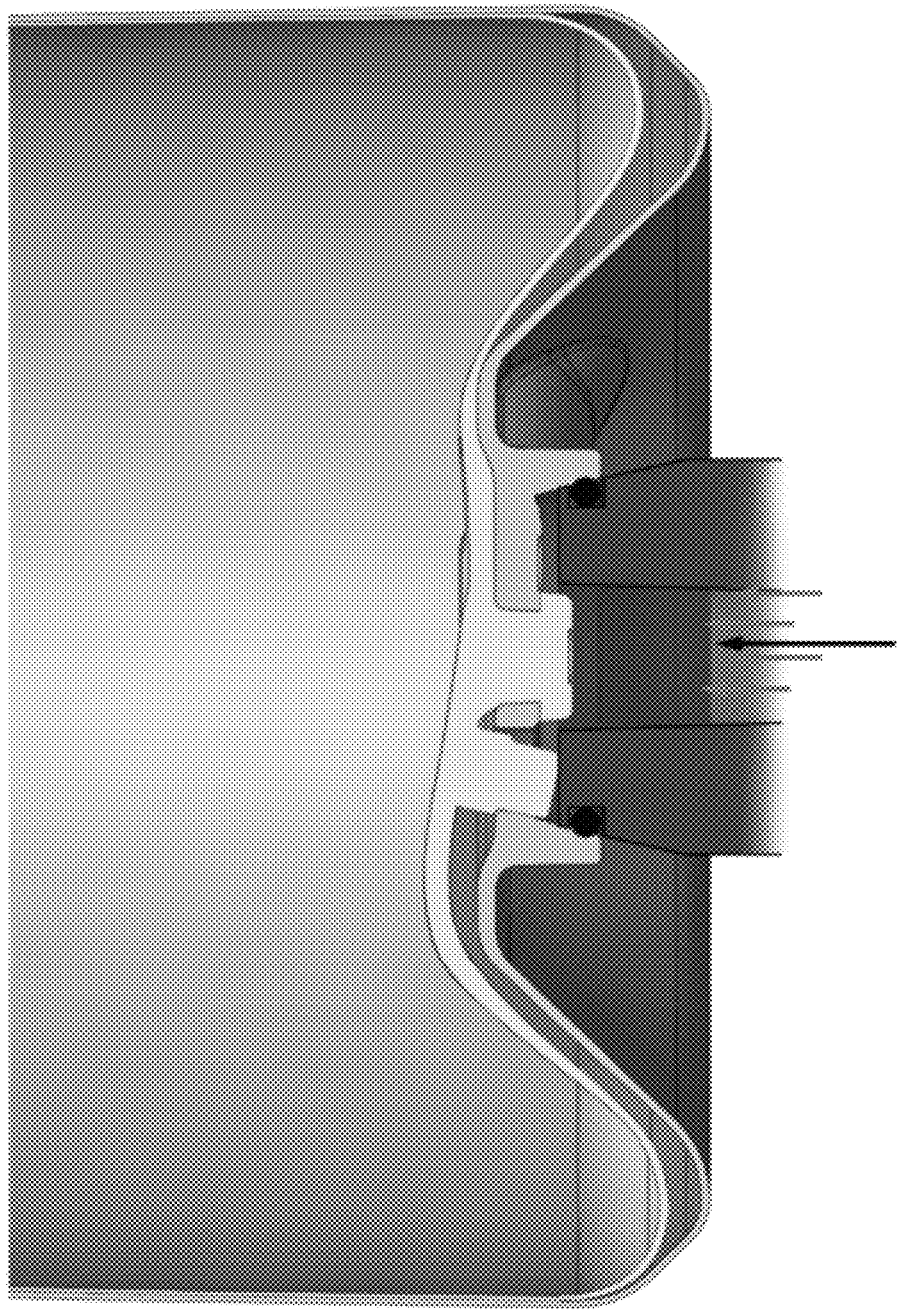
Fig. 3H - Separation of Layers In The Bottle

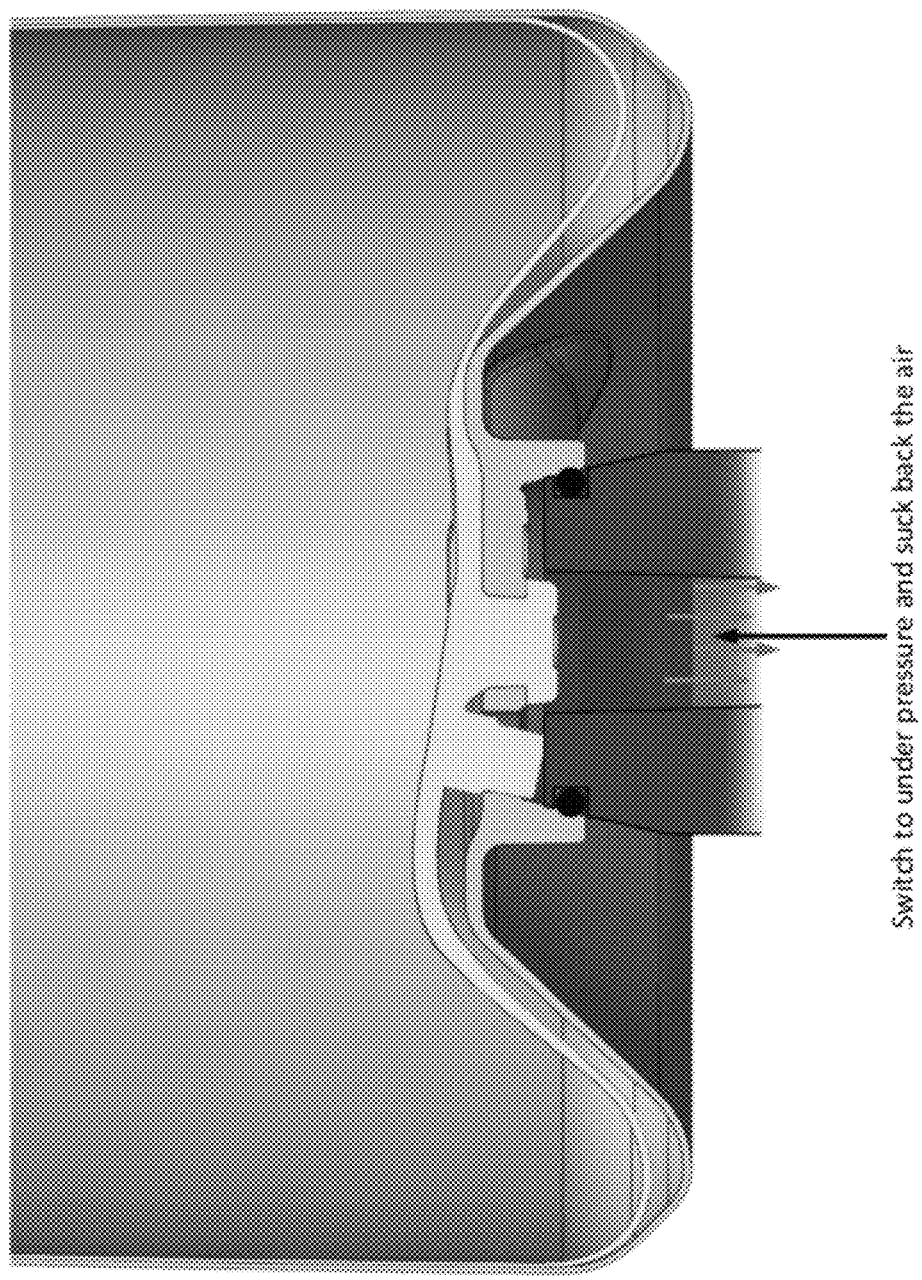
Fig. 31 - Bottle separating of the layers

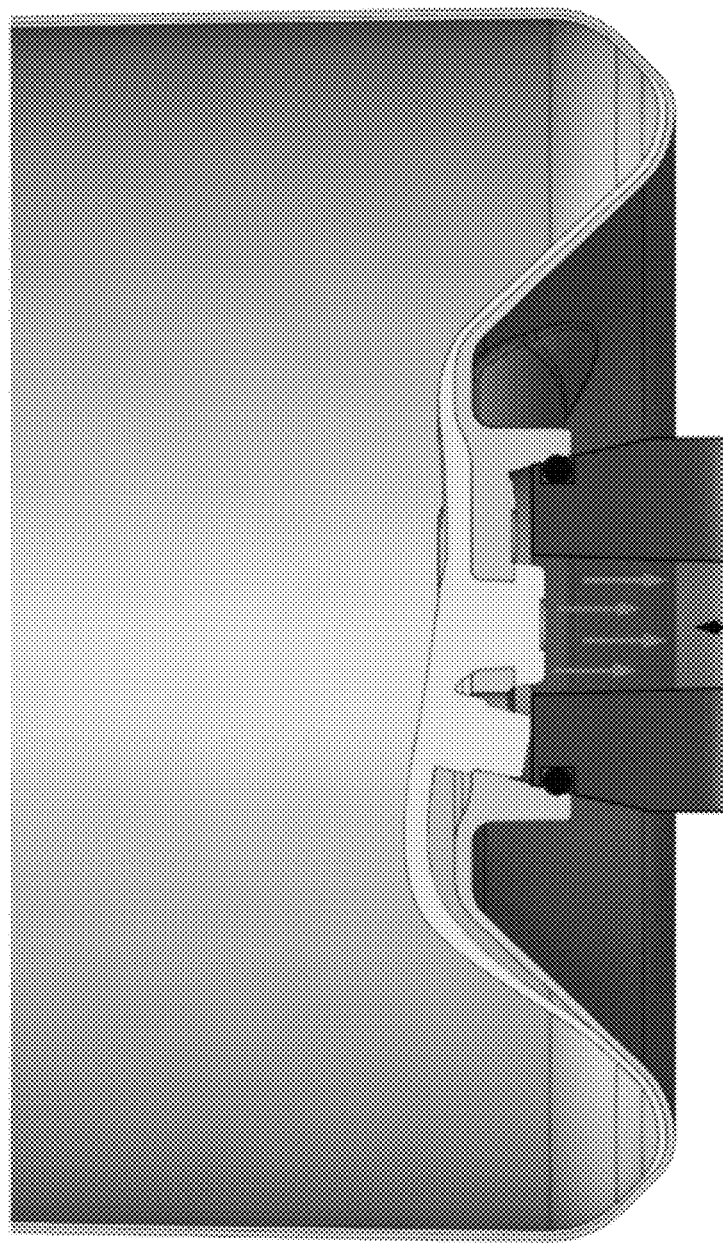
Fig. 3J - Separation of Layers In The Bottle

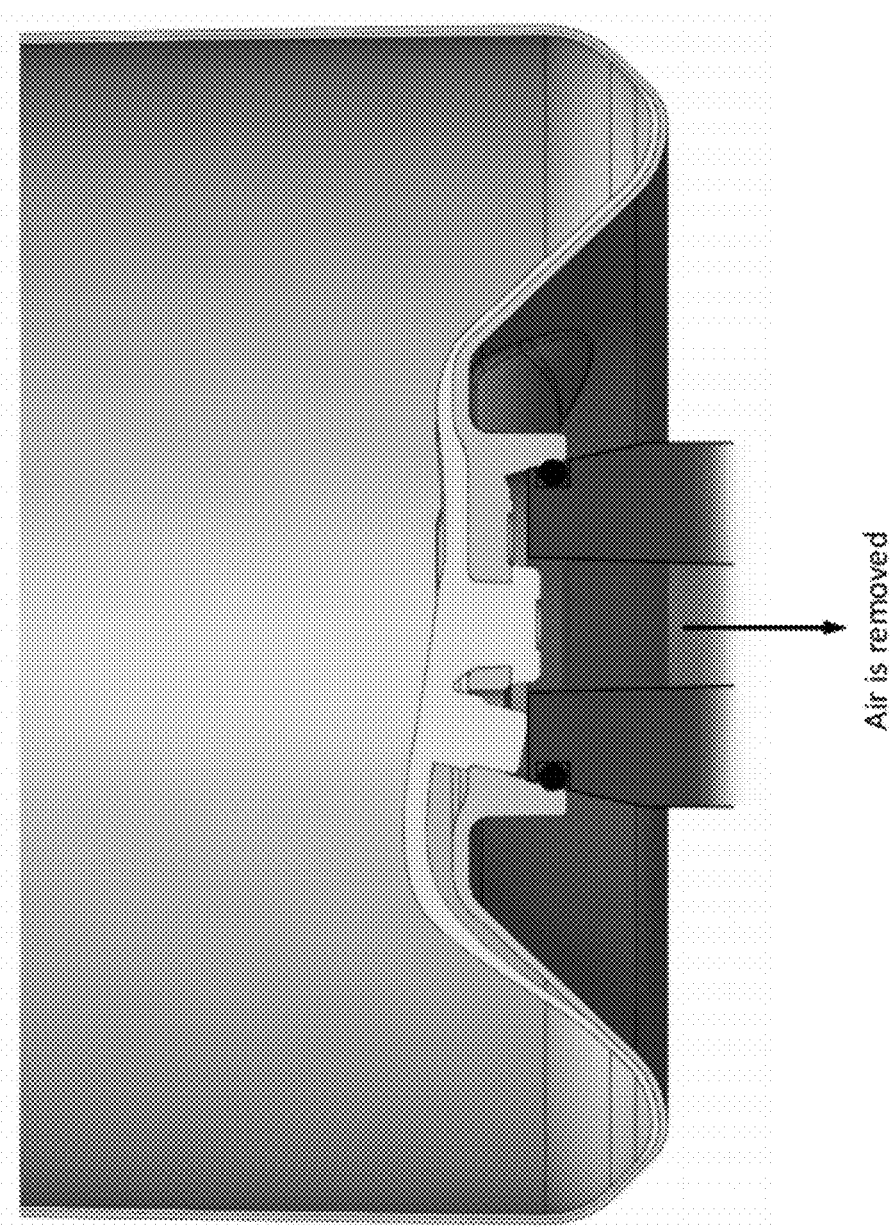
Fig. 3K - Separation of Layers In The Bottle

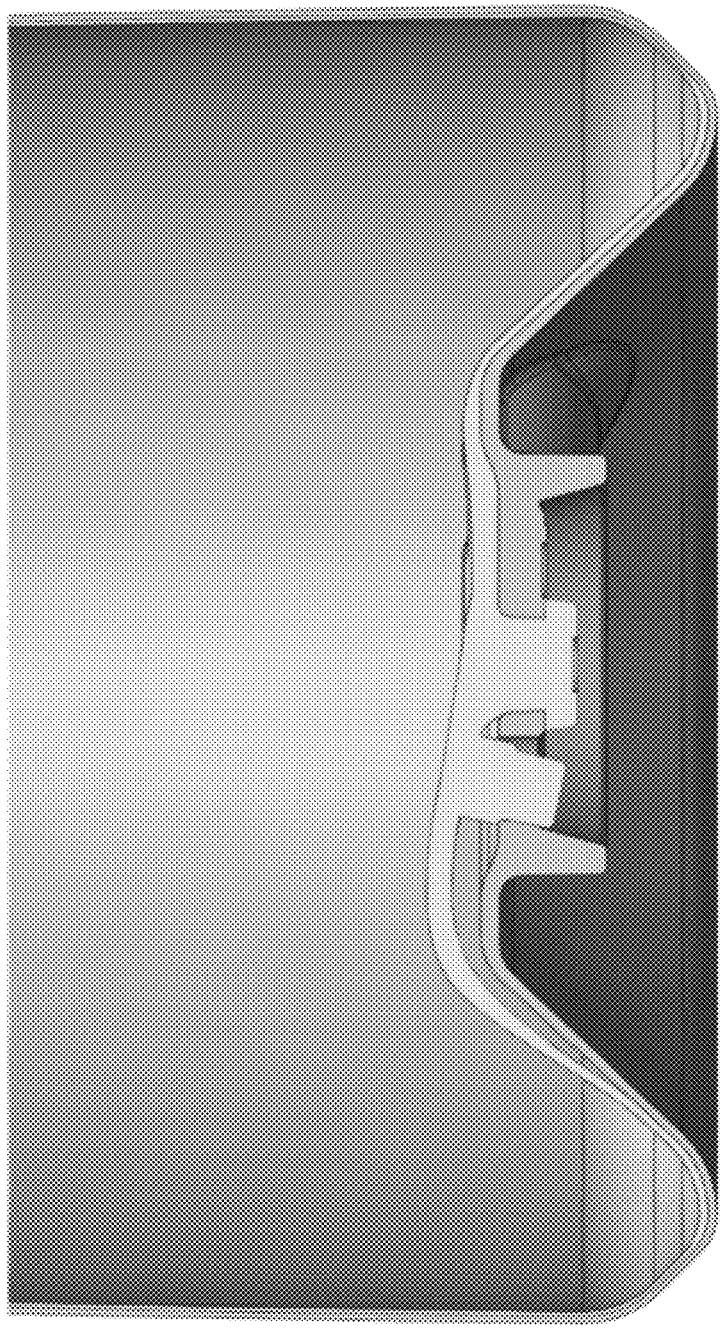
Fig. 3L - Separation of Layers In The Bottle
Net result is that the pin of the inside layer will hook into the hole of the outside layer, and there is a guaranteed layer separation during use. This avoids "blocking" (sealing) of the inside layer against the outside layer when the air has to release quickly.

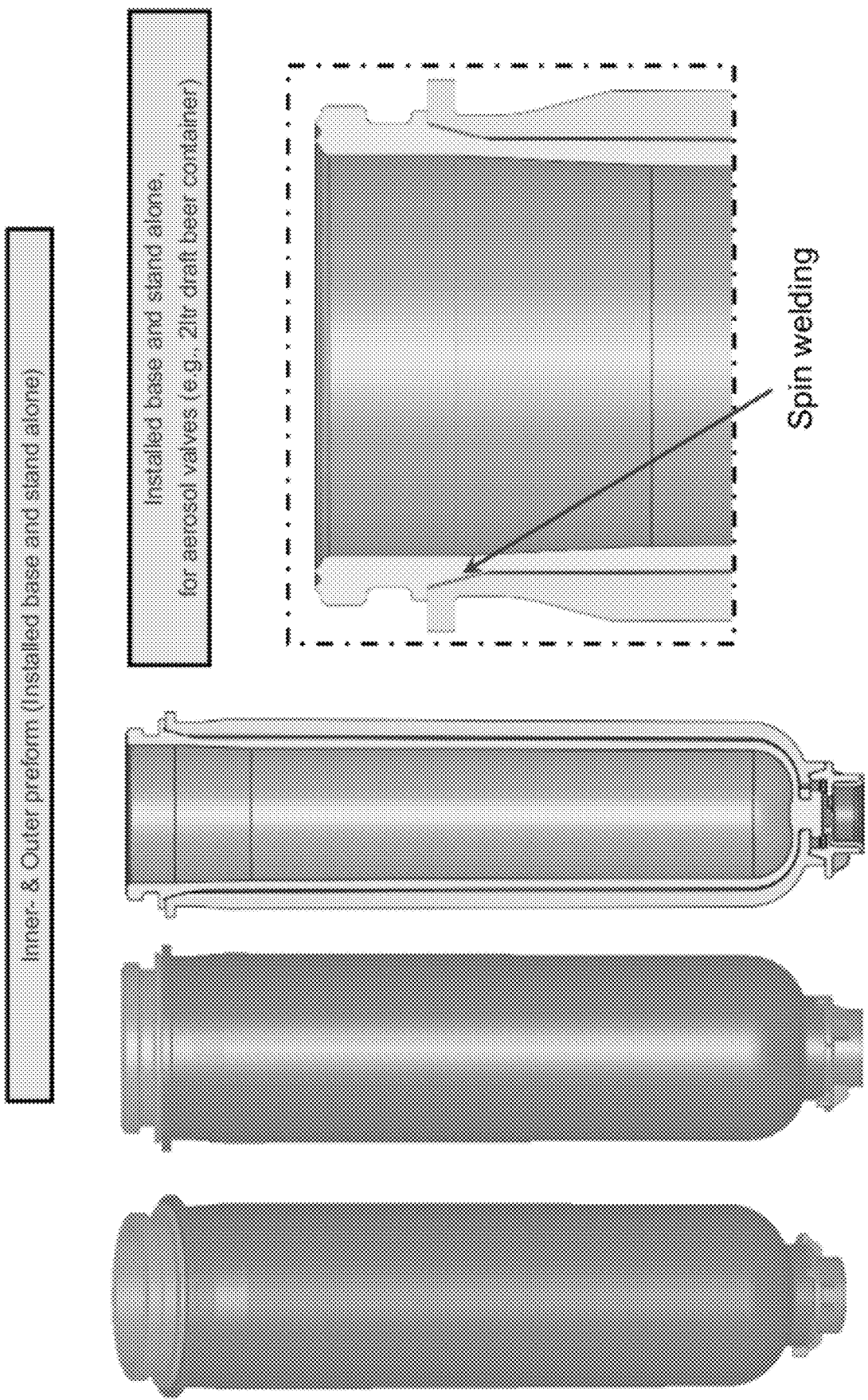
Fig. 4 – Preform Crimp Neck PET/PET (assembly process)

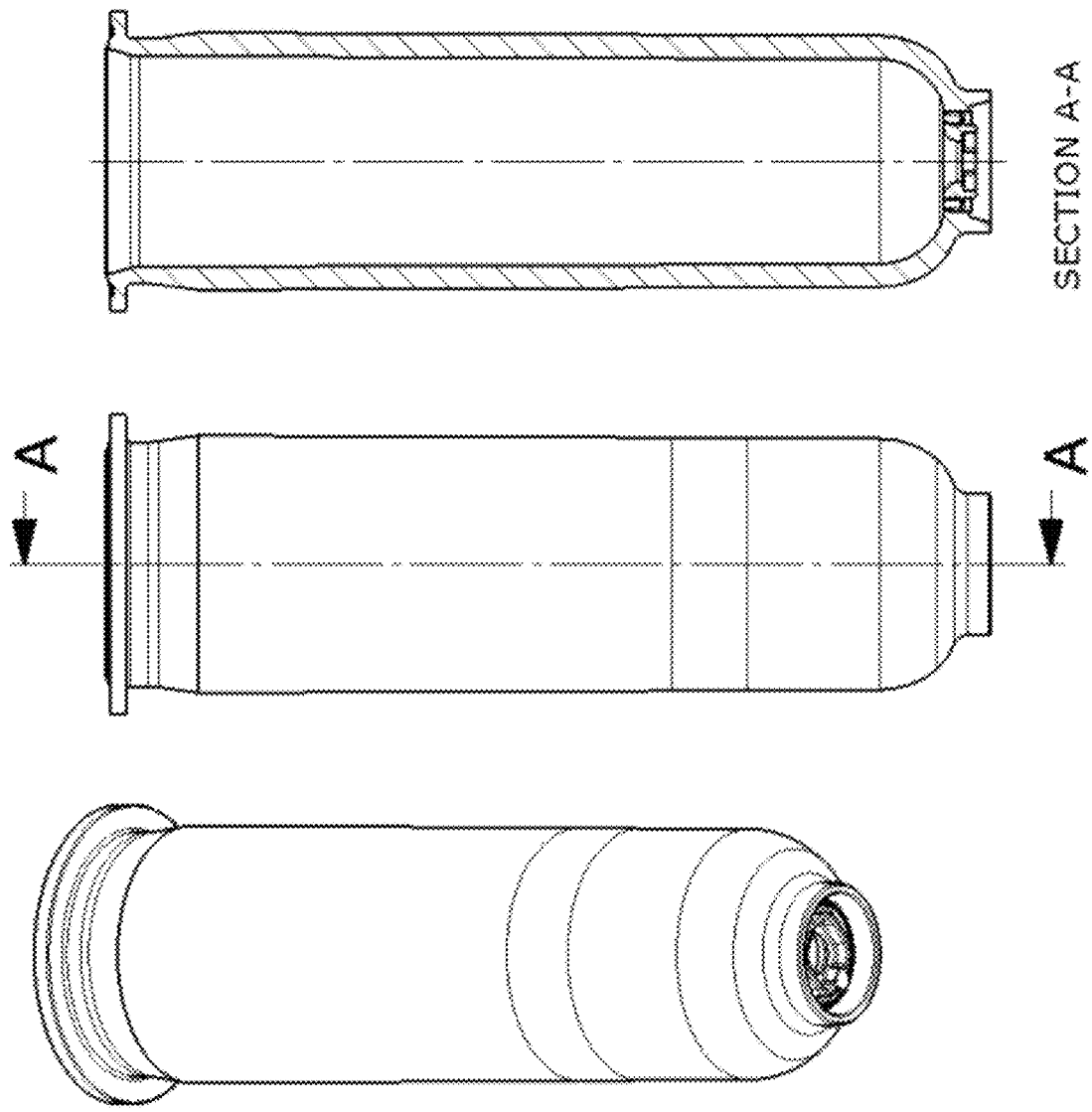

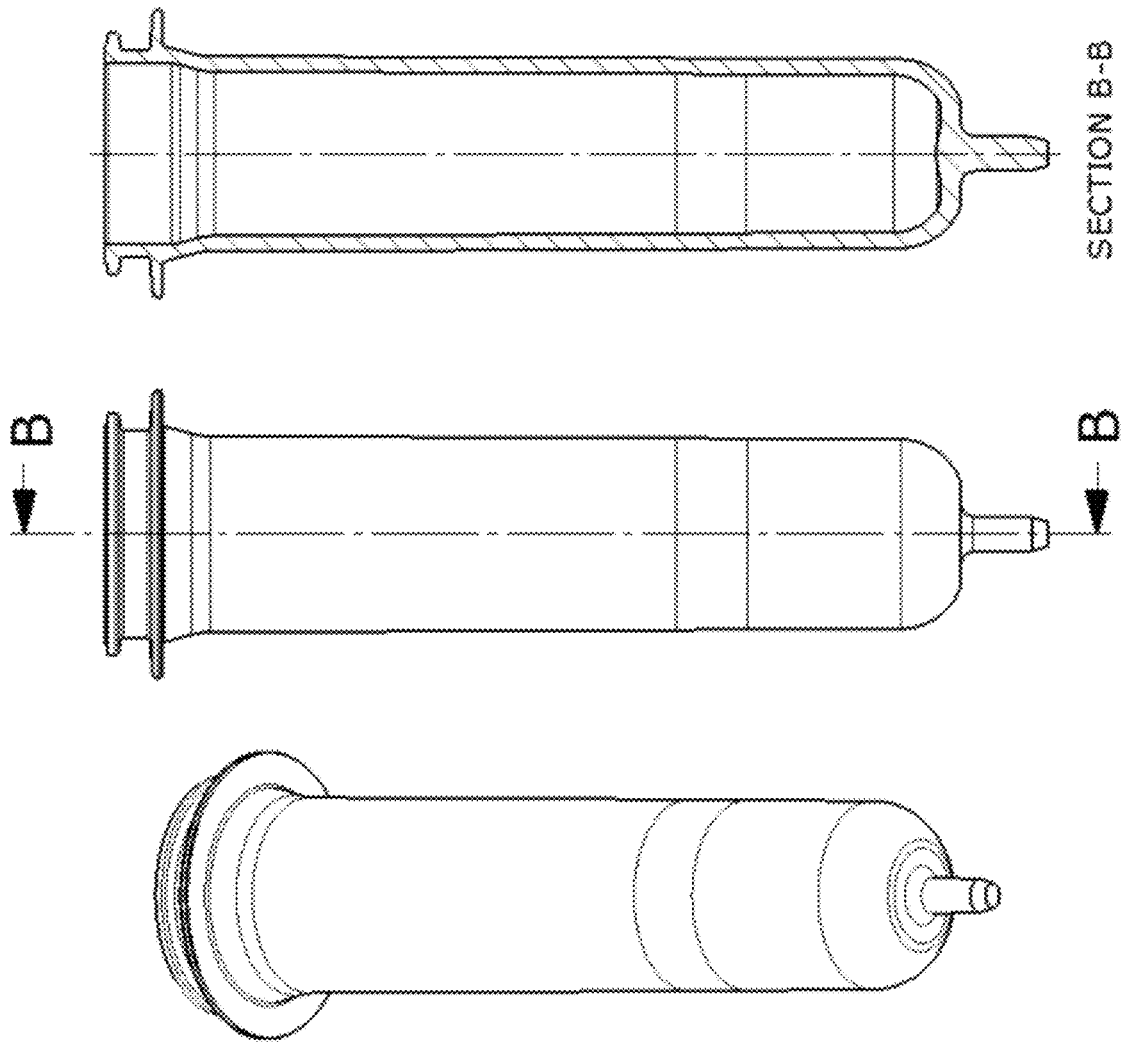

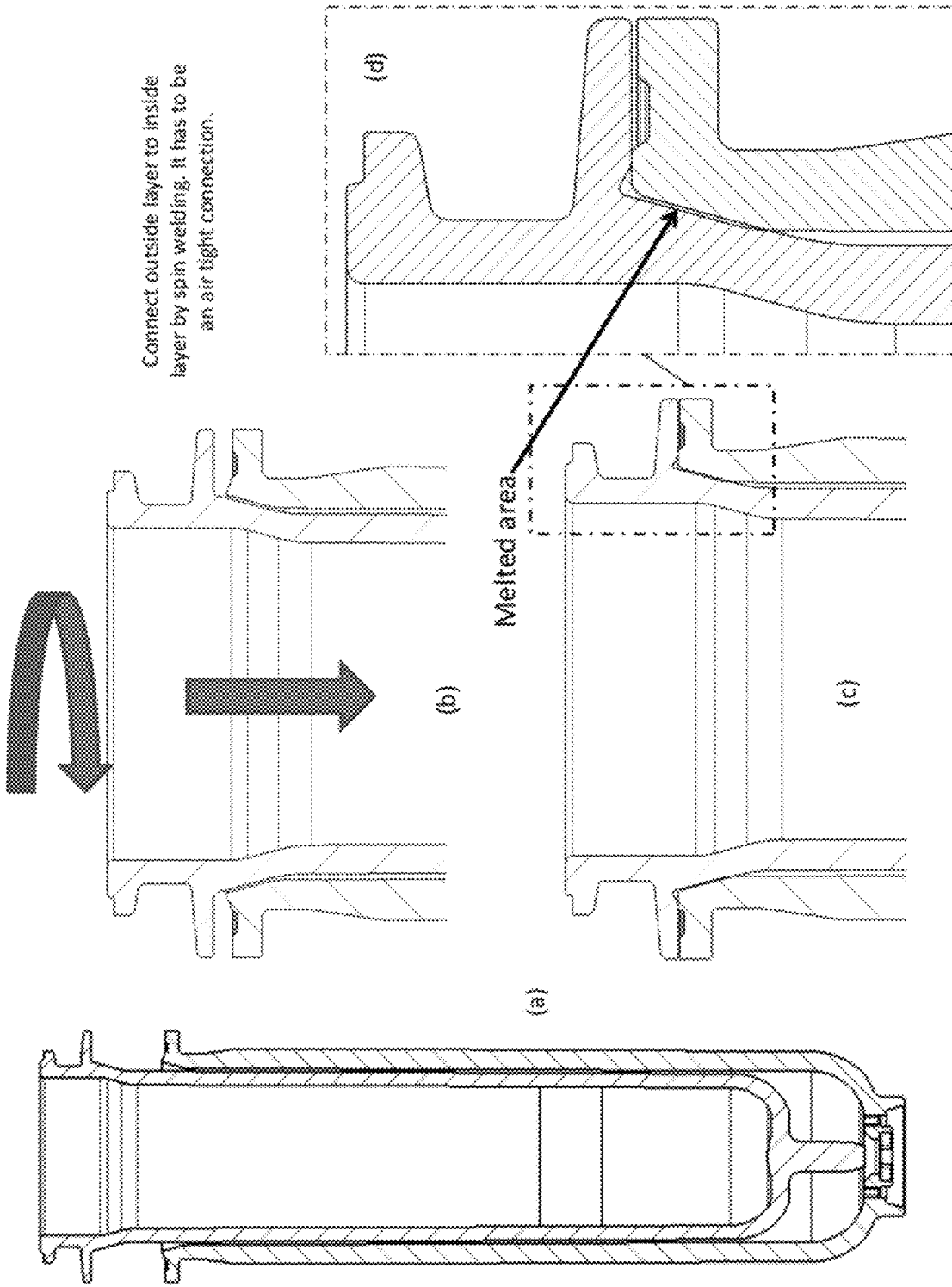
Fig. 4C Preform PET/PET Inside Layer Assembled Into Outside Layer

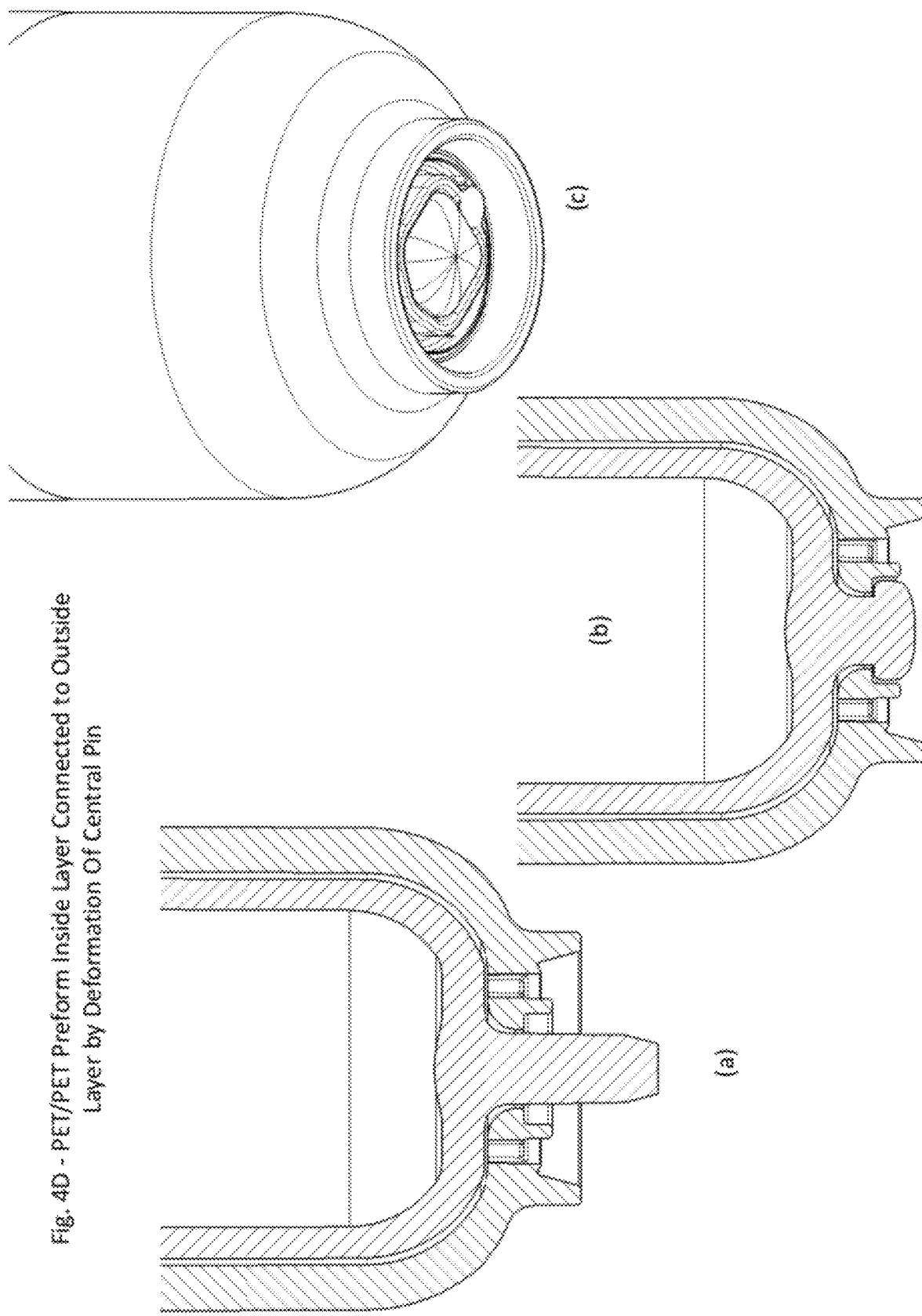
Fig. 40 - PET/PET Preform Inside Layer Connected to Outside Layer by Deformation Of Central Pin

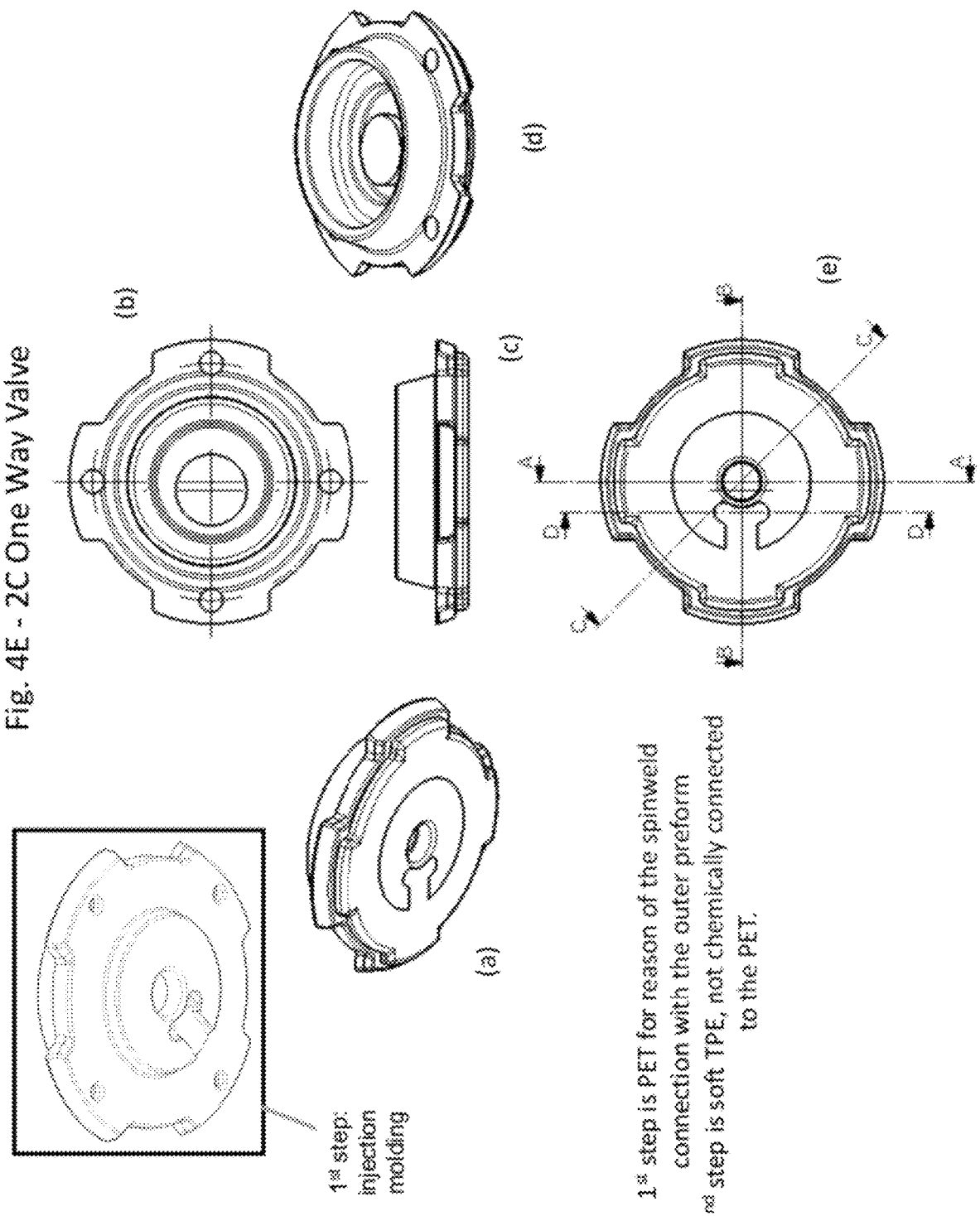

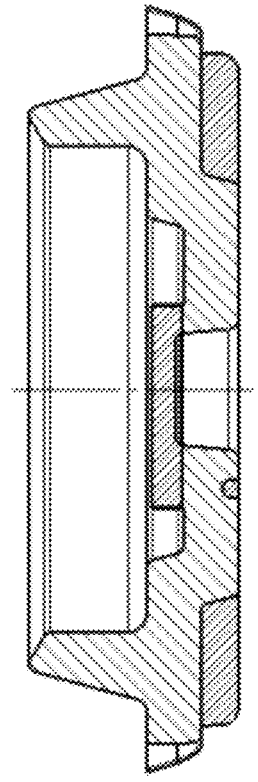
Fig. 4F - 2C One Way Valve Detail
Mechanical connection between 1C and 2C step
A-A
C-C
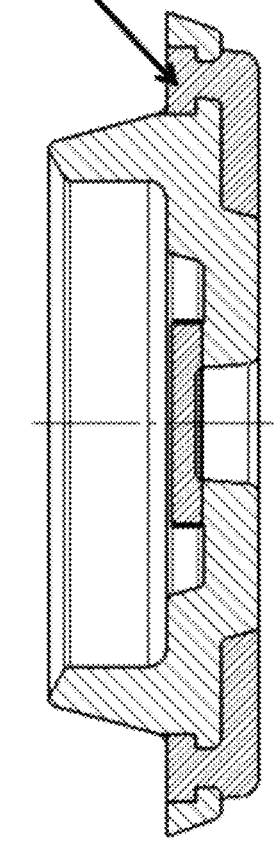
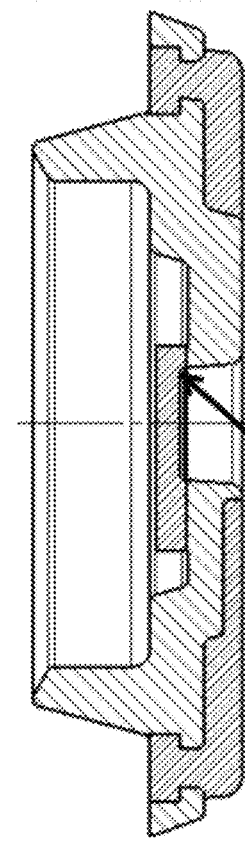
Mechanical connection between 1C and 2C step
B-B
Valve seat
D-D

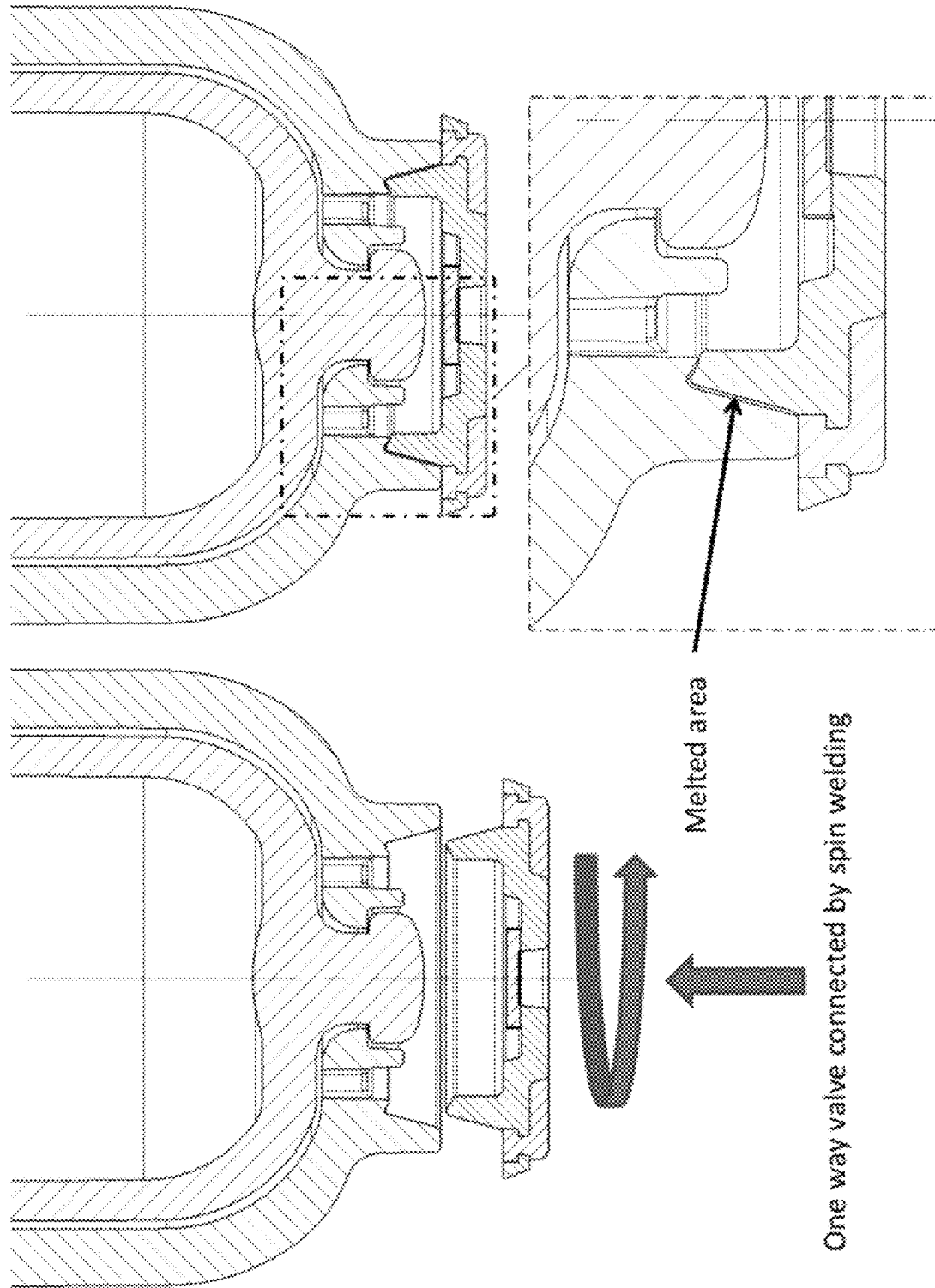

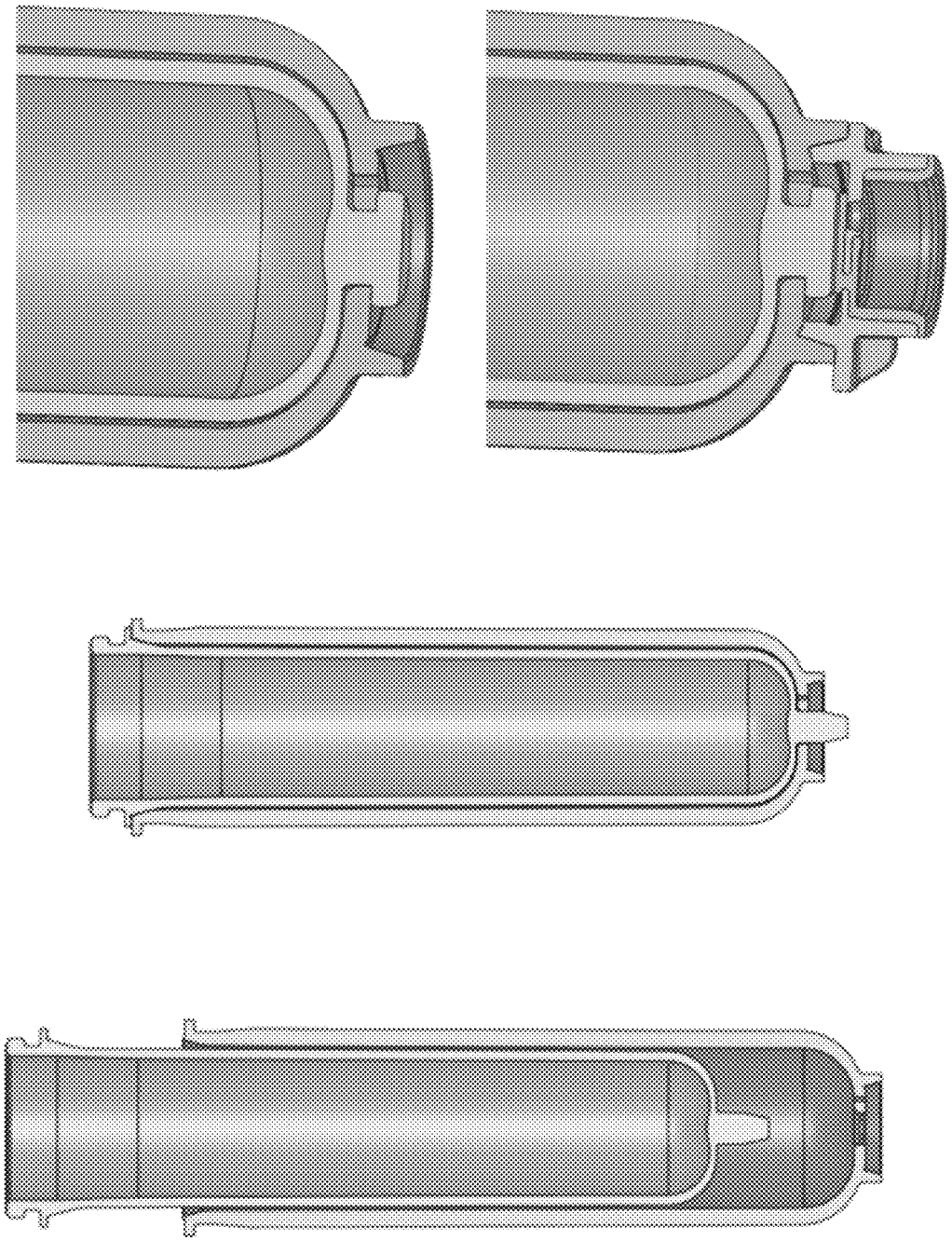
Fig. 5 – Preform With Power Connector
(when clamping system is in appliance no powerconnector/airvalve is necessary in preform)

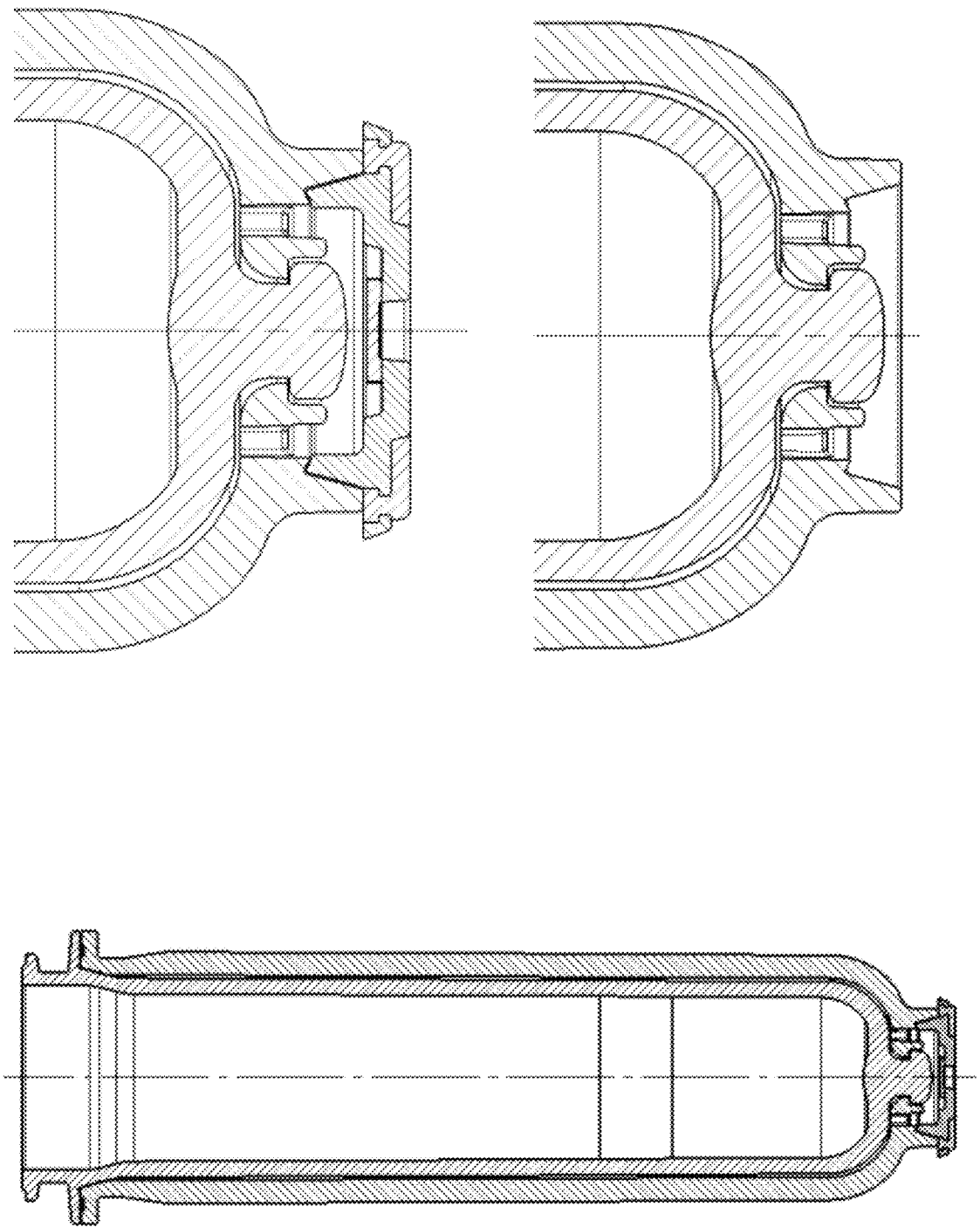
Fig. 5A - Preform With and Without Power Connector

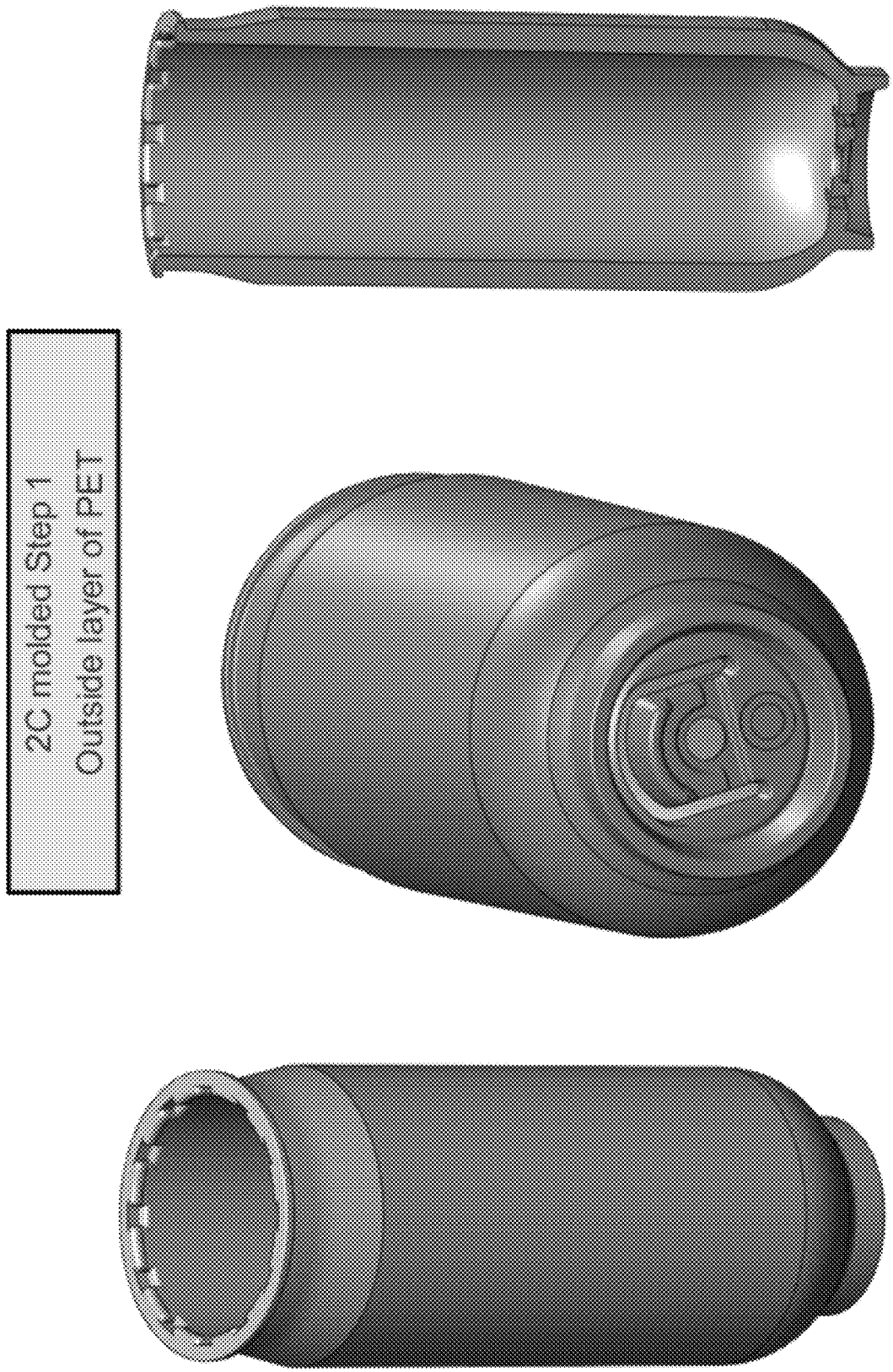
Fig. 6 - Preform Standard Flair Bayonet 2C PET/PP

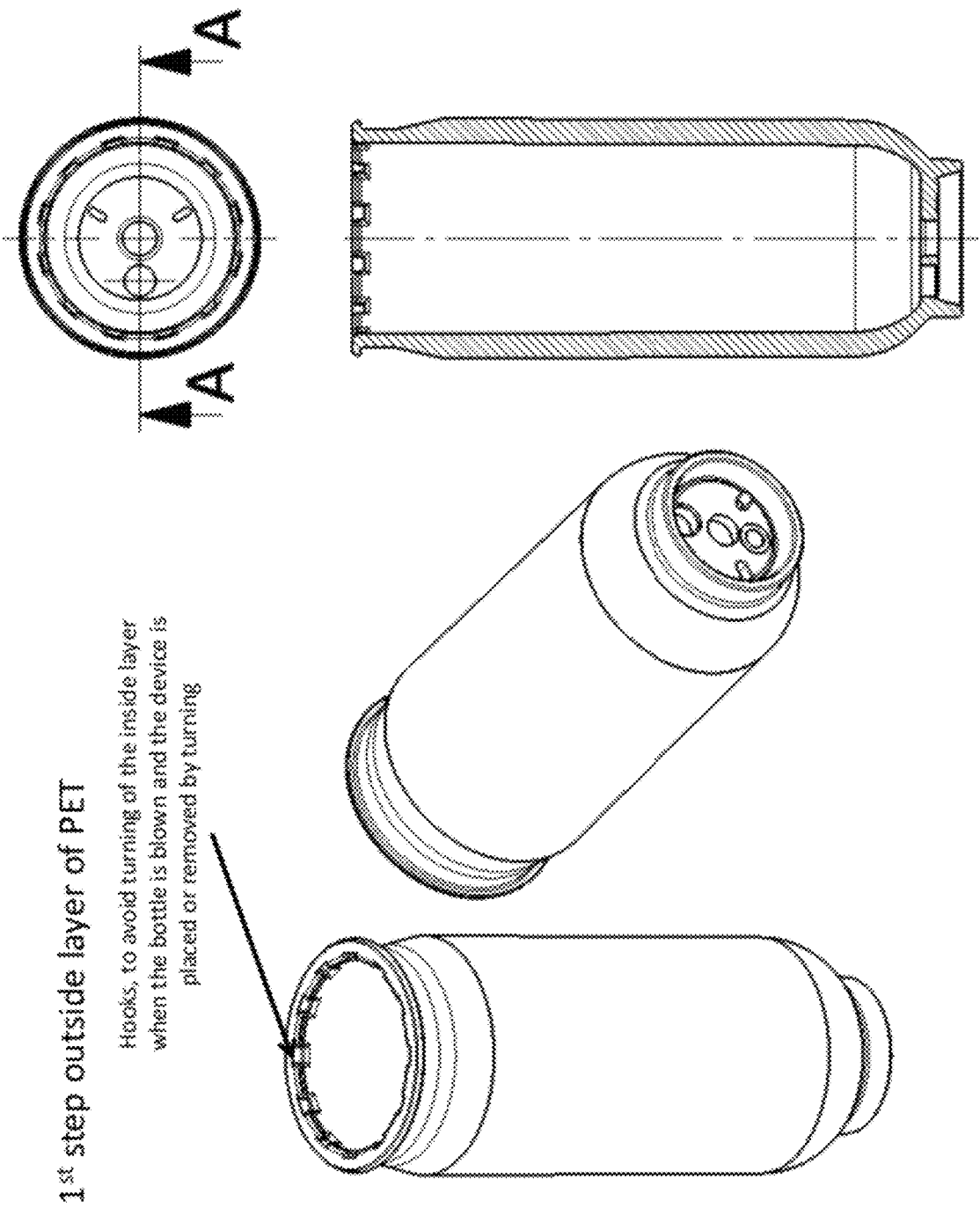

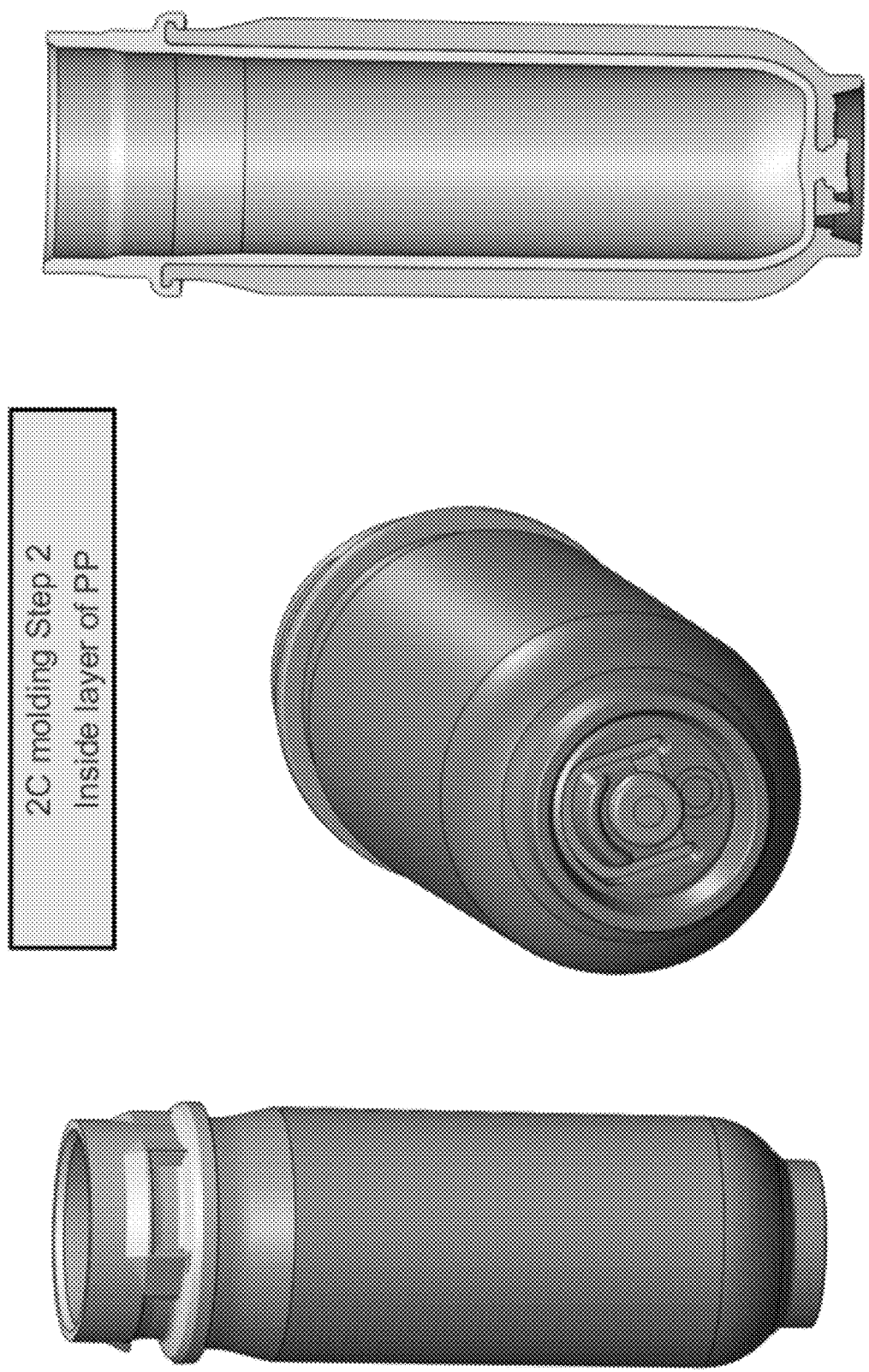
Fig. 7 – Preform Standard Flair bayonet 2C PET / PP

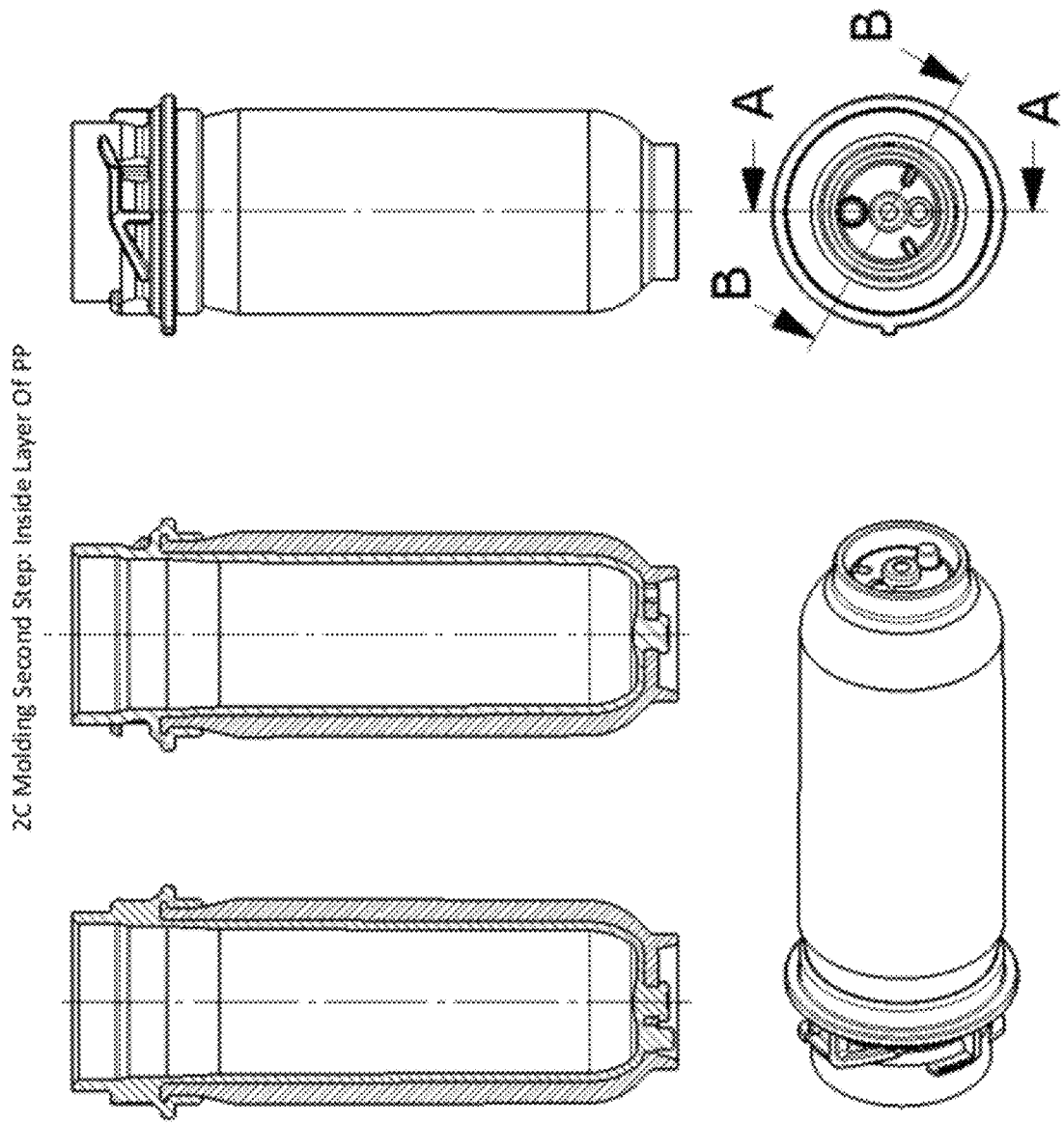
Fig. 7A – Preform standard flair bayonet 2C PET /PP
2C Molding Second Step: Inside Layer Of PP

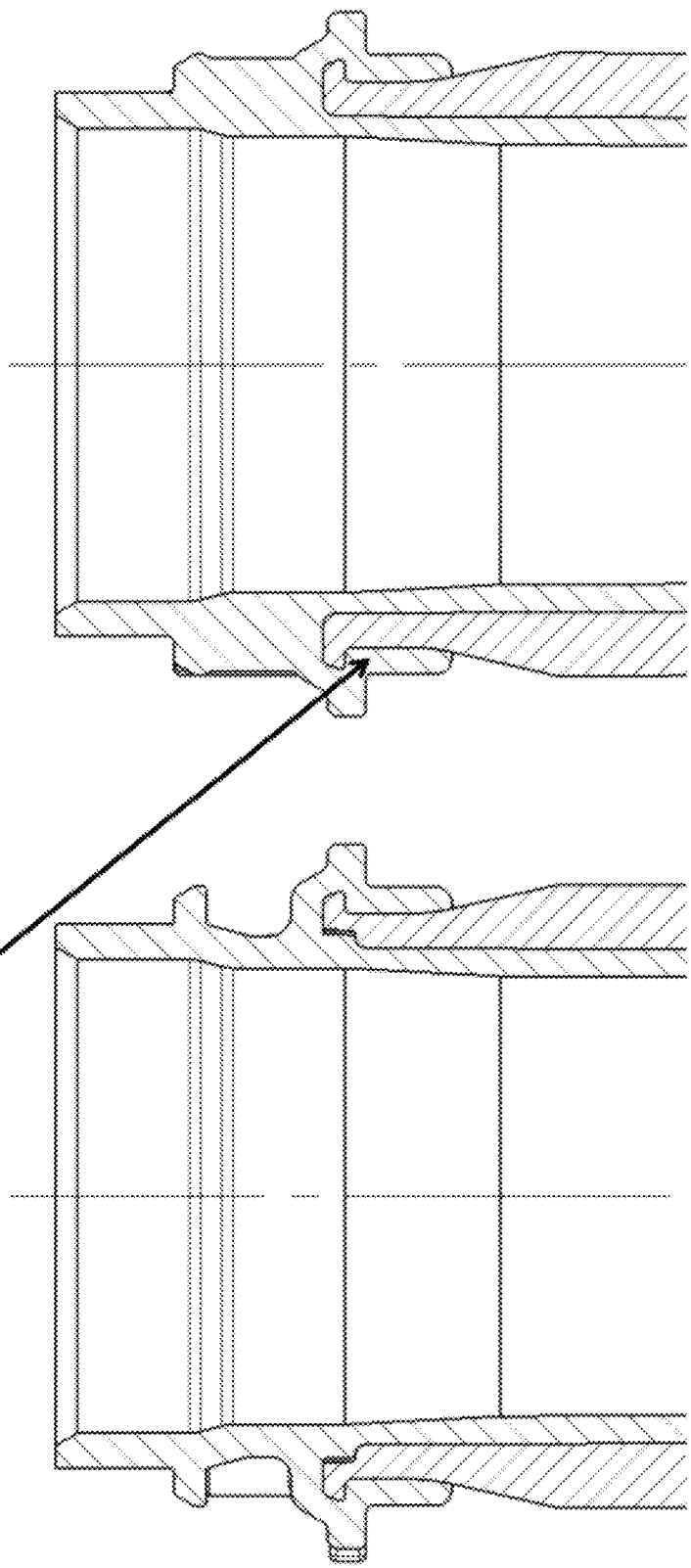
Fig. 7B – Preform Standard Flair Bayonet 2C PET/PP
Special geometry to get a tight sealed connection between inside PP layer and outside PET layer, the inside PP layer is molded over the PET outside layer. By shrinkage of the inner material there occurs a tight fit connection which is air tight at over and under pressures

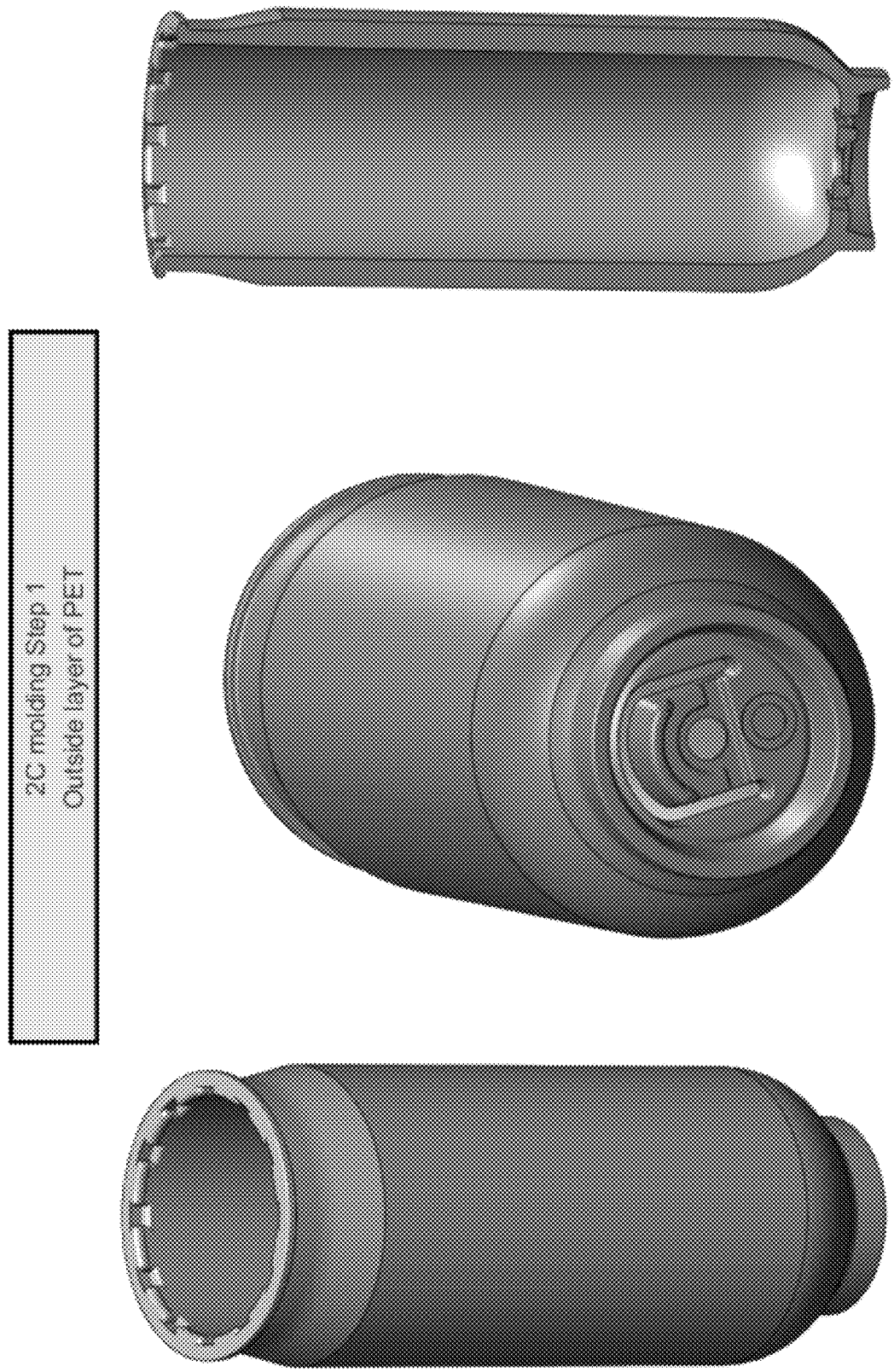
Fig. 8 – Preform Standard Flair bayonet 2C PET/PET

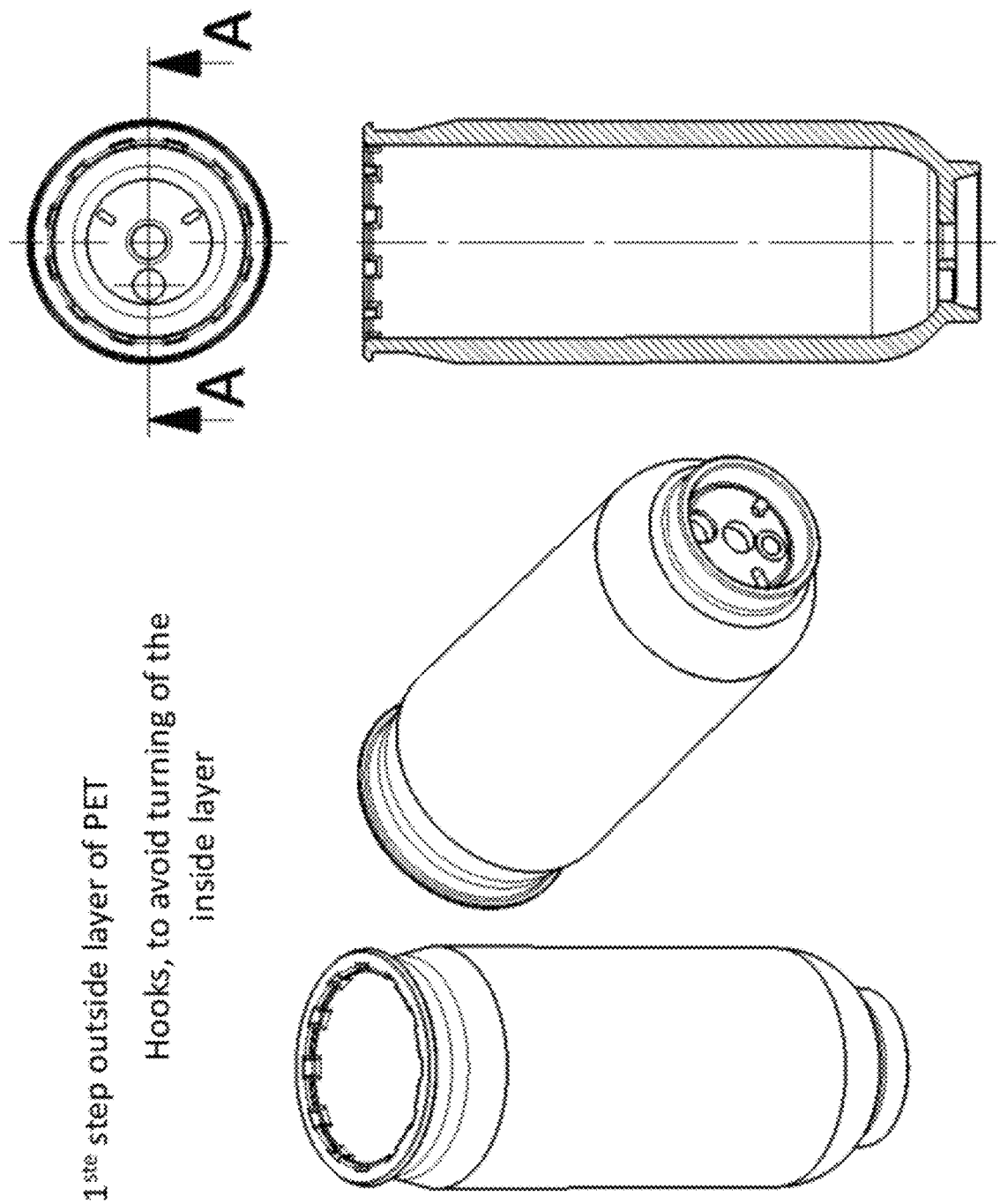

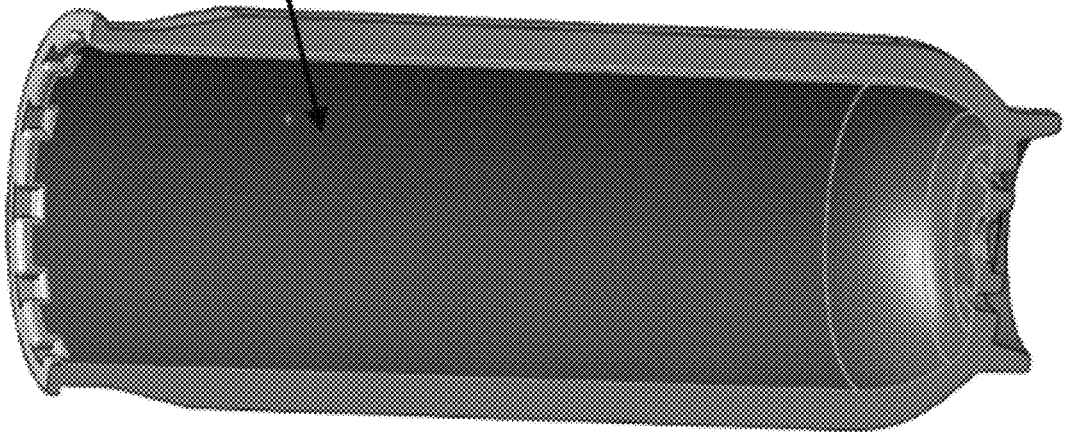
Fig. 9 – Preform Standard Flair bayonet 2C PET/PET

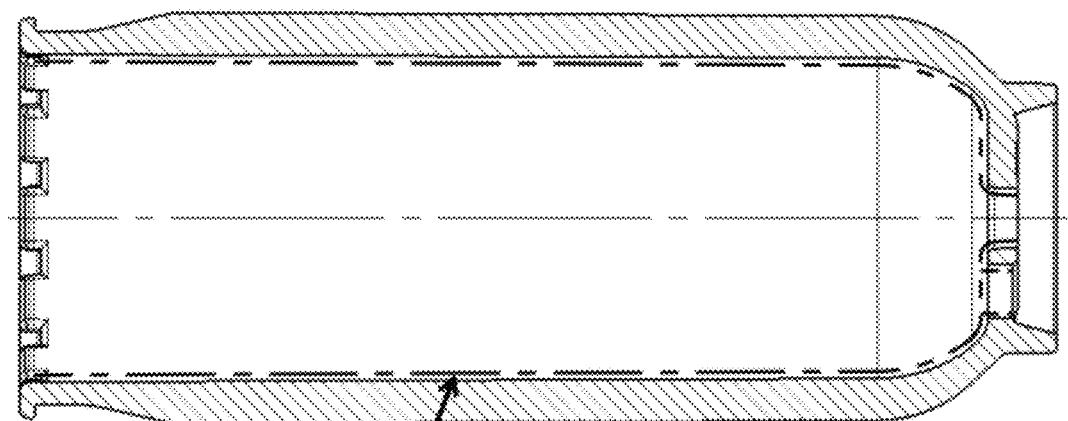
Fig. 9A - Preform standard flair bayonet 2C PET/PET

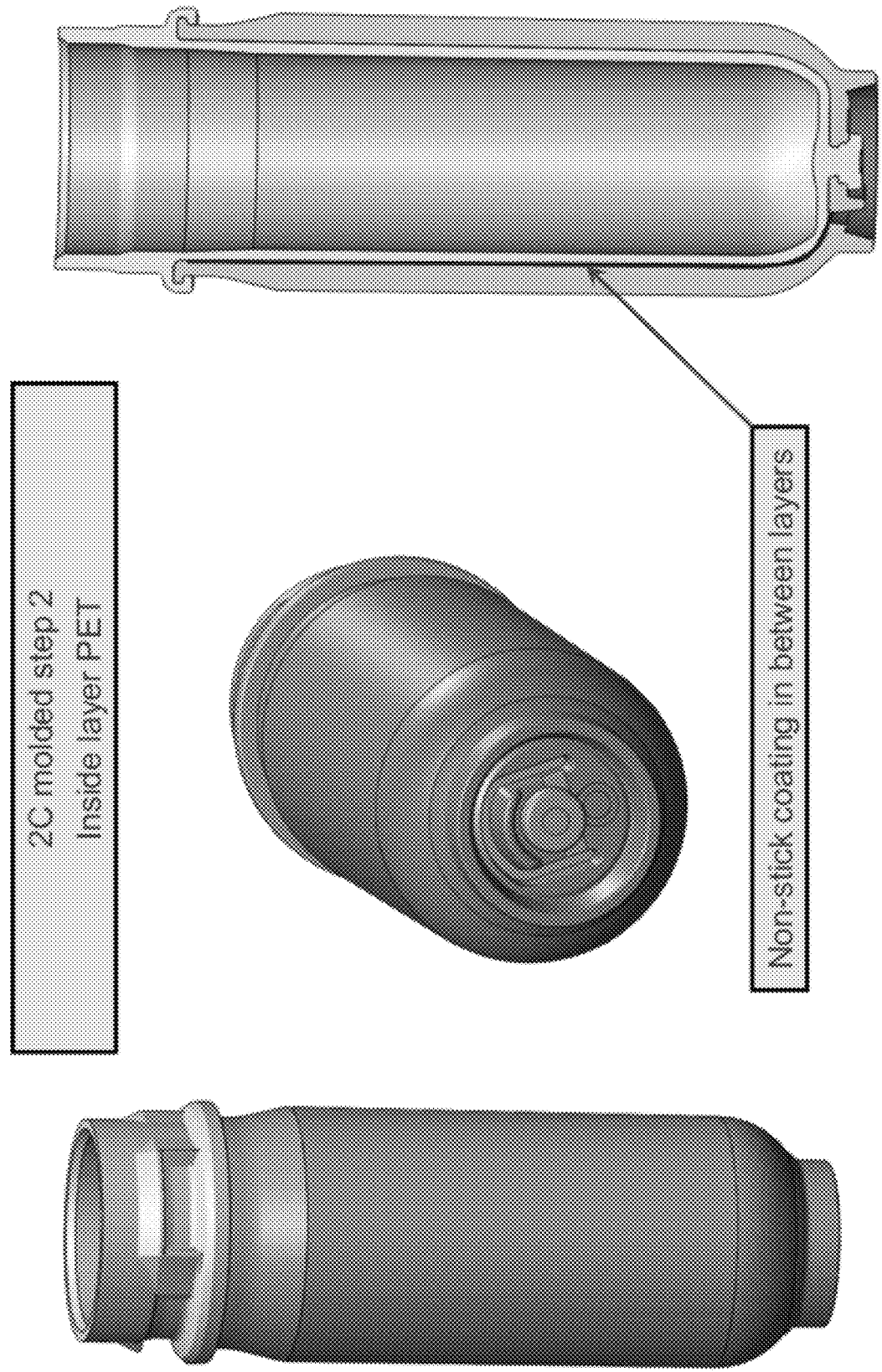
Fig. 10 – Preform Standard Flair bayonet 2C PET/PET

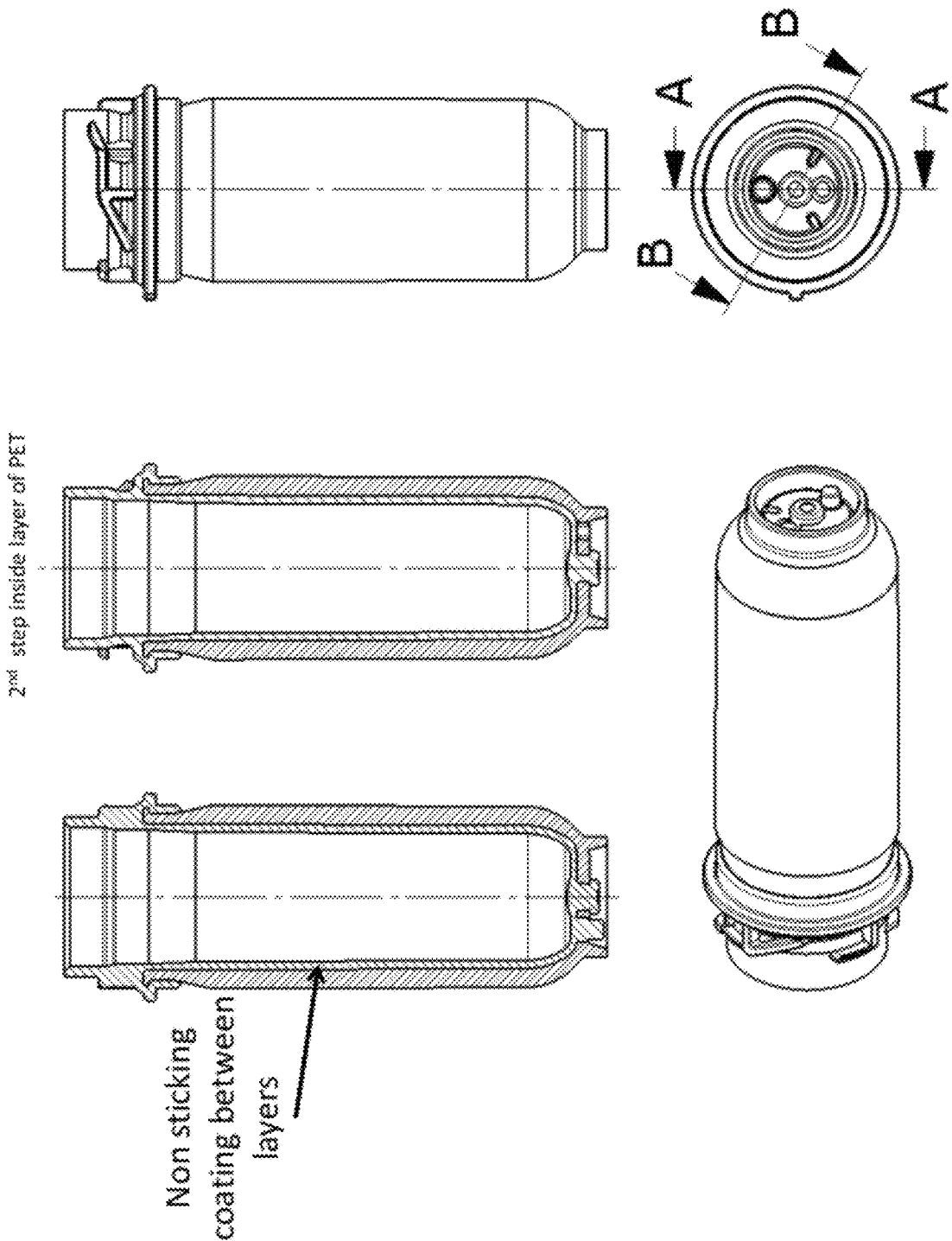

Fig. 11 - Preform Standard Flair Bayonet 2C PET /PET Inside Layer First

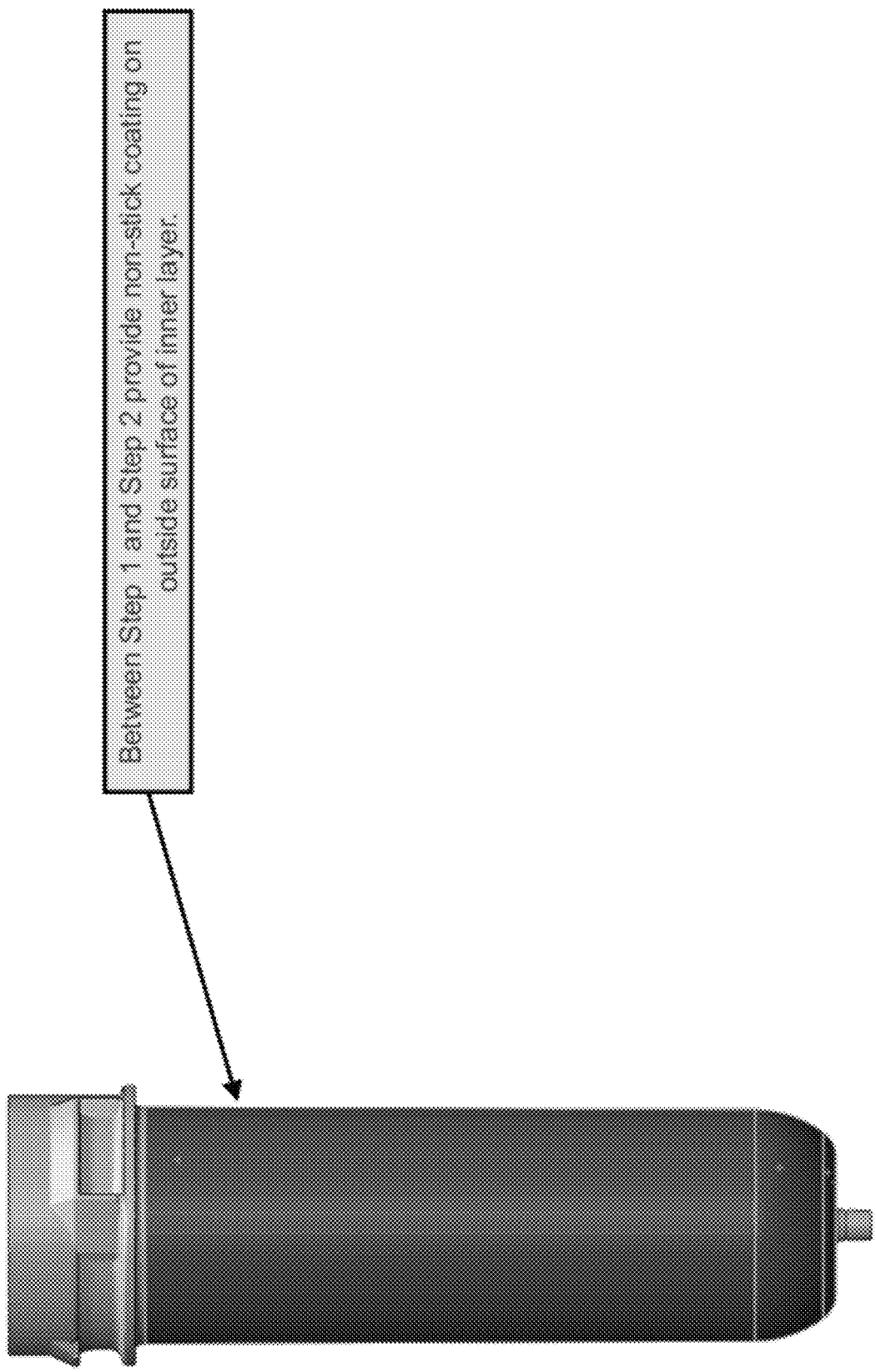
Fig. 12 – Preform Standard Flair Bayonet 2C PET/PET Mold Inside Layer First

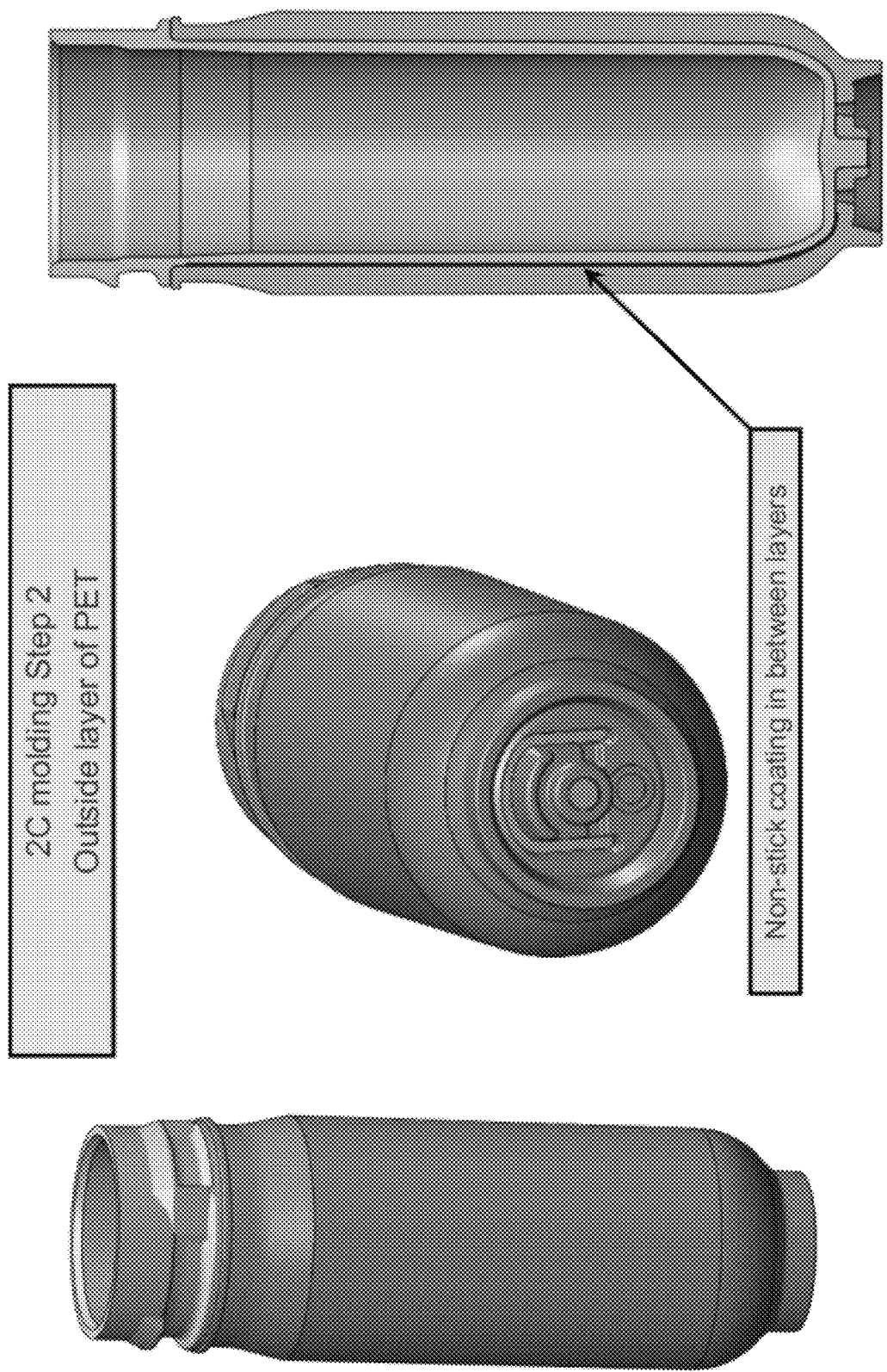
Fig. 13 – Preform Standard Flair bayonet 2C PET /PET Inside layer First

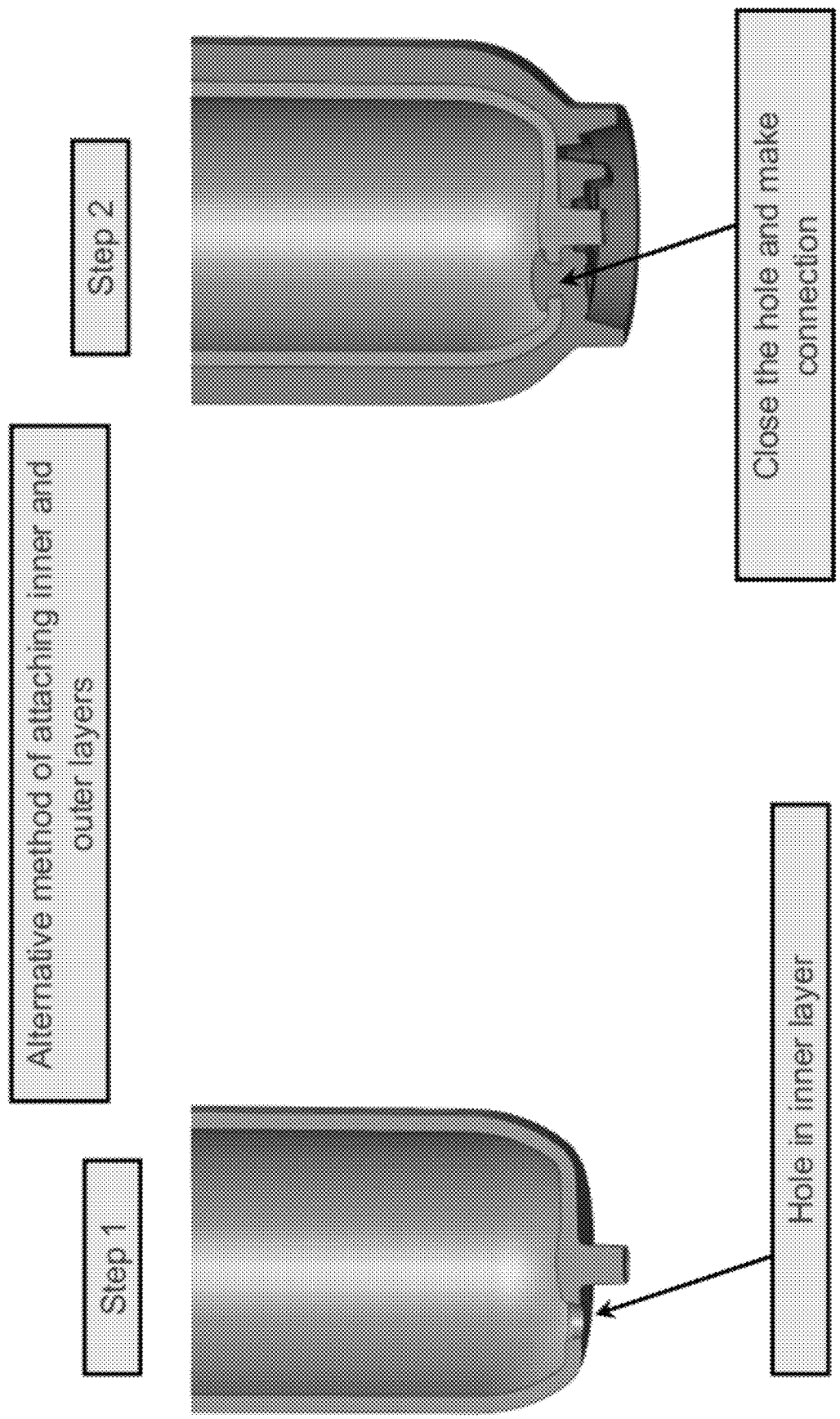

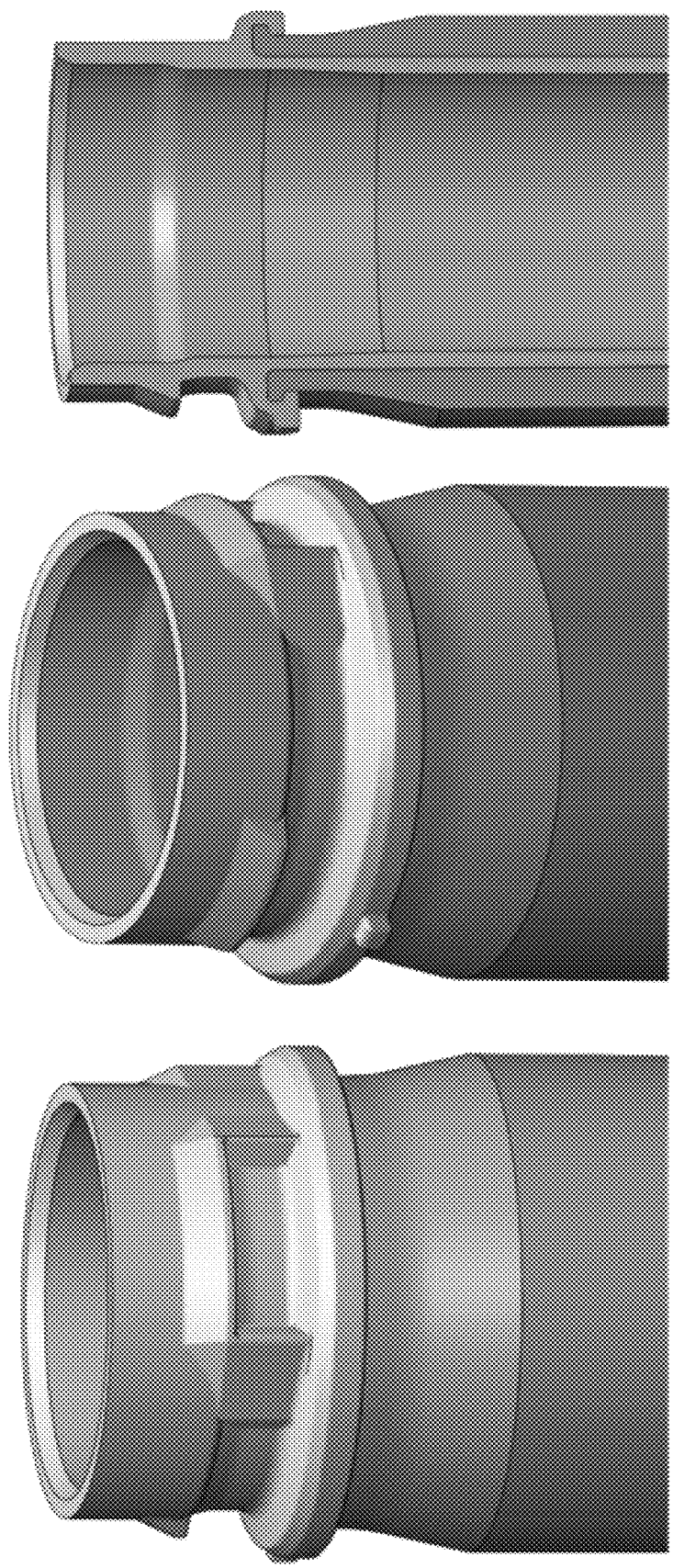
Fig. 15 - Preform With OpUs Neck Finish (Snap-on/Bayonet)
(Note horizontal ribs - if use vertical ribs, the dispenser or cap is no longer removable. Then a user cannot turn the dispenser or cap for removal)

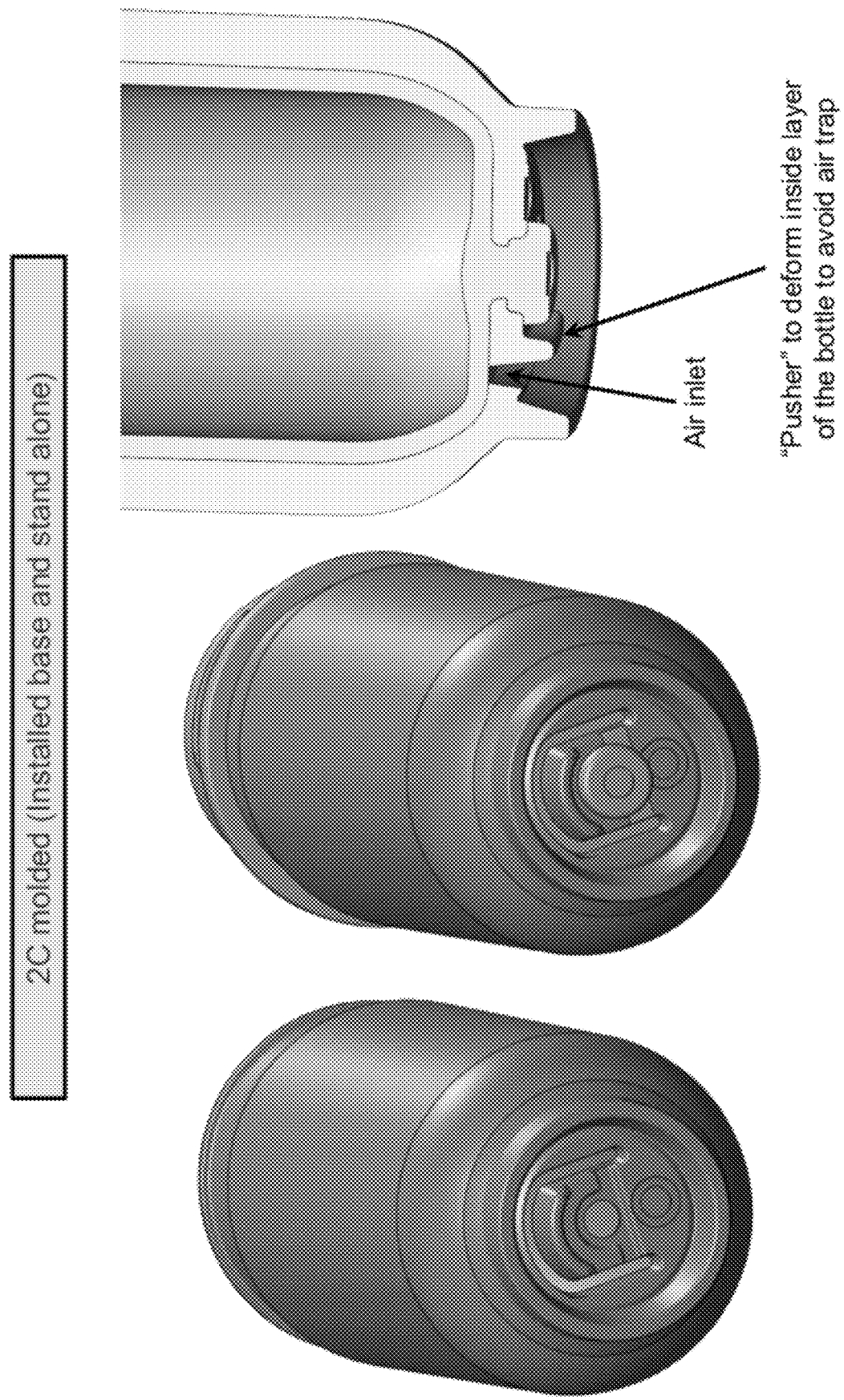
Fig. 16 – Preform Bayonet Bottom Principle

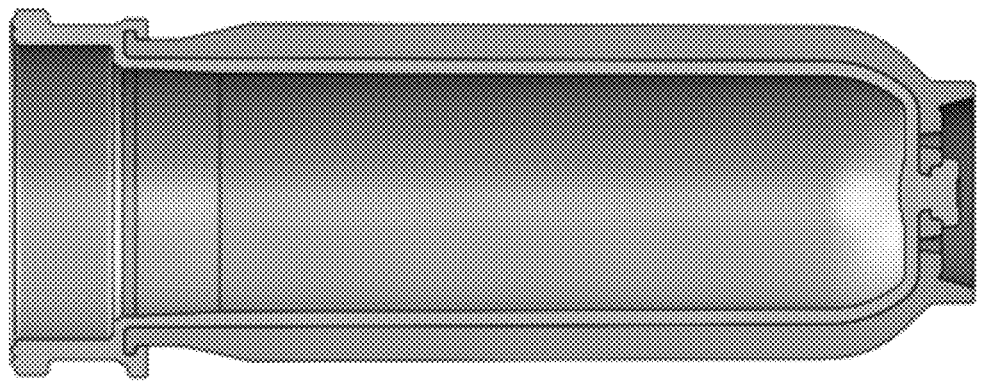
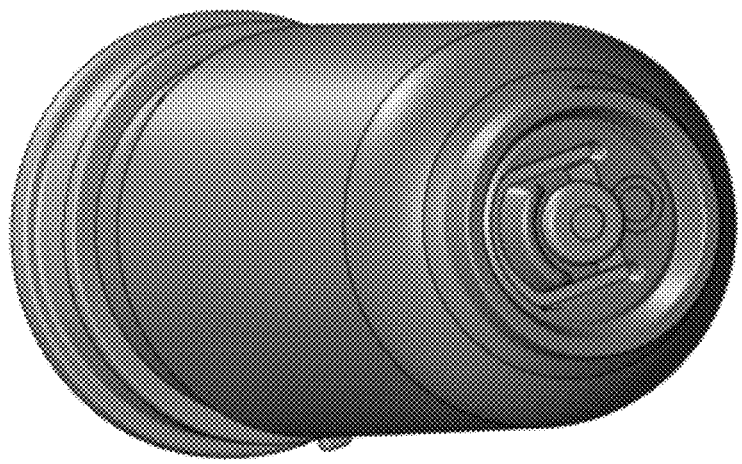
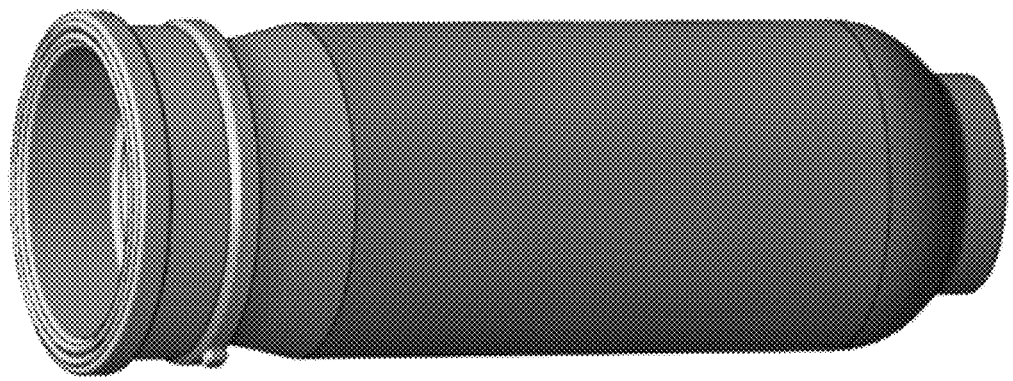
Fig. 17 – Preform "Crimp – Neck" PET/PP

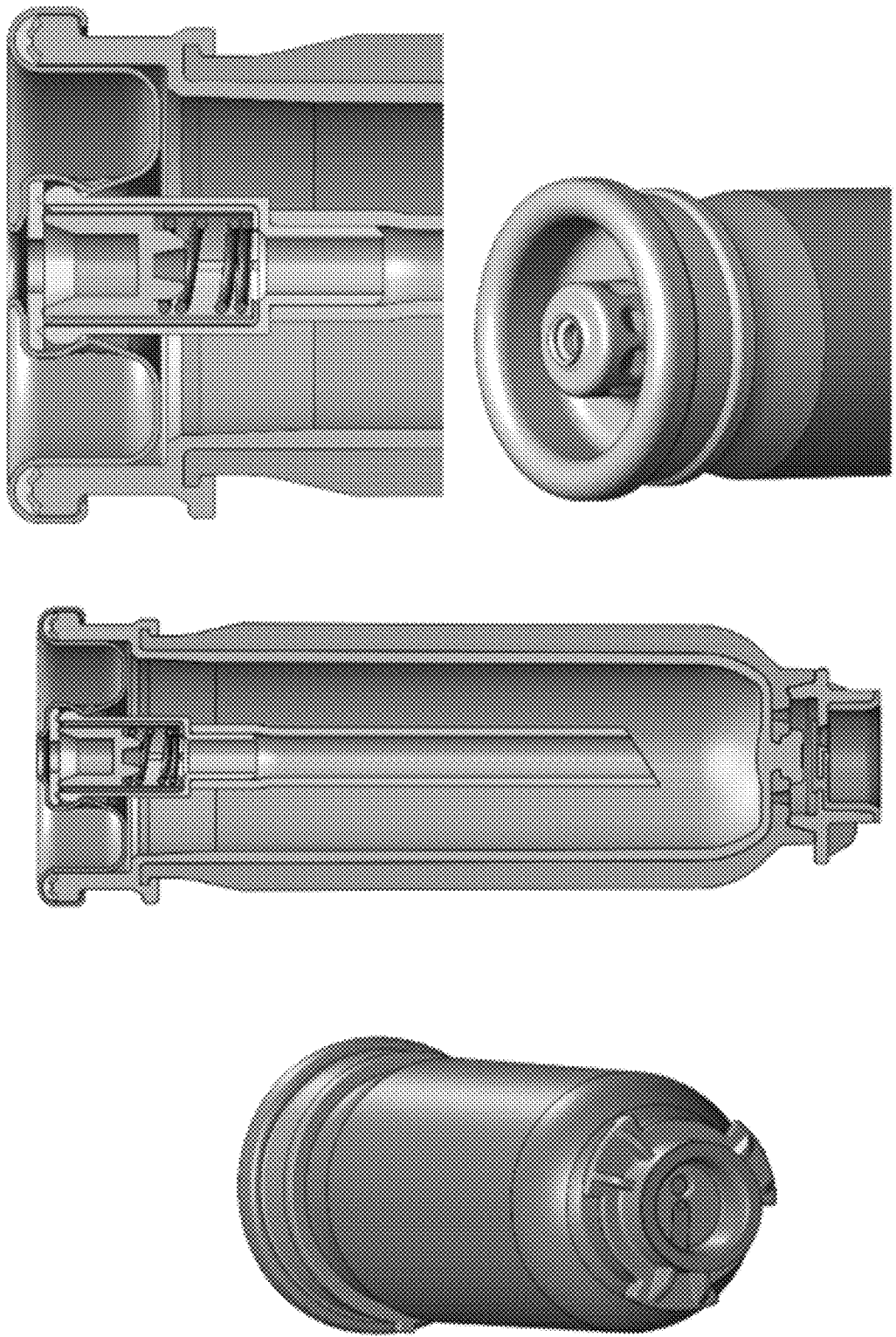
Fig. 18 – Preform "Crimp – Neck"
(Valve with or without tube, also with or without airvalve)

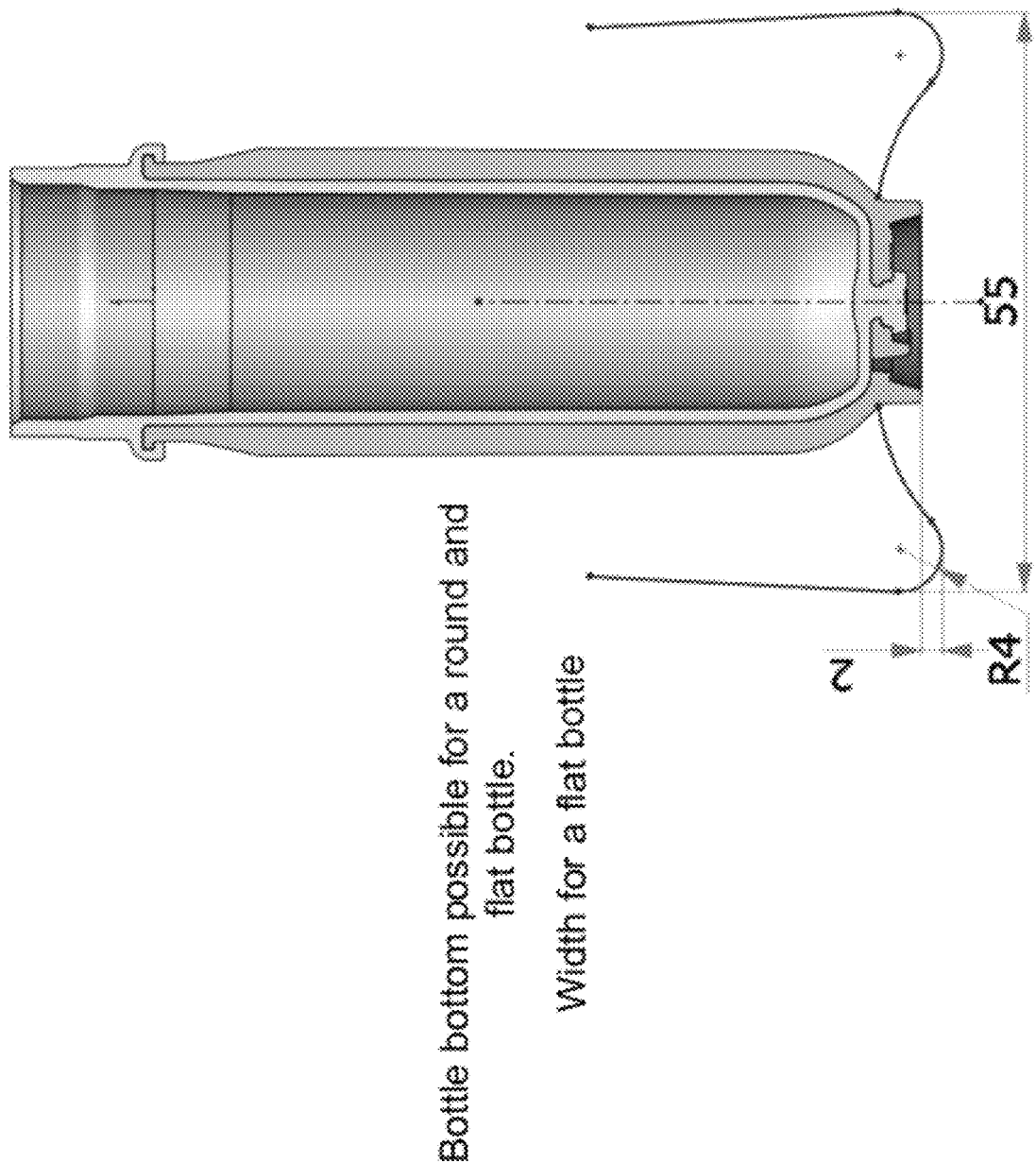

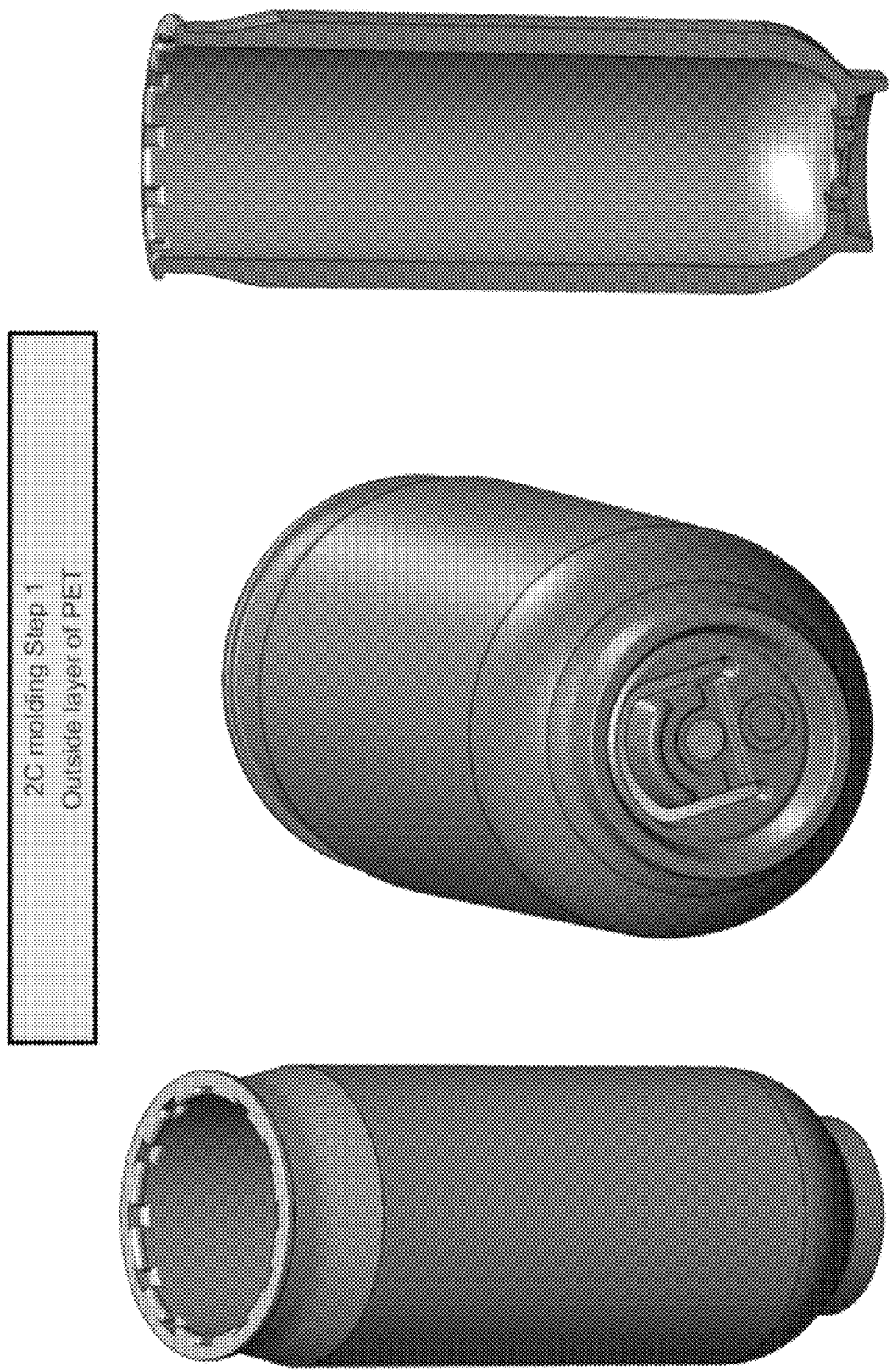
Fig. 20 – Preform Piston Flair Bayonet 2C PET/PET

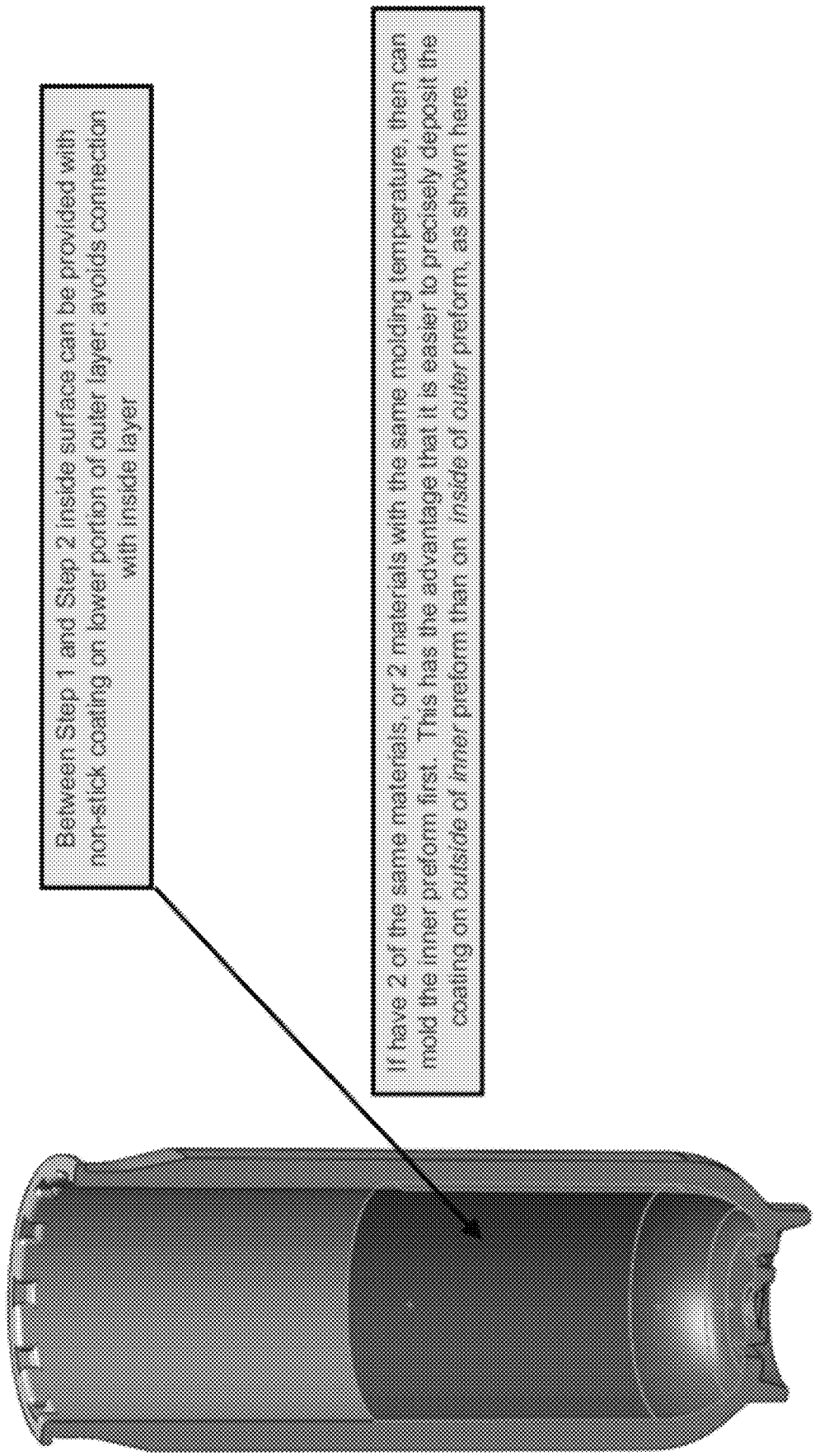
Fig. 21 – Preform Piston Flair Bayonet 2C PET /PET

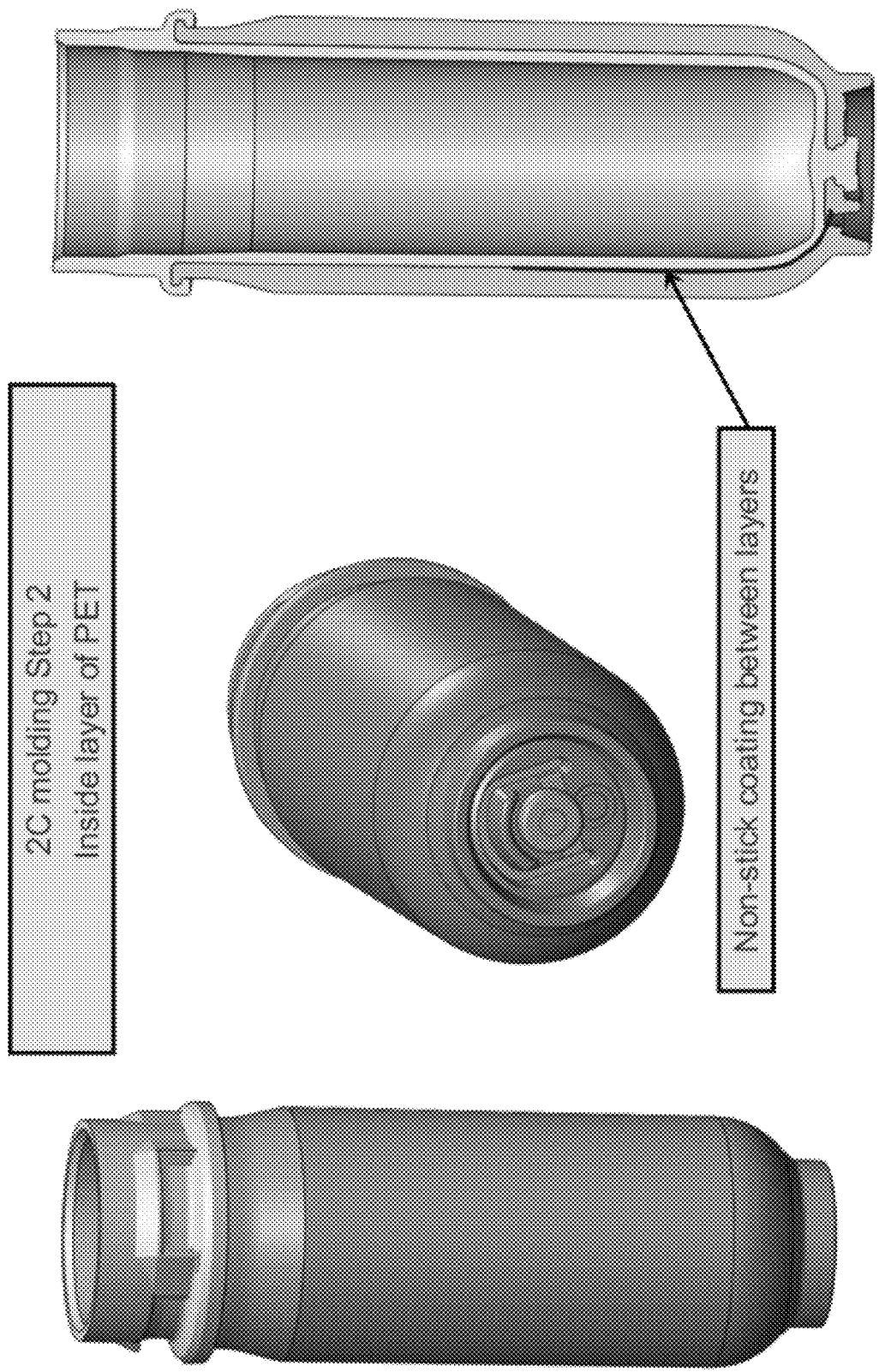
Fig. 22 – Preform Piston Flair Bayonet 2C PET /PET

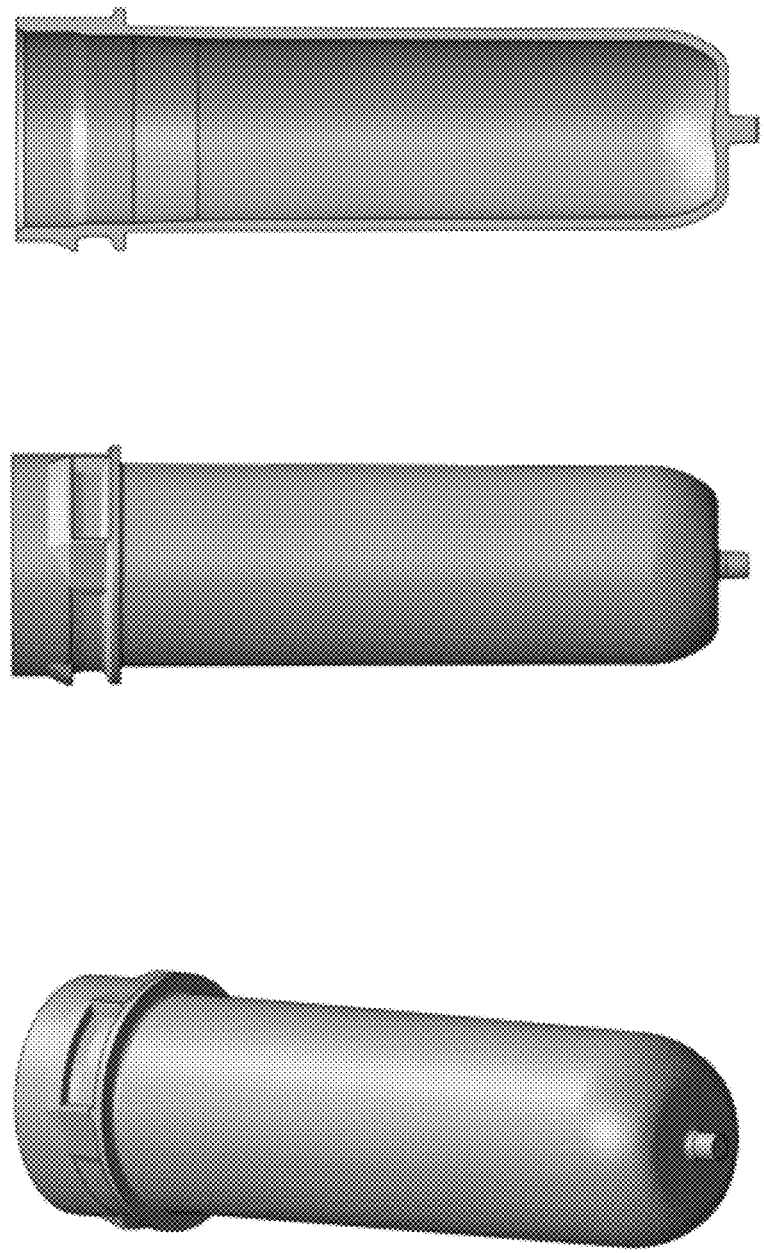
Fig. 23 – Preform Piston Flair Bayonet 2C PET/PET, Inside Layer First

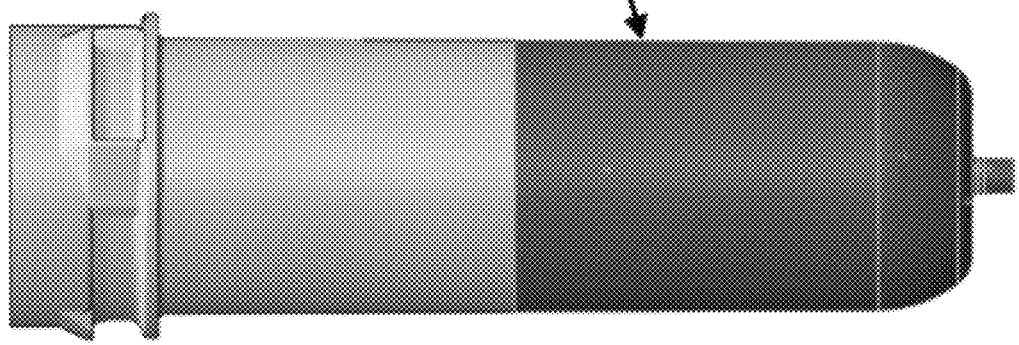
Fig. 24 – Preform Piston Flair Bayonet 2C PET/PET, Inside Layer First

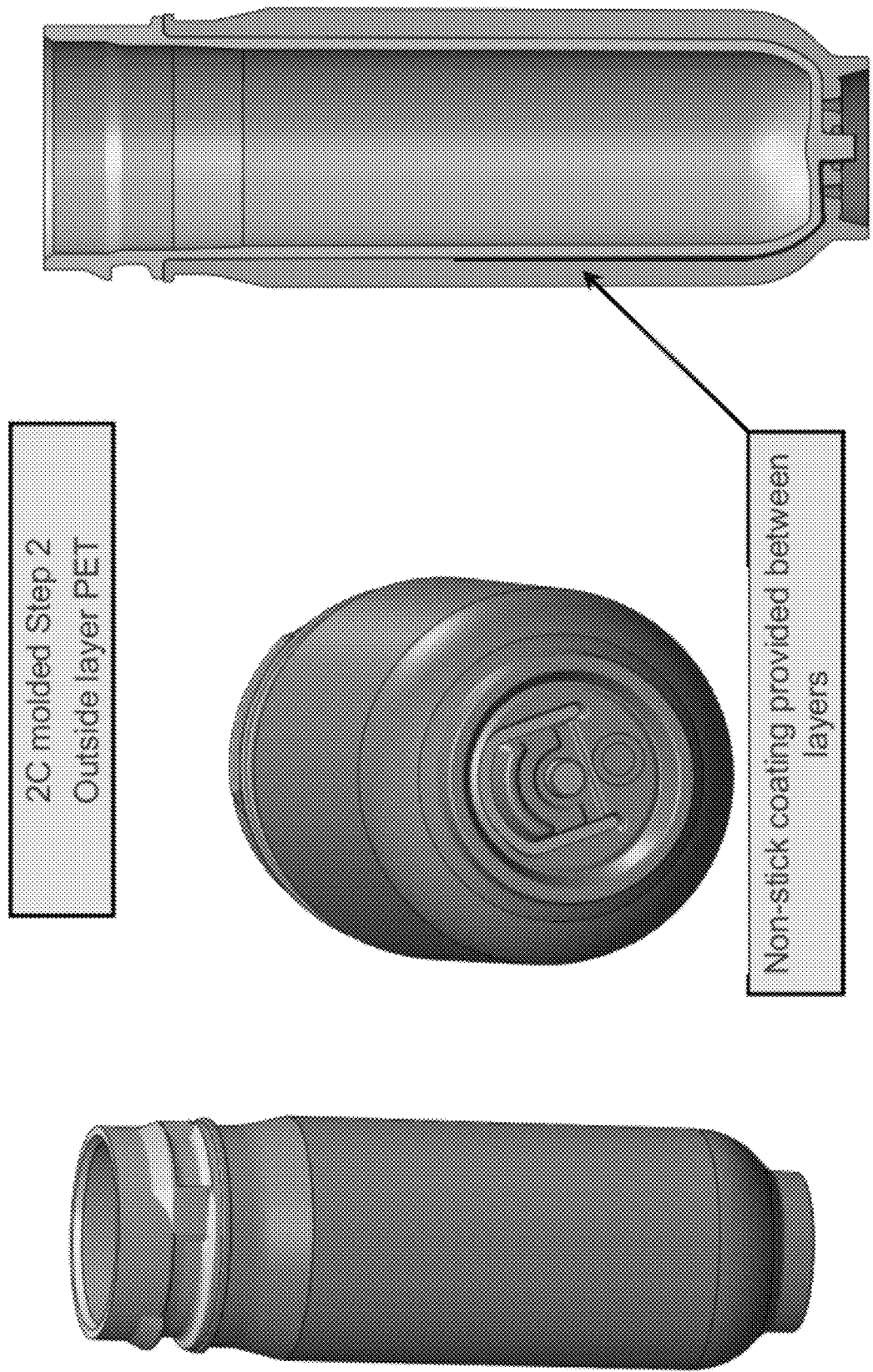
Fig. 25 – Preform Piston Flair Bayonet 2C PET/PET, Inside Layer First

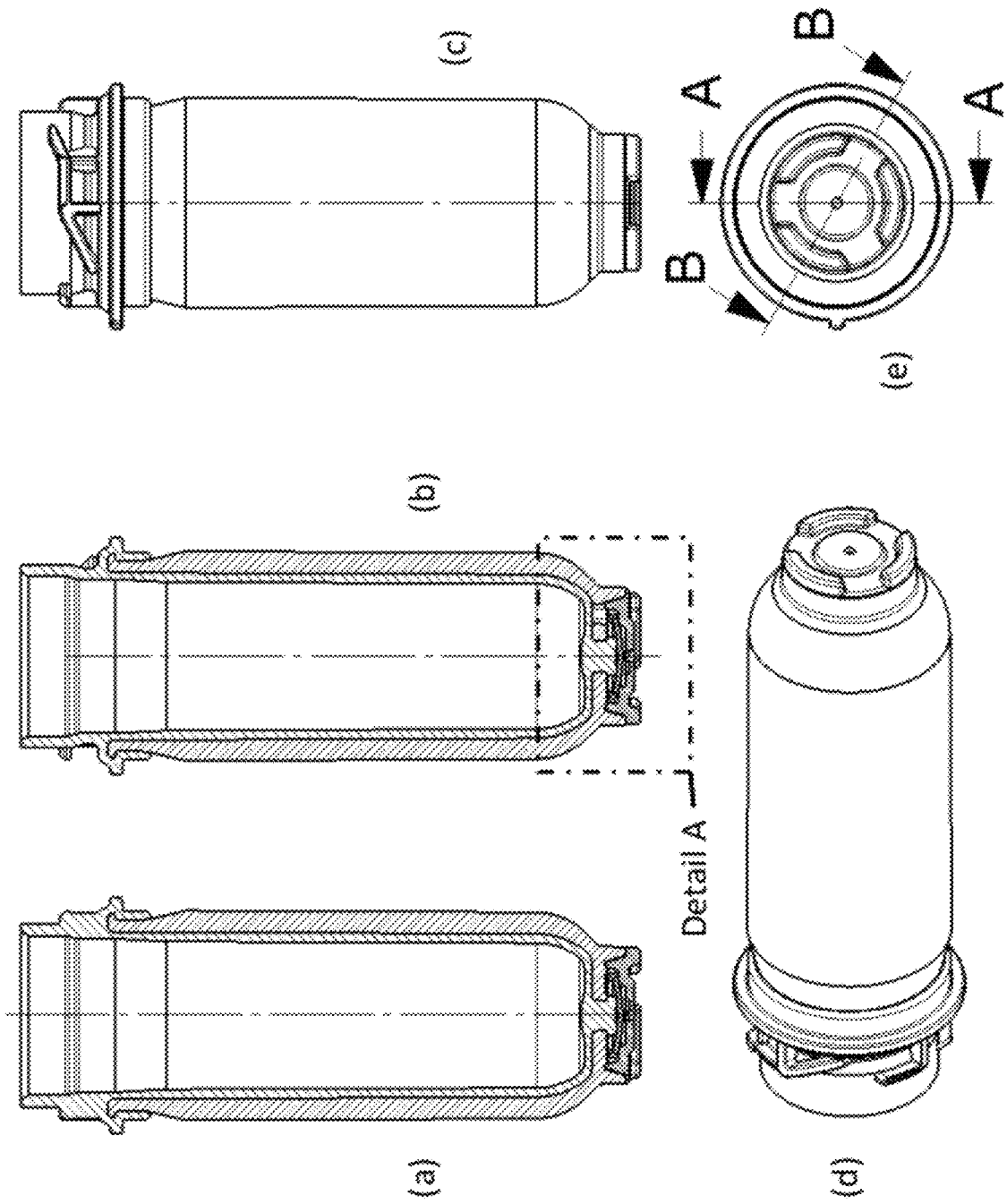
Fig. 26A – Preform With One Way Valve

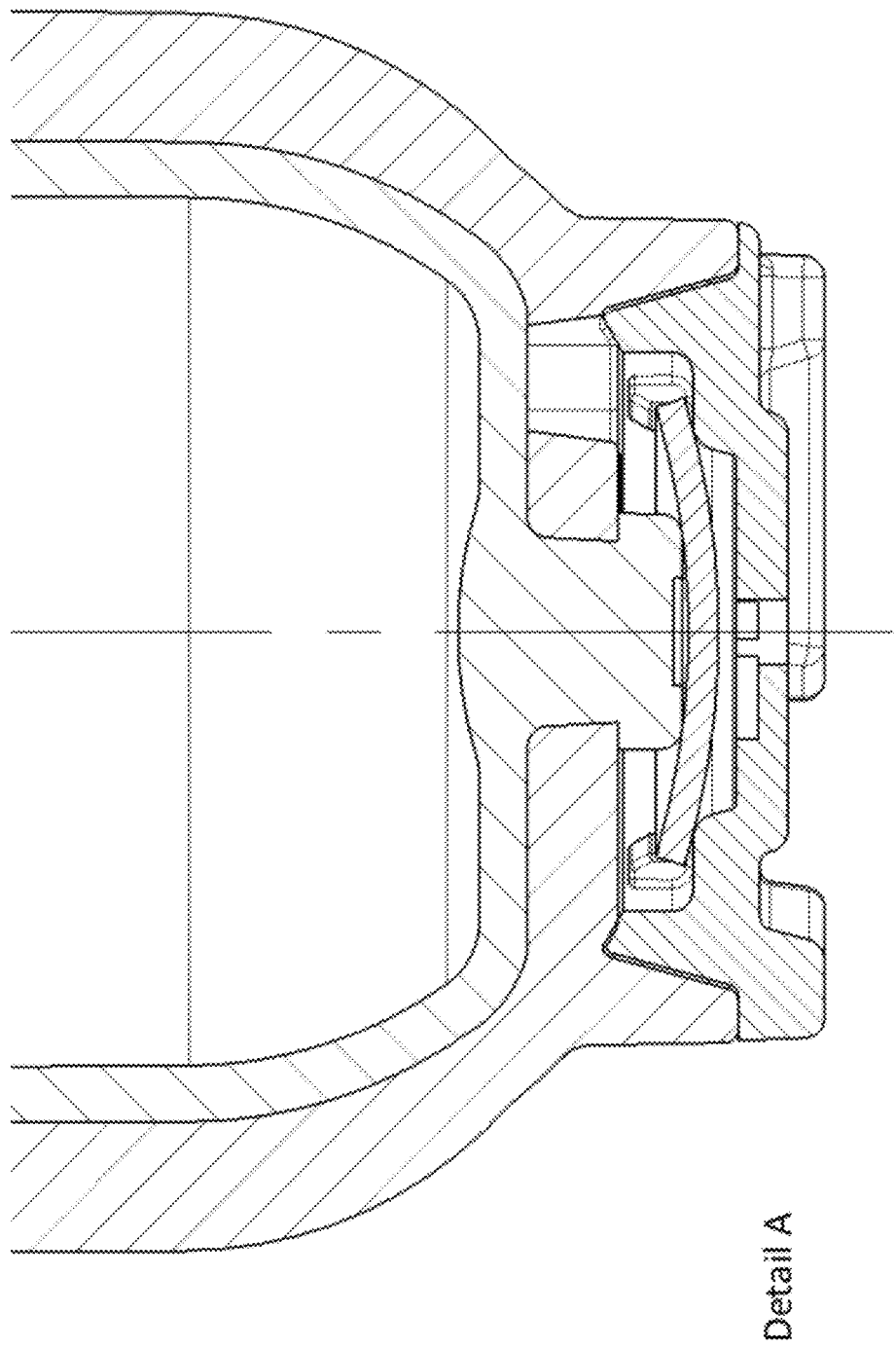
Fig. 26B - Preform With One Way Valve
Detail A
To avoid refilling of the bottle after use, it is possible to provide the preform with a one way valve. It is a loose plate of flexible plastic, catched in a PET valve seat which is connected to the preform by spin welding.

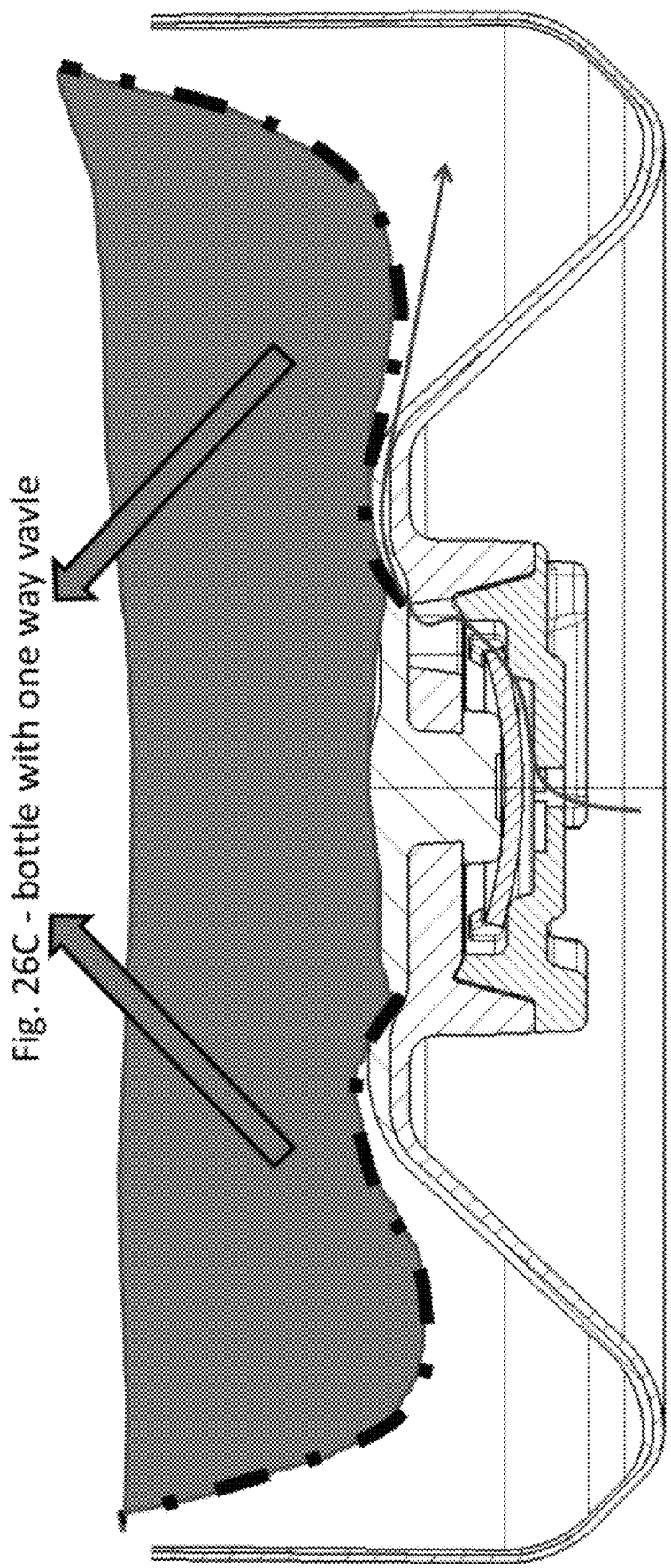

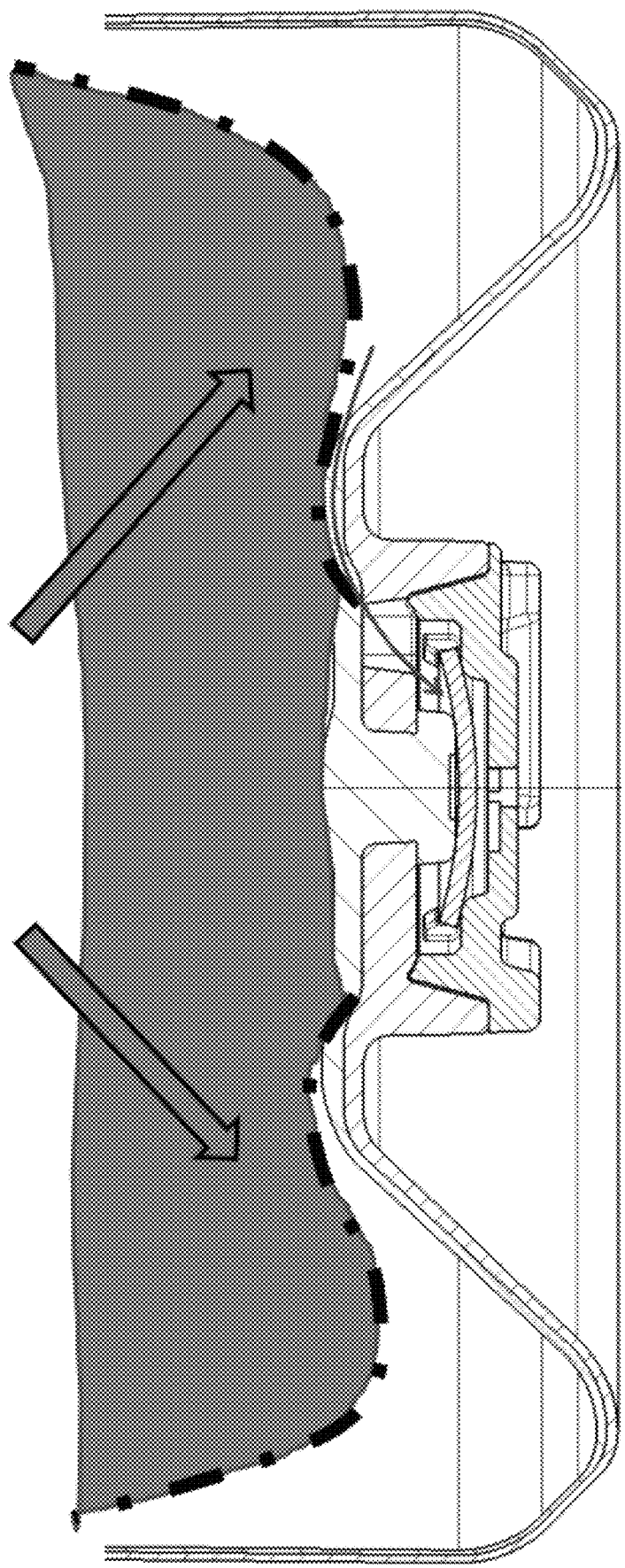
Fig. 26D - Bottle With One Way Valve
When there is over pressure in the bottle, the air between the layers try to flow back, but the one way valve will block the air flow. This principle is used for a squeeze flair.

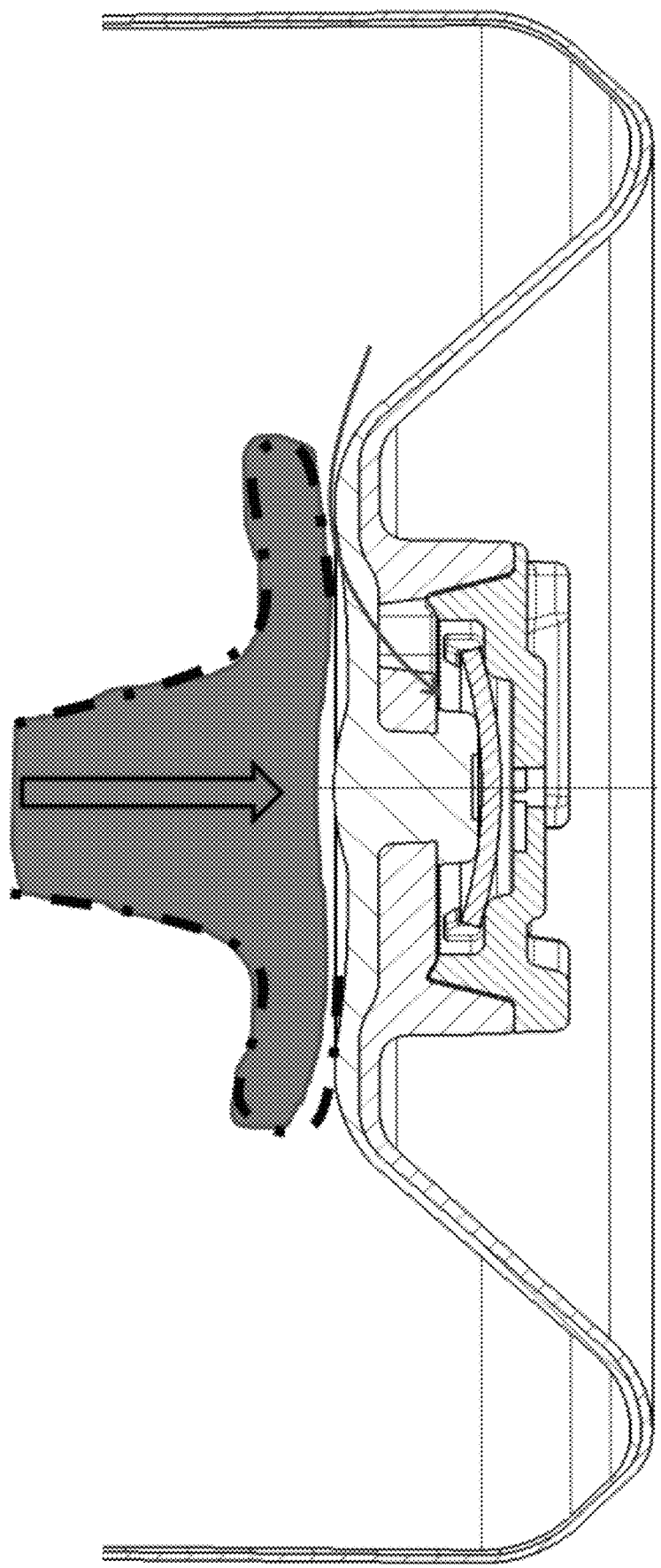

Fig. 26E - Bottle With One Way Valve

When the bottle is empty and the consumer tries to refill the bottle, it is impossible because the air between the layers tries to flow back, but the one way valve blocks the air flow. Moreover, the central hole in the valve housing is so small that it is impossible to force the valve open by a small pin. When pushing a small pin in the center, the valve will still block

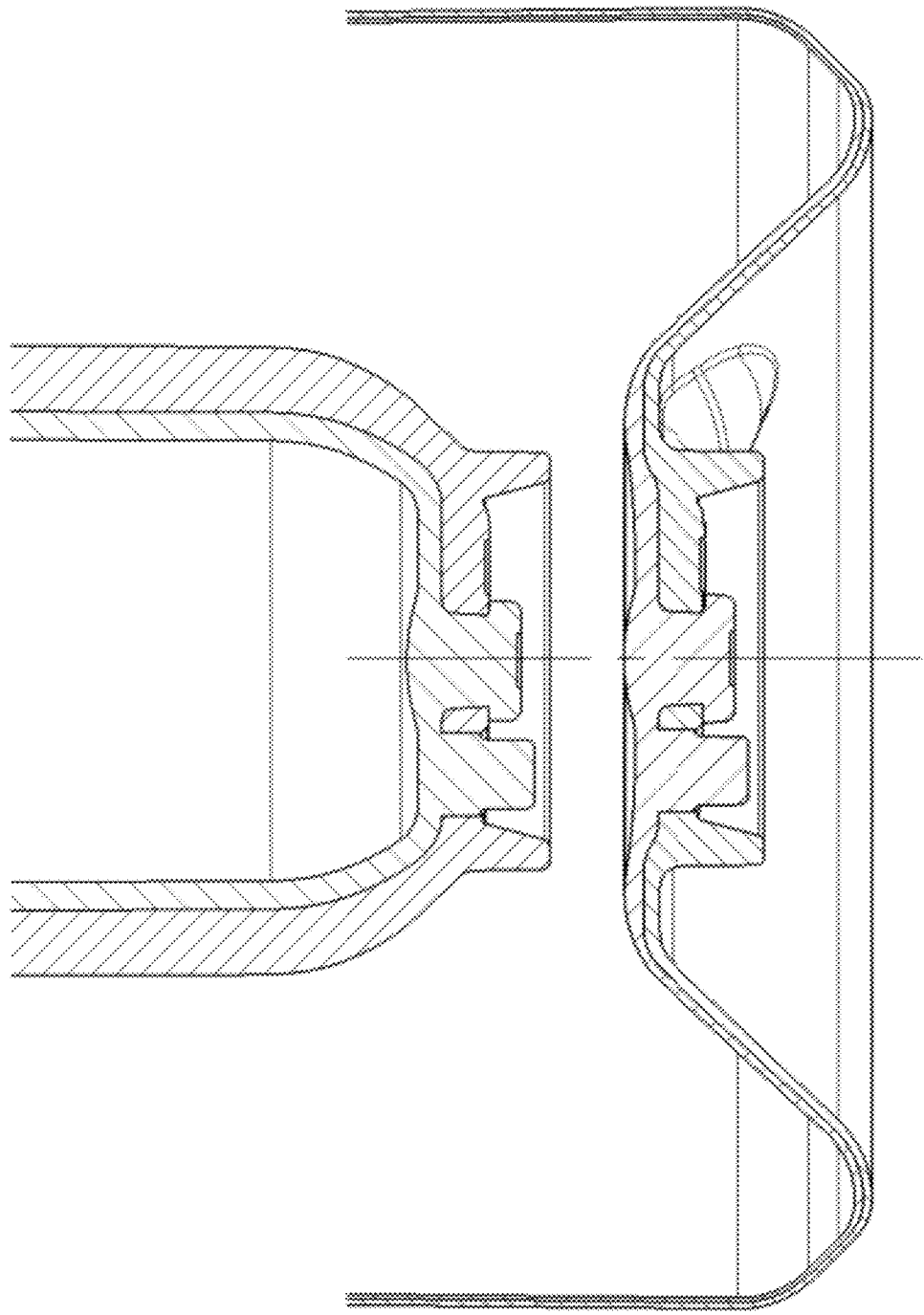

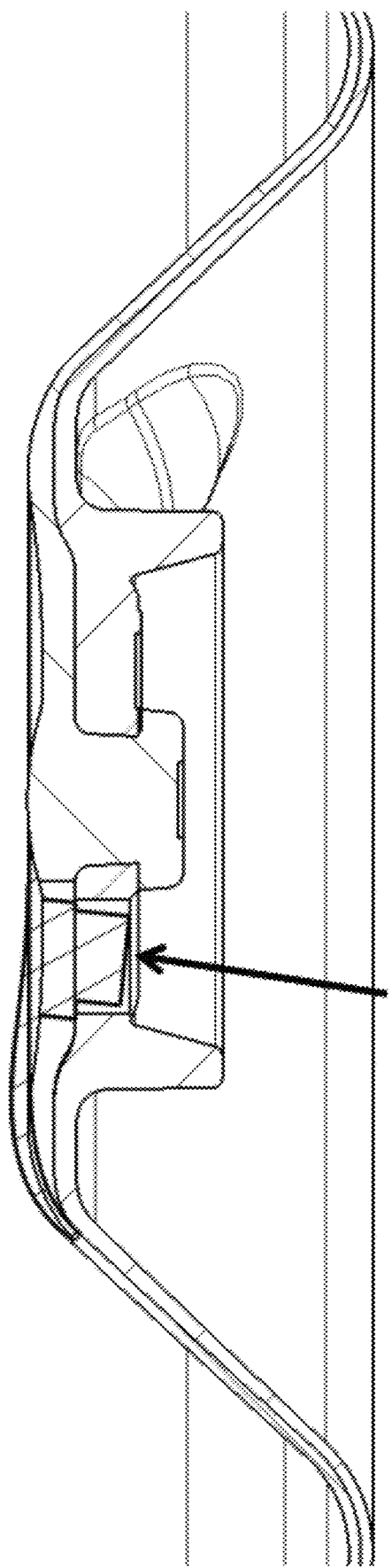
Fig. 26G - Preform/Bottle With One Way Valve

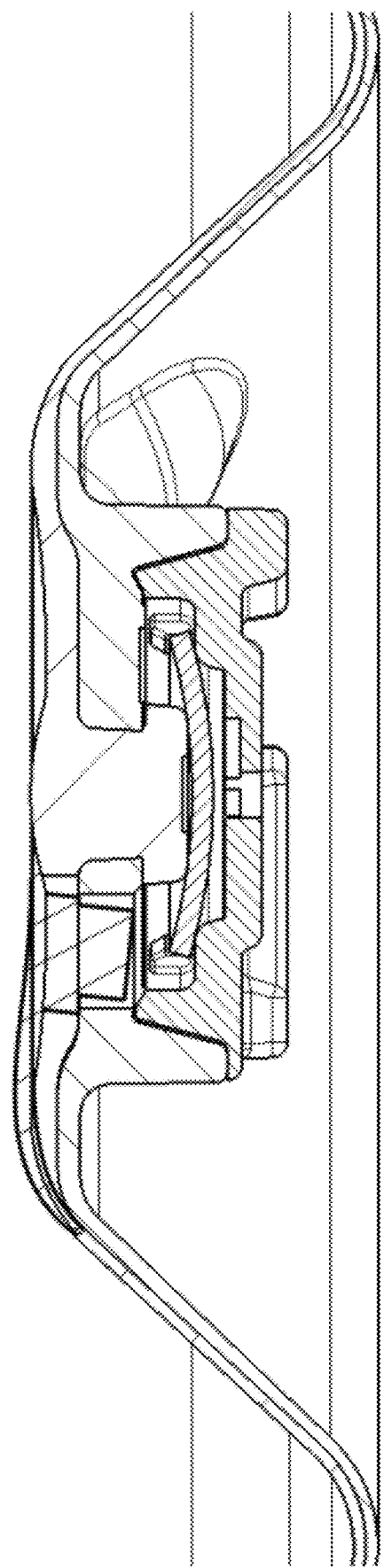
Fig. 26H Preform/Bottle With One Way Valve
After that, assemble the one way valve by spinwelding.

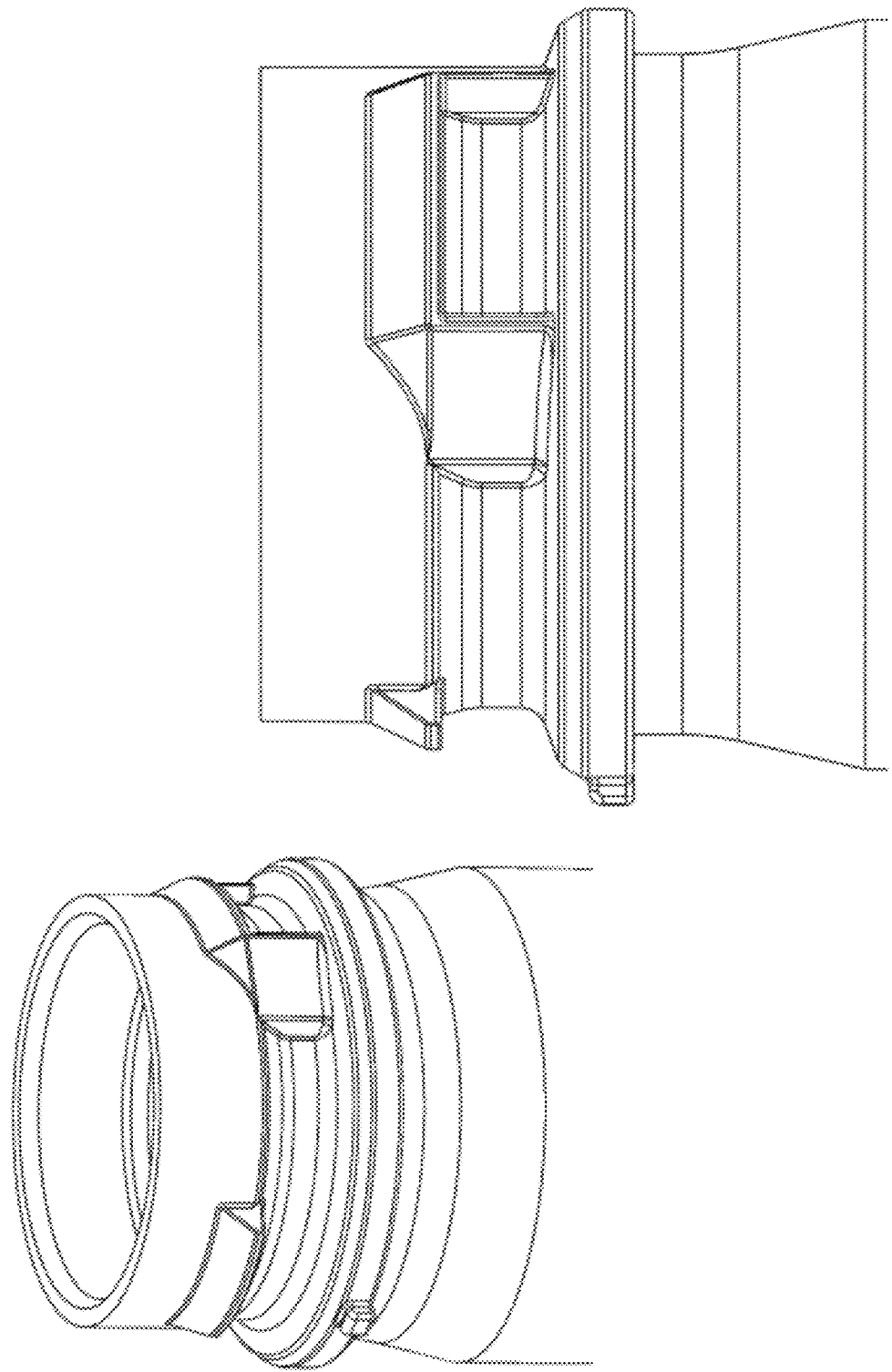
Fig. 27A - 3 Lug Bayonet/Snap-on Neck Finish

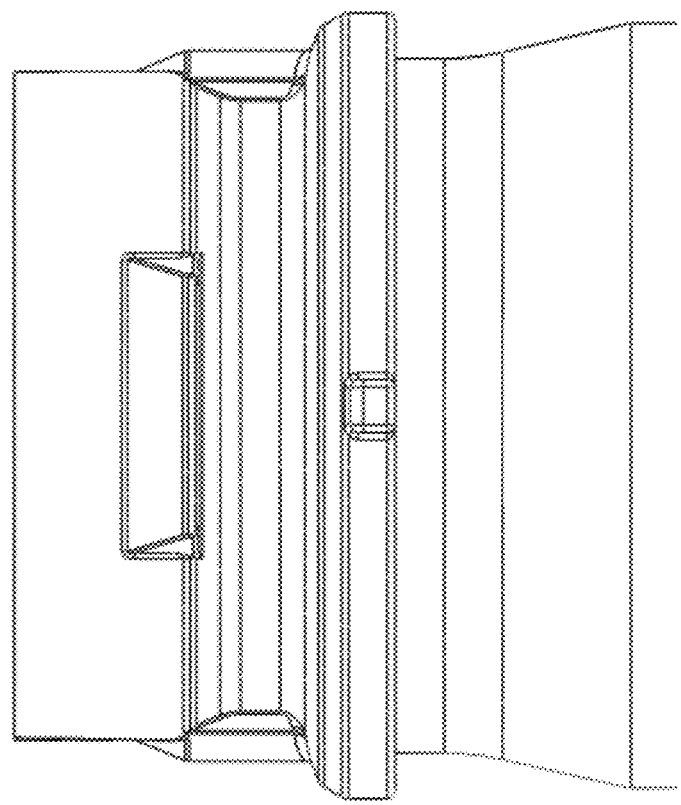
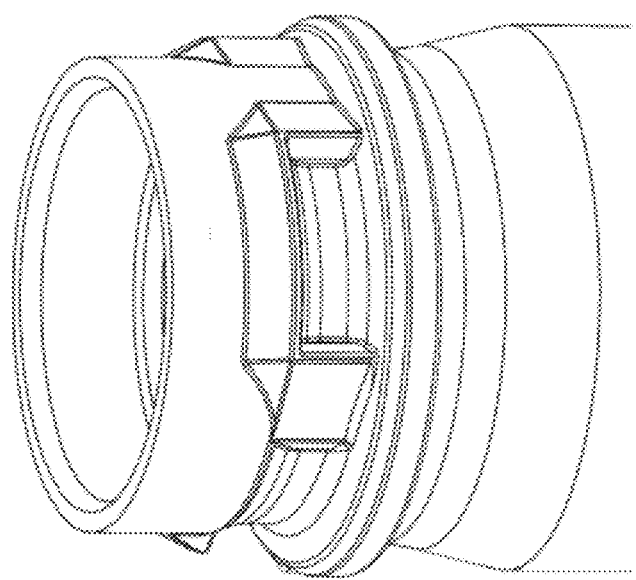
Fig. 27B  3 Lug Bayonet/Snap-on Neck Finish

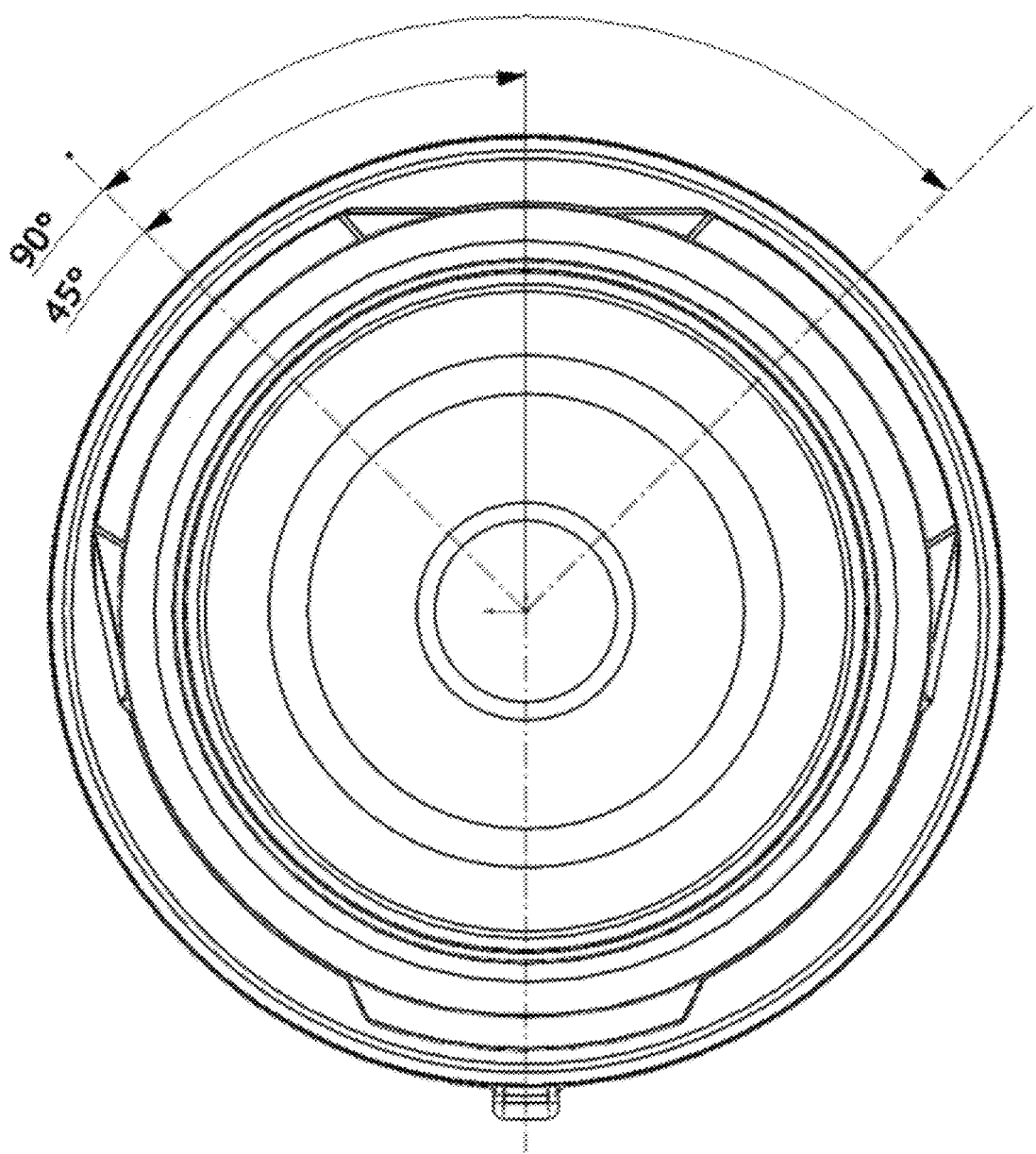
Fig. 27C - 3 Lug Bayonet/Snap-on Neck Finish

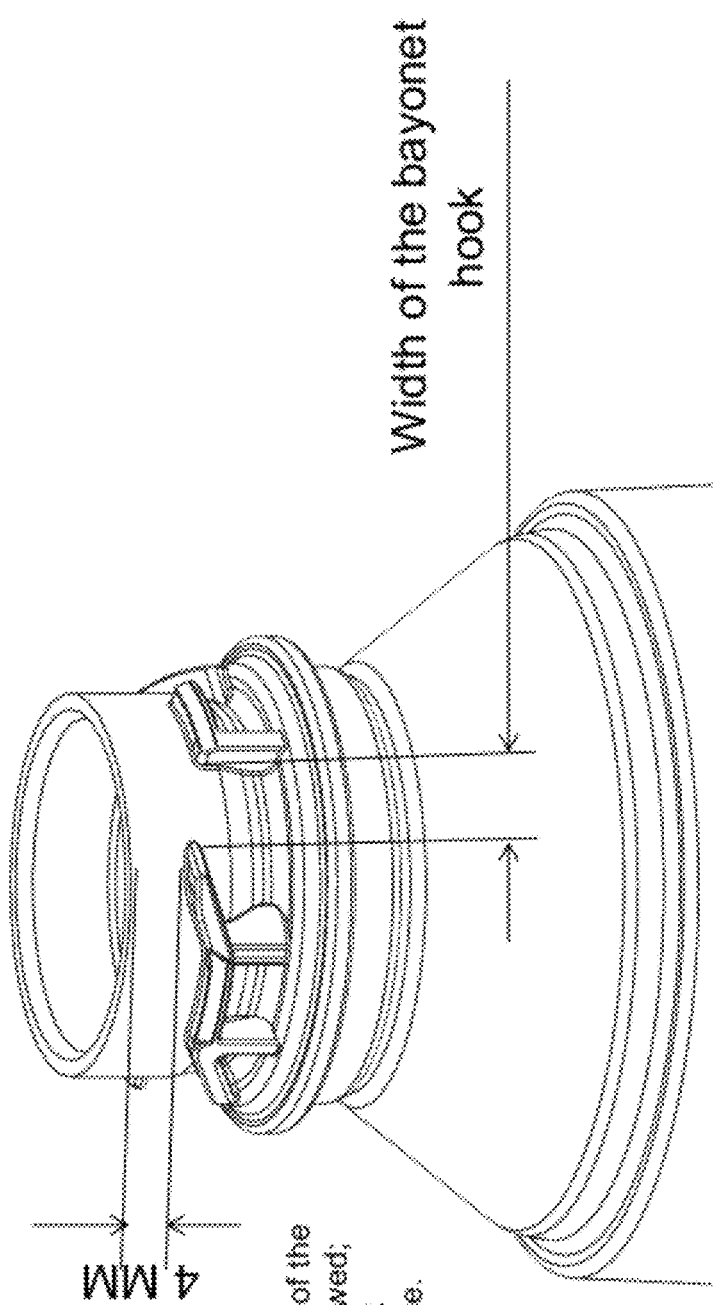
Fig. 27D - 4 Lug Bayonet /Snap-on Neck Finish
The 4 Lug version bottle finish has 4 bayonet/snap-on lugs. Two of them are provided with lead-in and lead-out guidance ribs.
In the upper 4 MM, for example, of the bottle finish, no ribs/lugs are allowed; otherwise there would occur sink marks at the inner sealing surface.

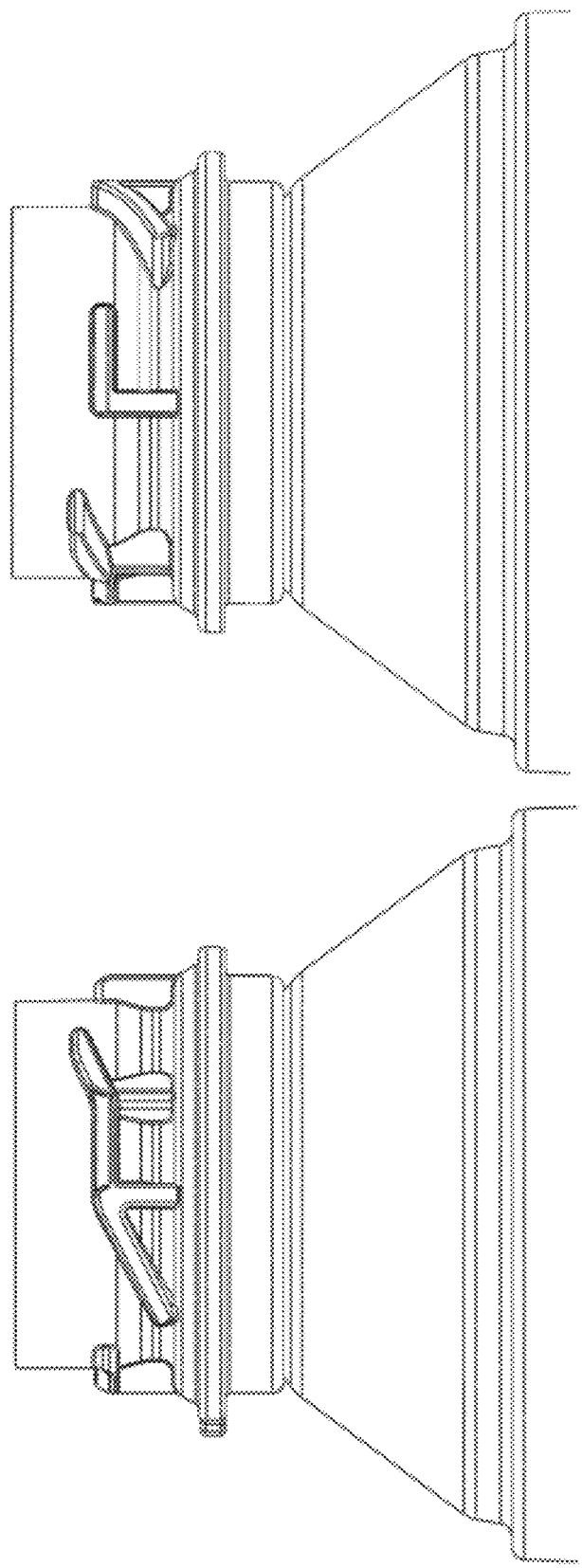
Fig. 27E - 4 Lug Bayonet / Snap-on Neck Finish
Lead-in and lead-out is an advantage during placing and removing of a cover device (e.g., closure); only by making a rotational movement the device will move automatic downward during placing and upwards during removing.

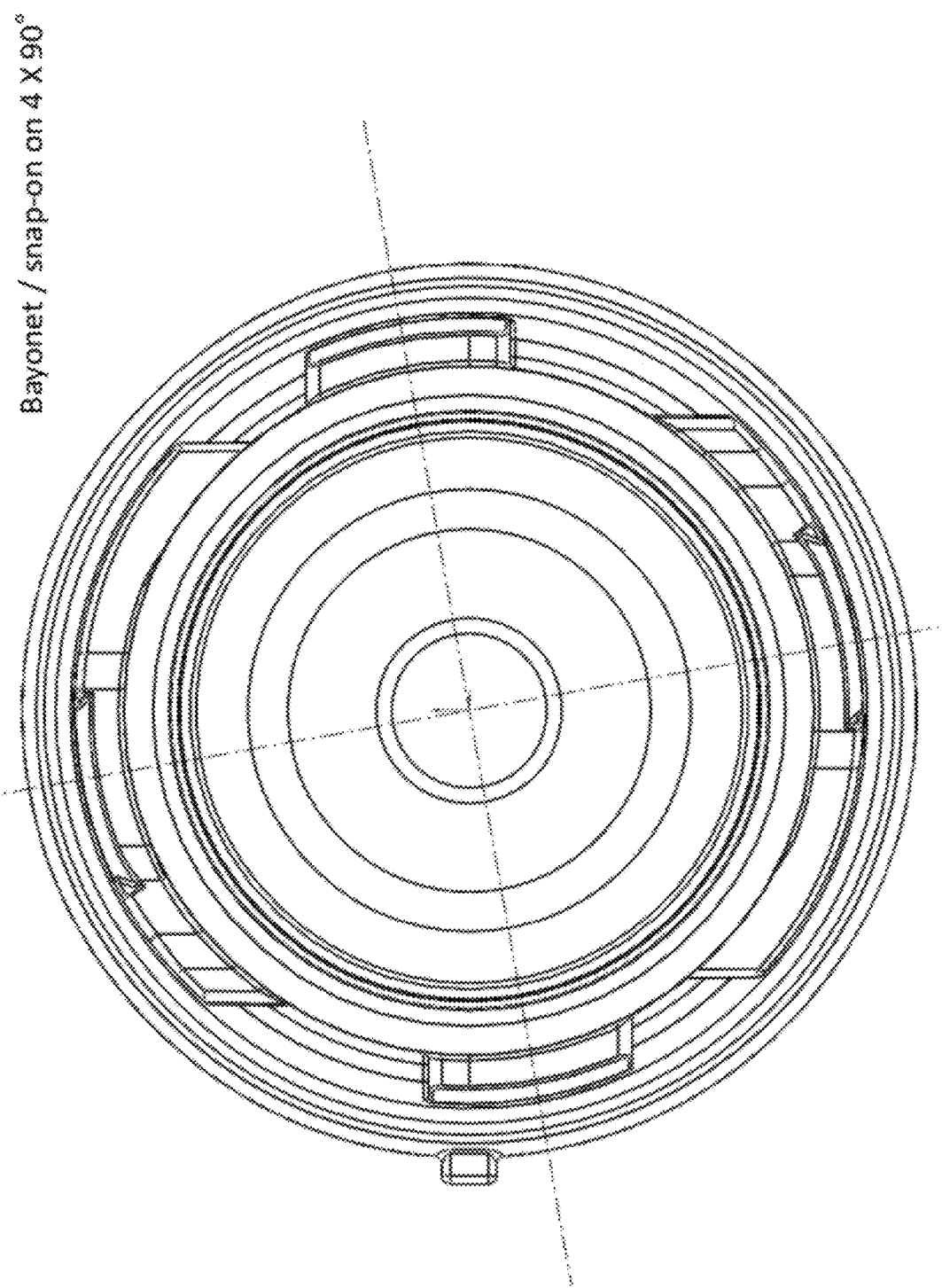
Fig. 27F - 4 Lug Bayonet / Snap-on Neck Finish
Bayonet / snap-on on 4 X 90°

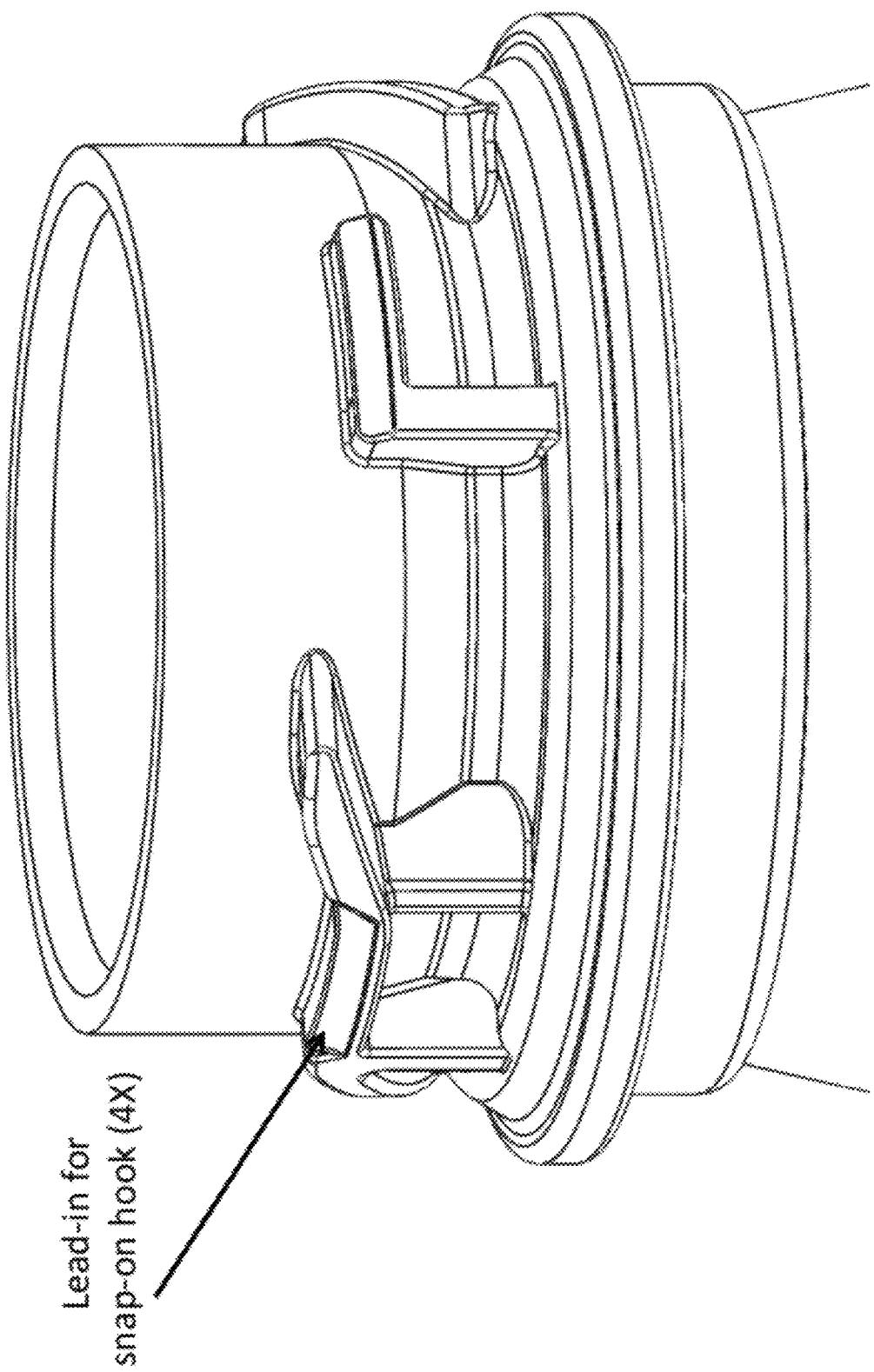
Fig. 27G 4 Lug Bayonet / Snap-on Neck Finish
Snap-on is also posible, but bottle has to be line out correctly (flat bottle)
Lead-in for snap-on hook (4X)

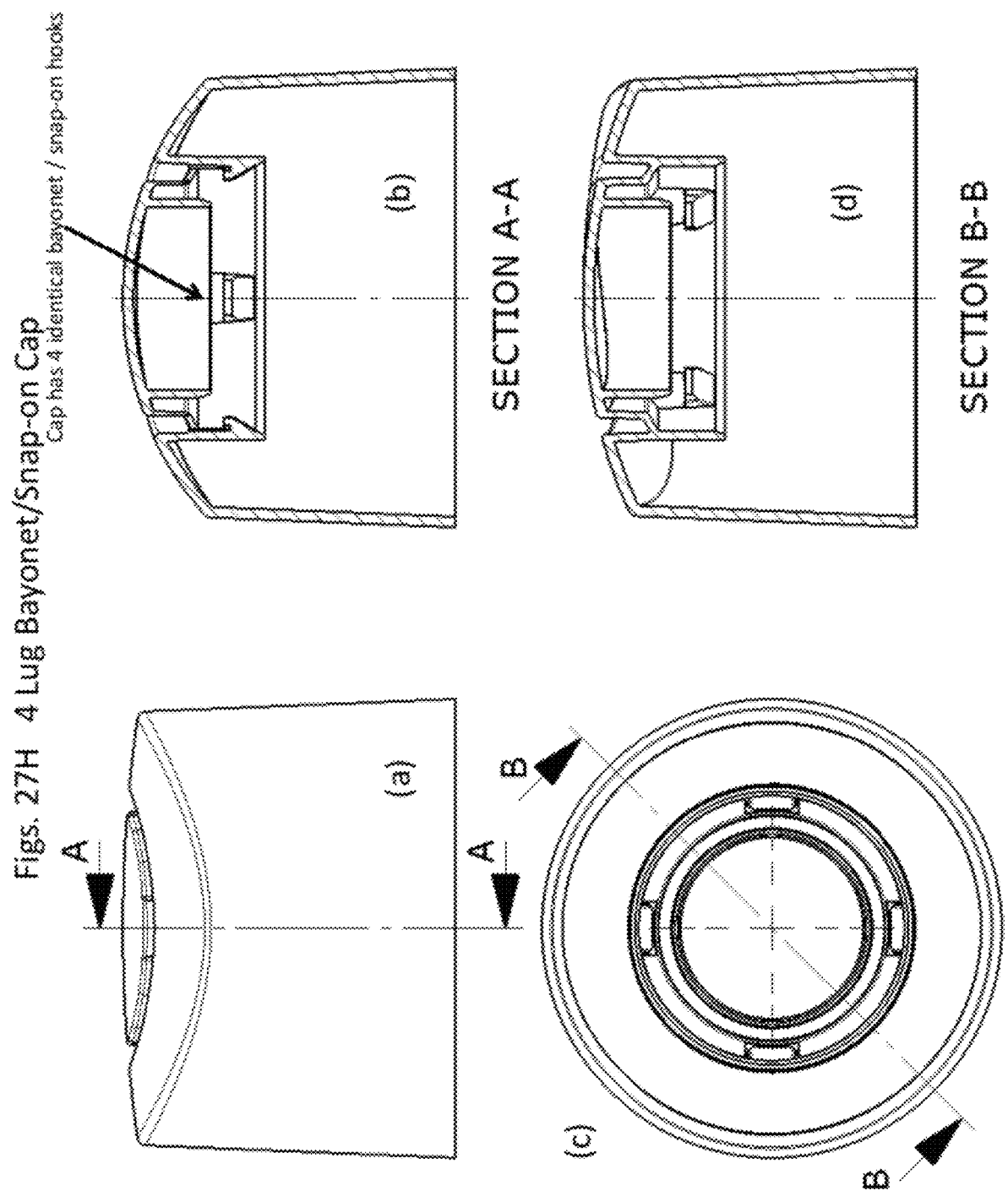

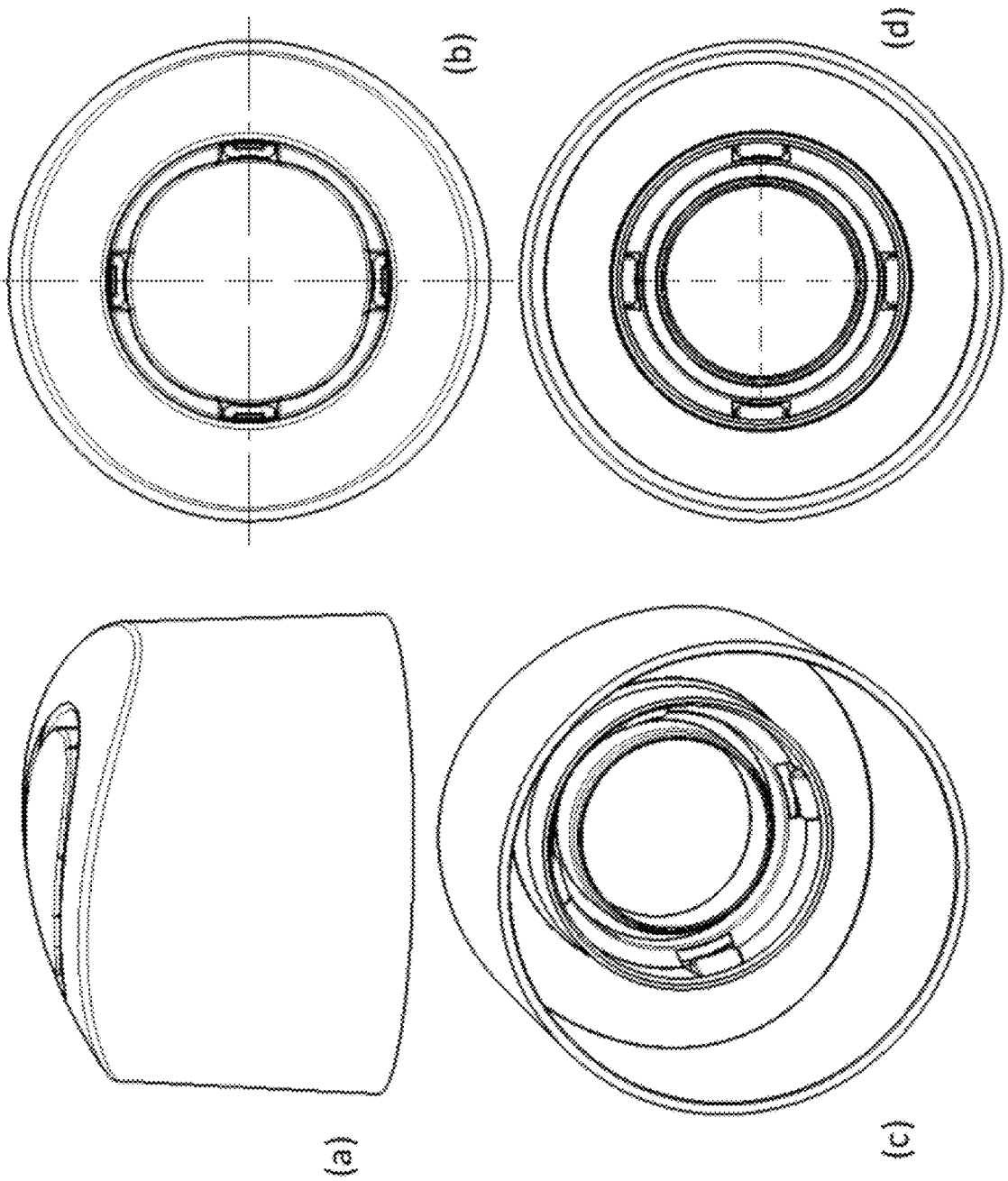

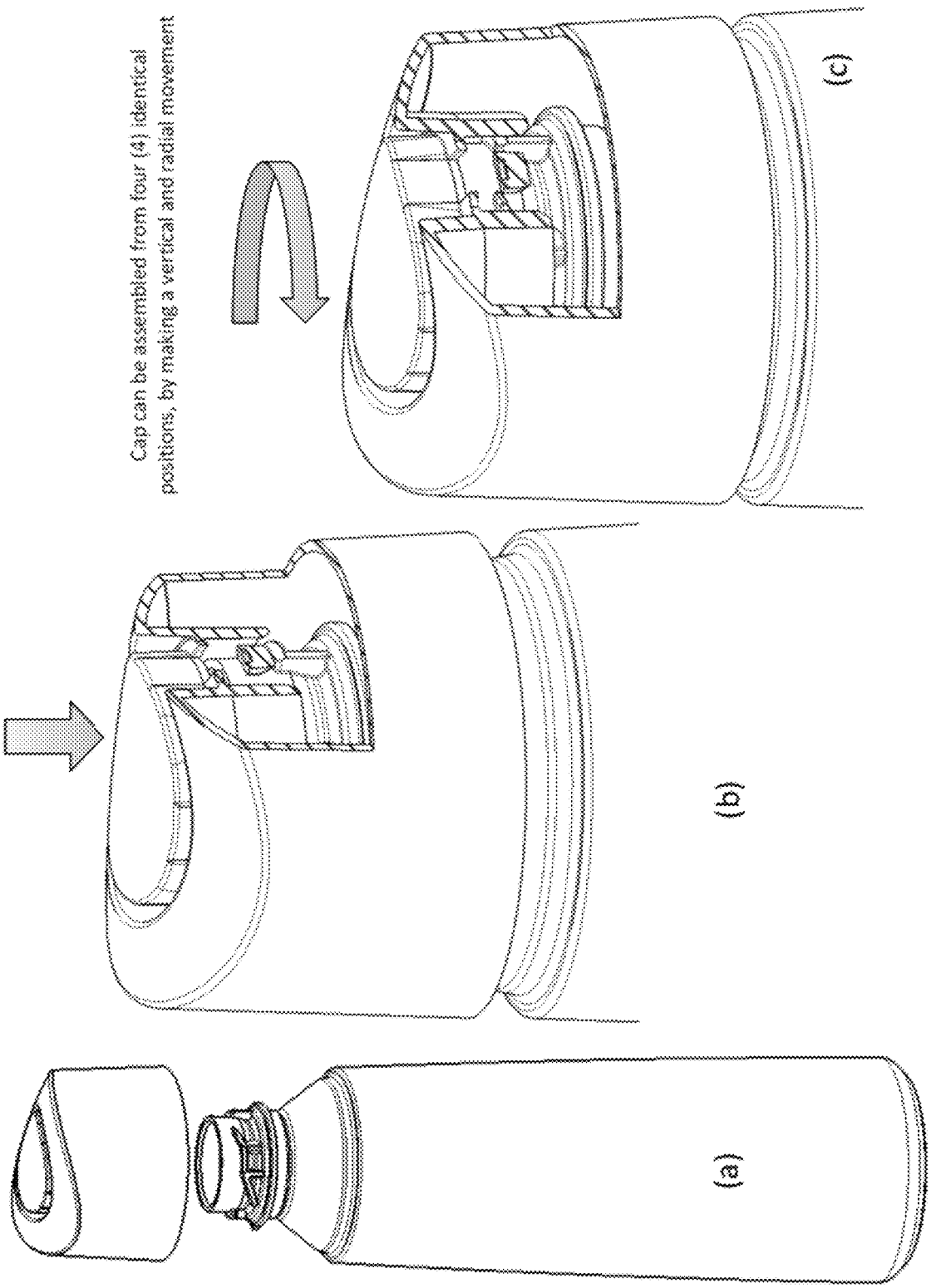
Fig. 27J - 4 Lug Bayonet Cap Principle

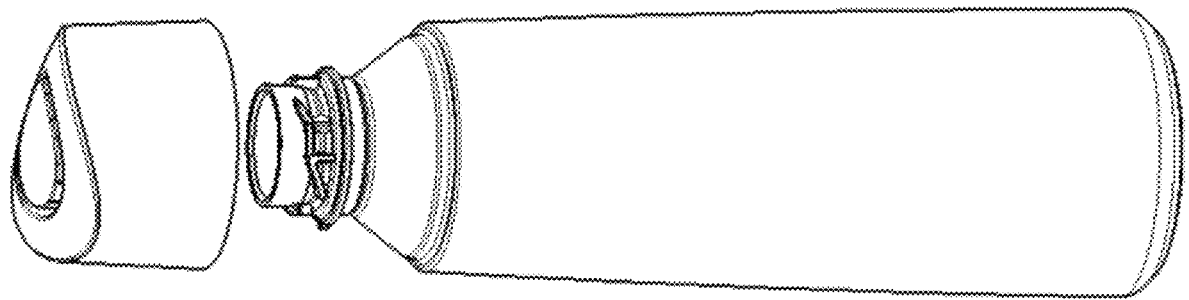
Fig. 27K - 4 Lug Bayonet Cap Principle
Cap can be assembled from four identical positions, by making a vertical and radial movement.

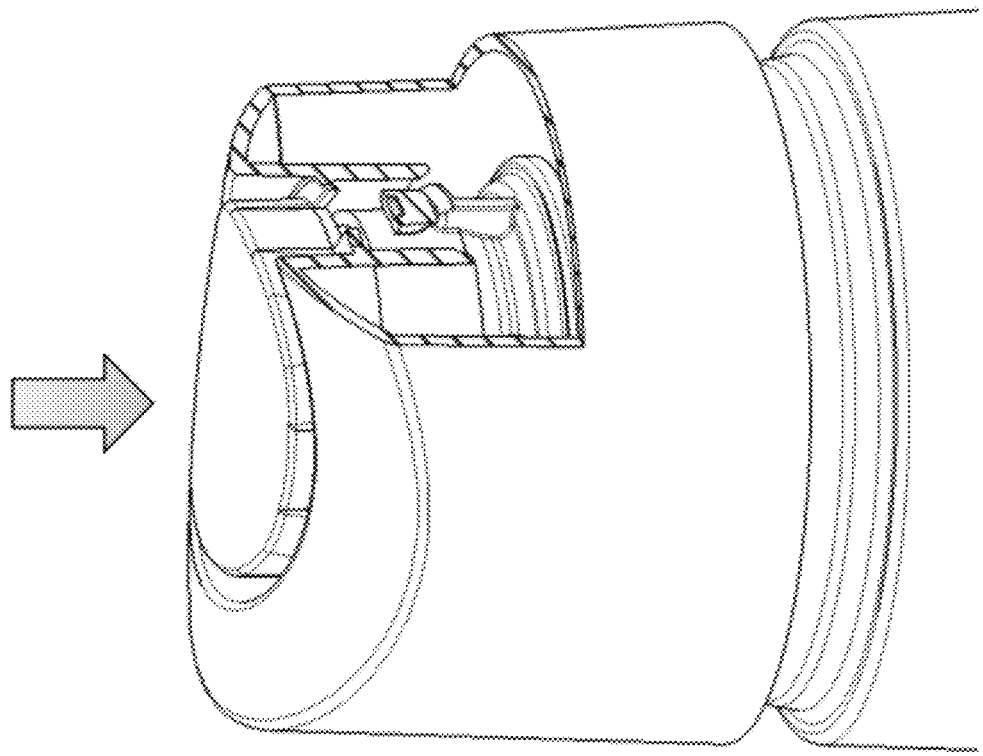
Fig. 27L - 4 Lug Bayonet Cap Principle
Cap can be assembled on 4 identical places, by making a vertical and radial movement

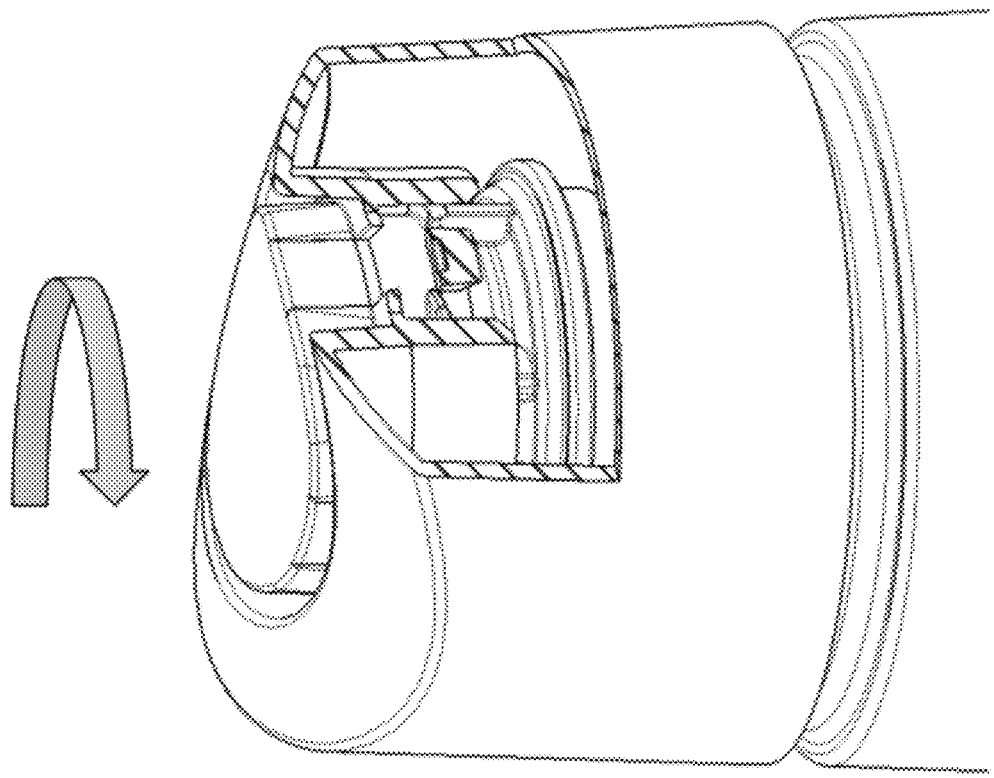
Fig. 27M - 4 Lug Bayonet Cap Principle
Cap can be assembled from four identical positions, by making a vertical and radial movement

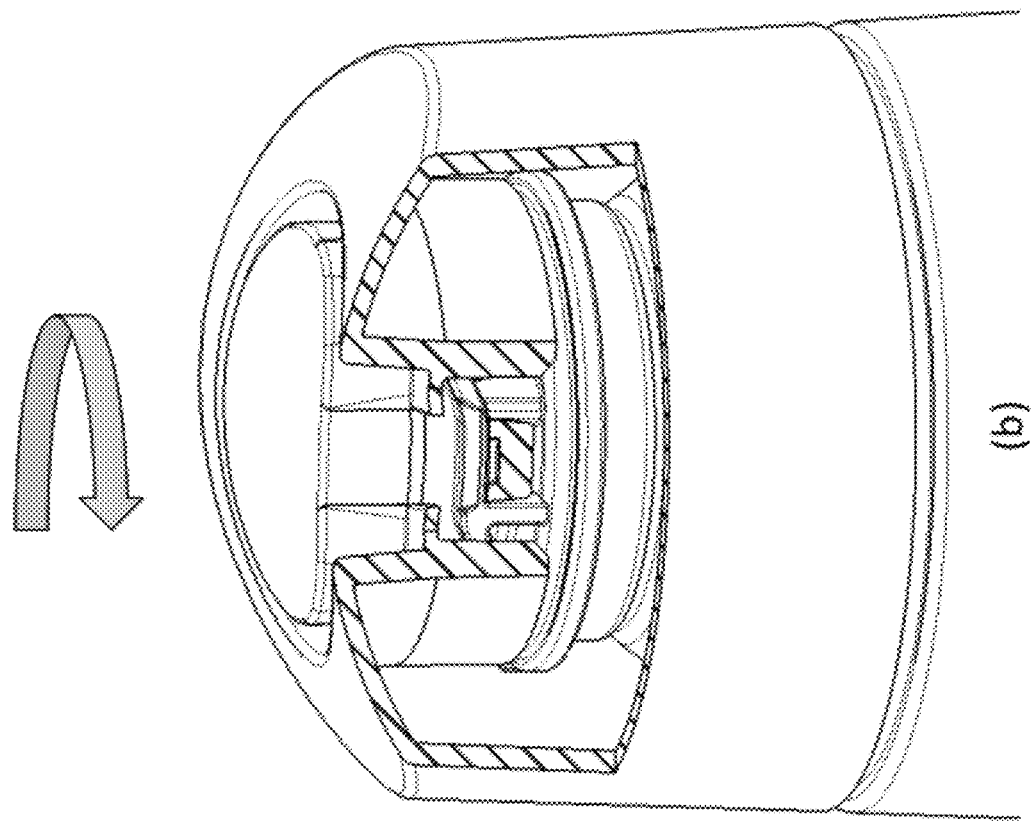
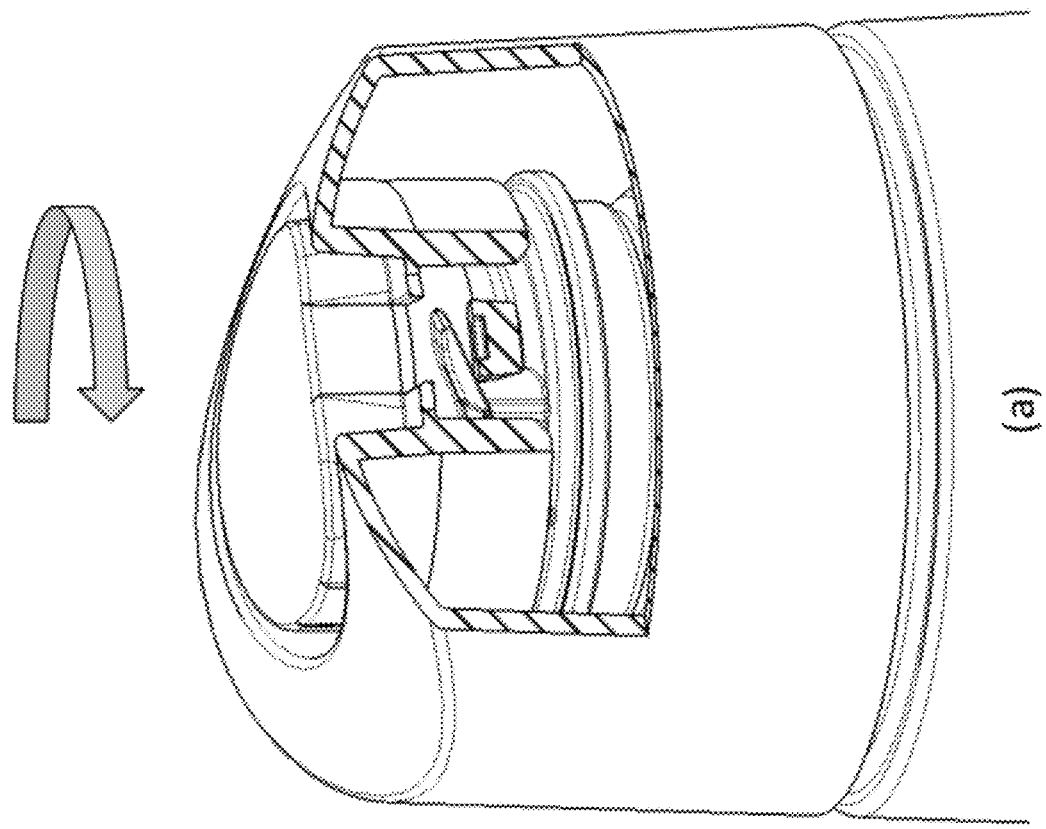
Fig. 27N - 4 Lug Bayonet Cap Principle

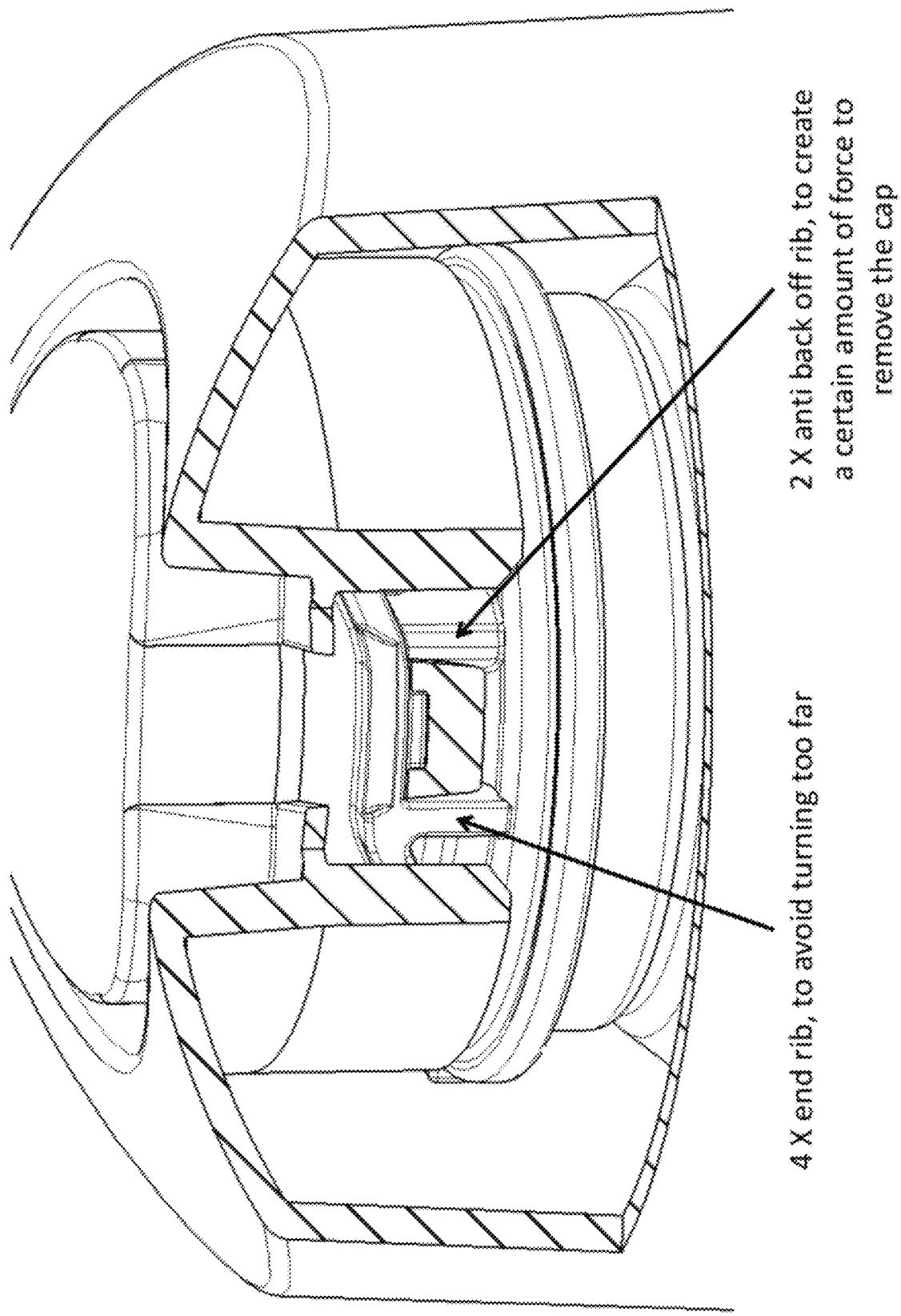
Fig. 27O - 4 Lug Bayonet Cap Principle
2 X anti back off rib, to create a certain amount of force to remove the cap
4 X end rib, to avoid turning too far

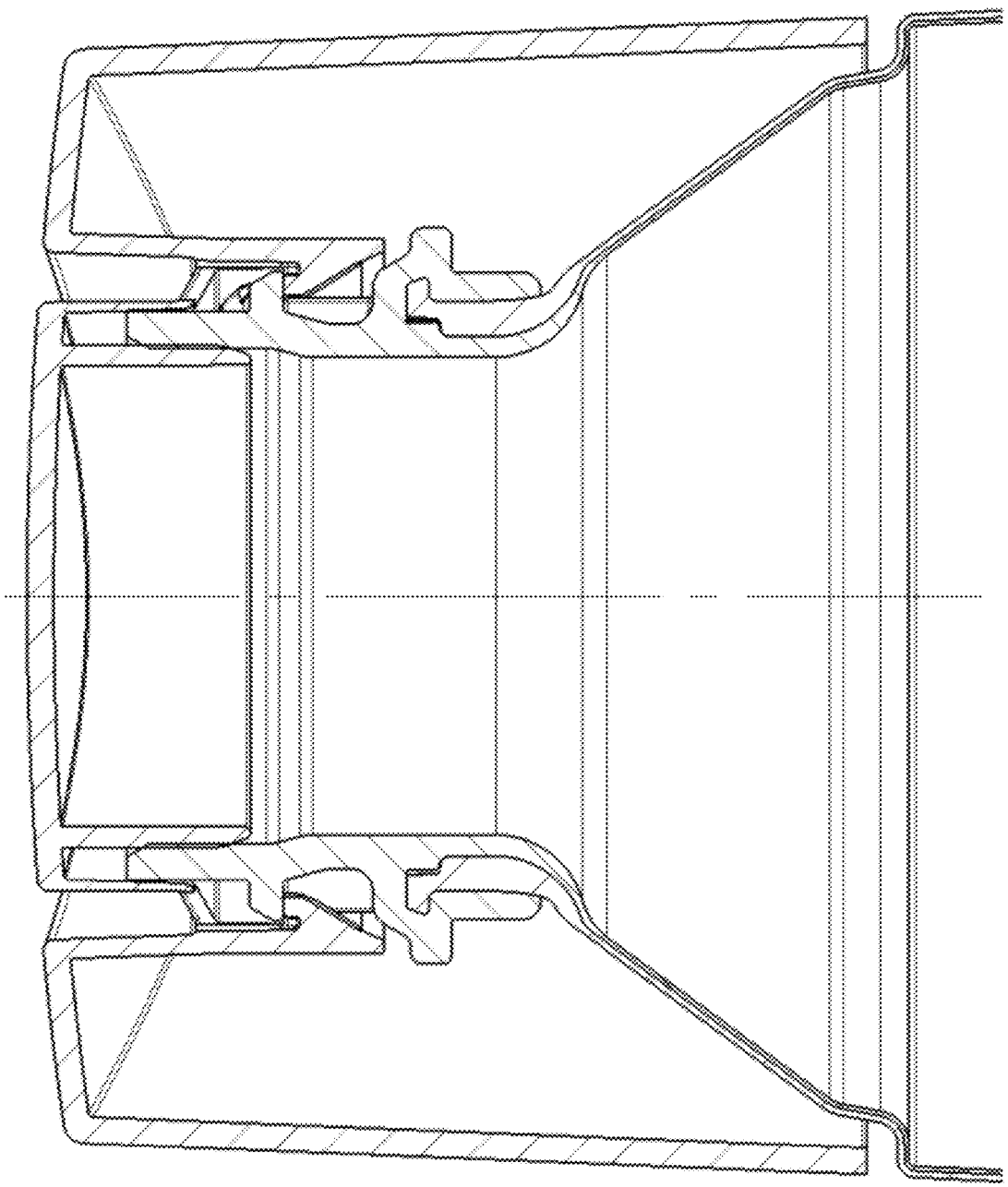
Fig. 27P - 4 Lug Bayonet Cap Principle

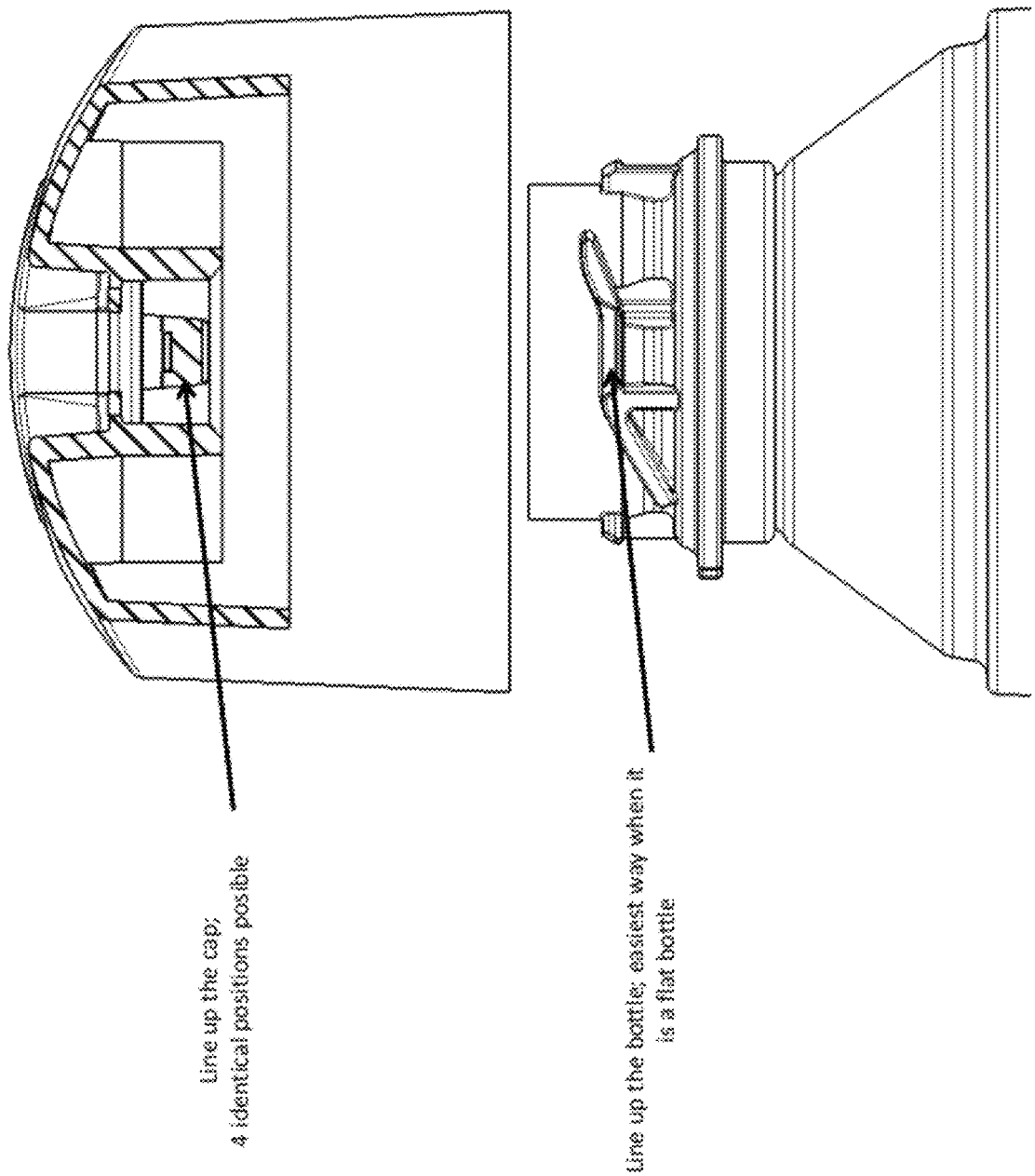

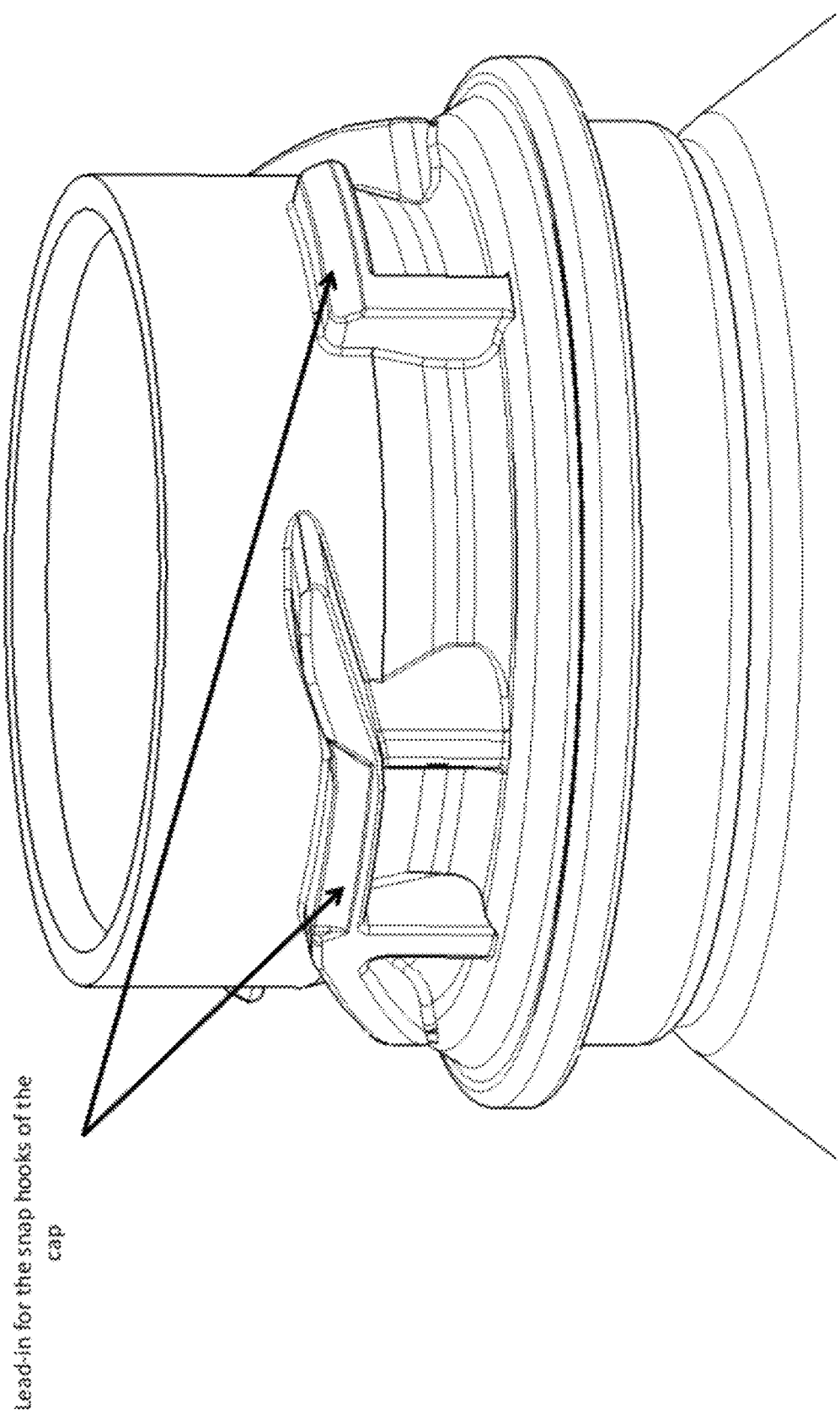
Fig. 27R - Snap-on principle
Lead-in for the snap hooks of the cap

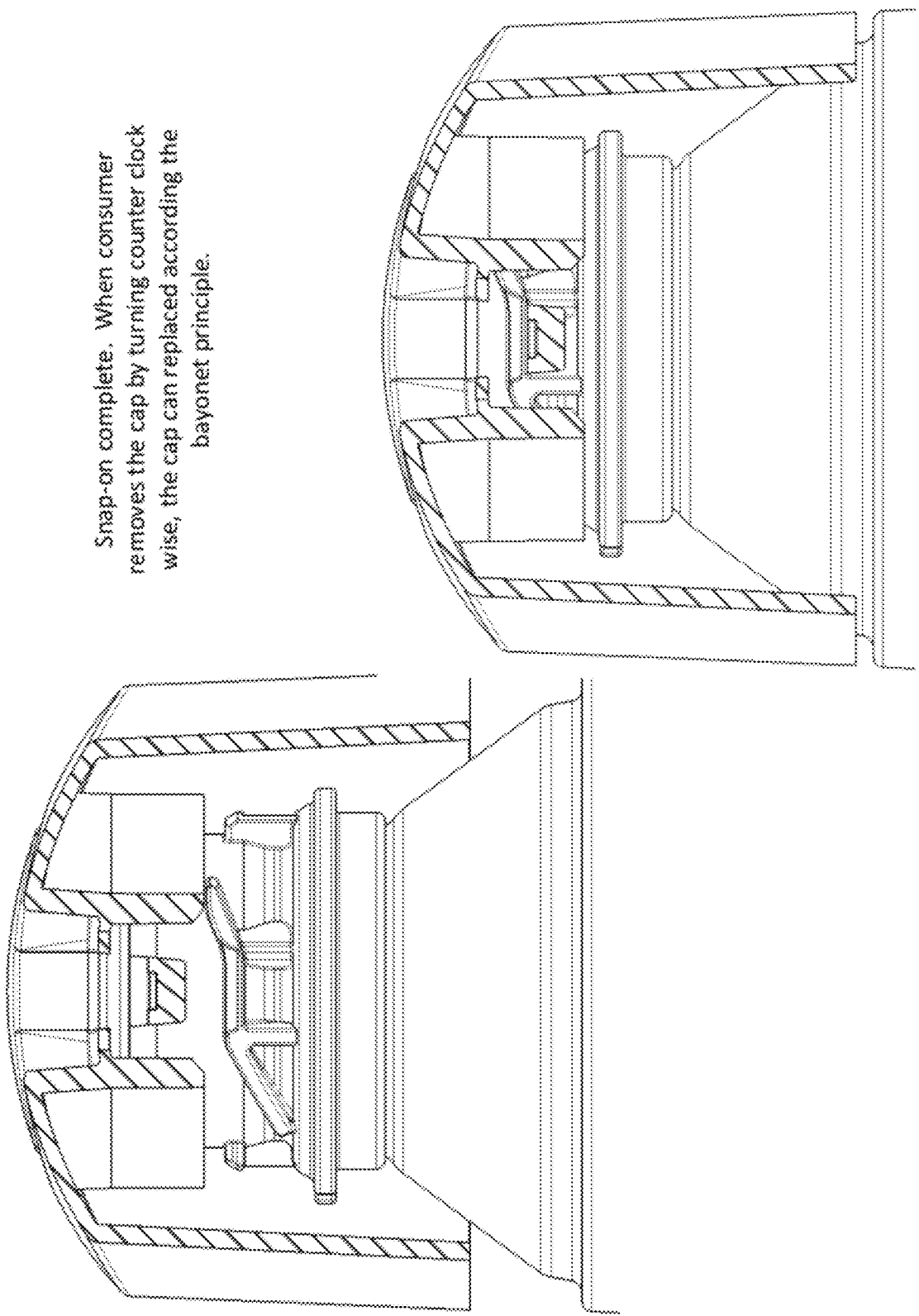
Fig. 27S – Snap-on Principle

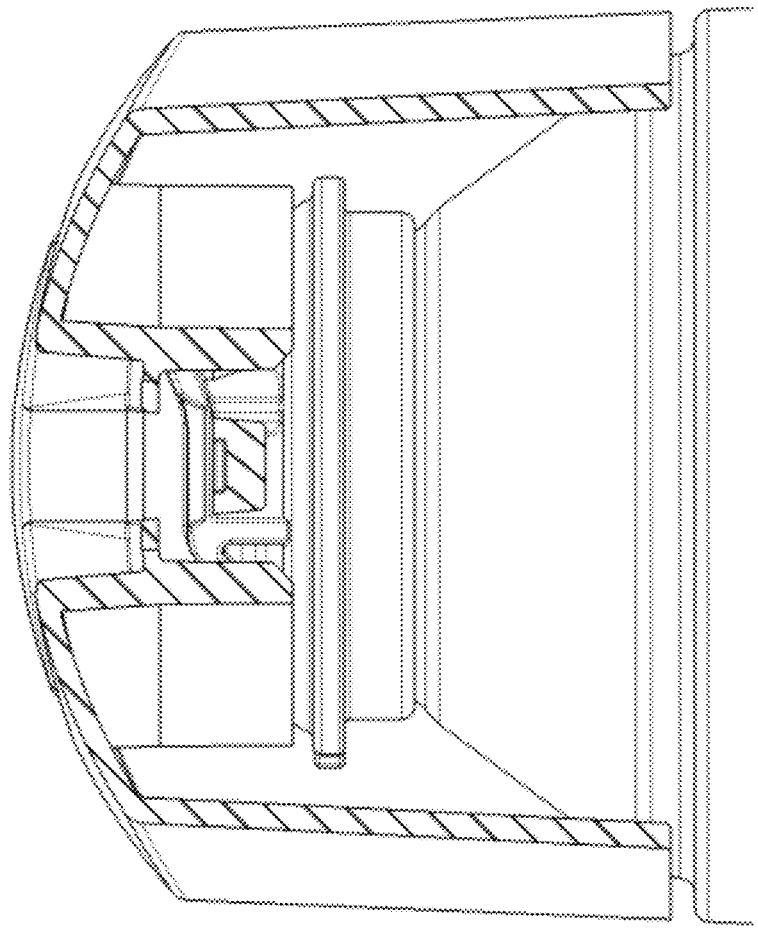
Fig. 27T - Snap-on Principle
Snap-on is complete. When a consumer removes the cap by turning counter clockwise, the cap can be re-placed according to the bayonet principle.

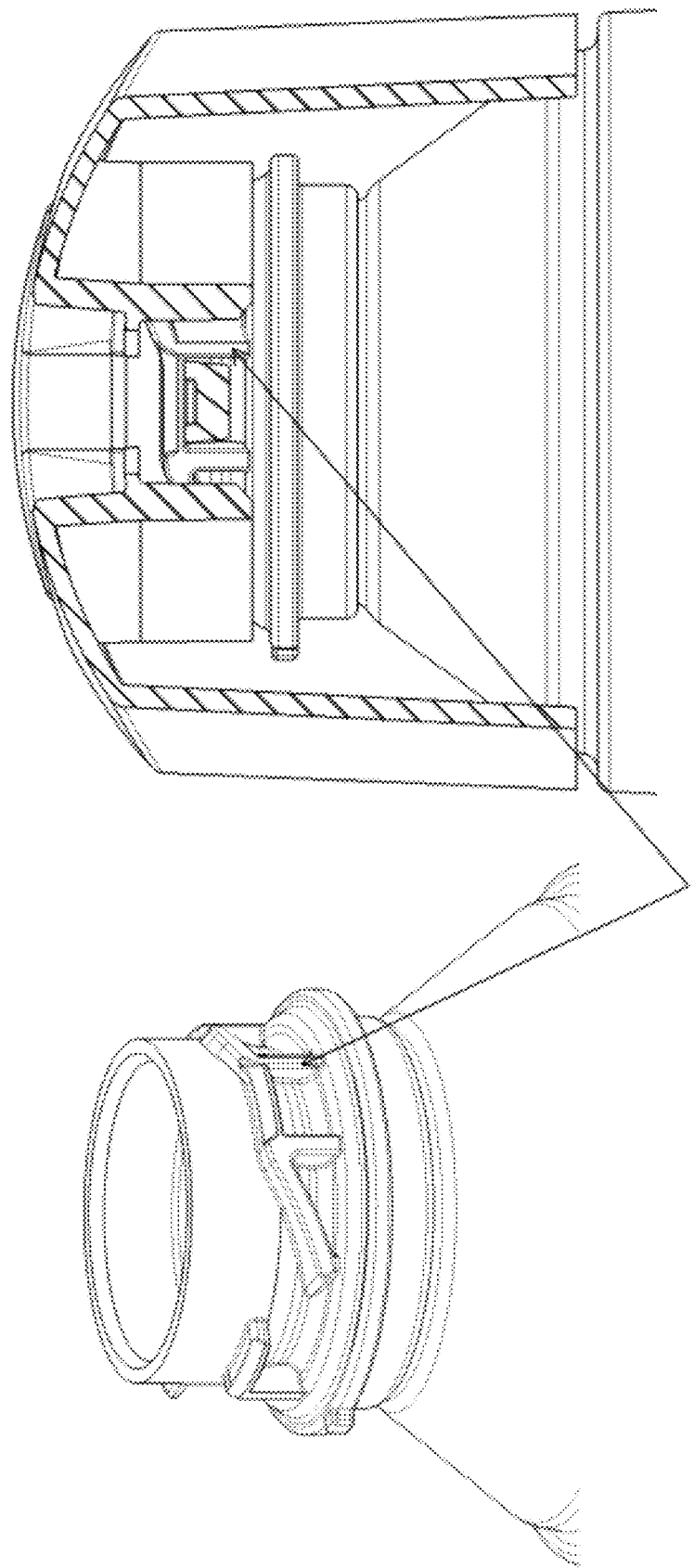
Fig. 27U - Snap-on Principle Non Removable

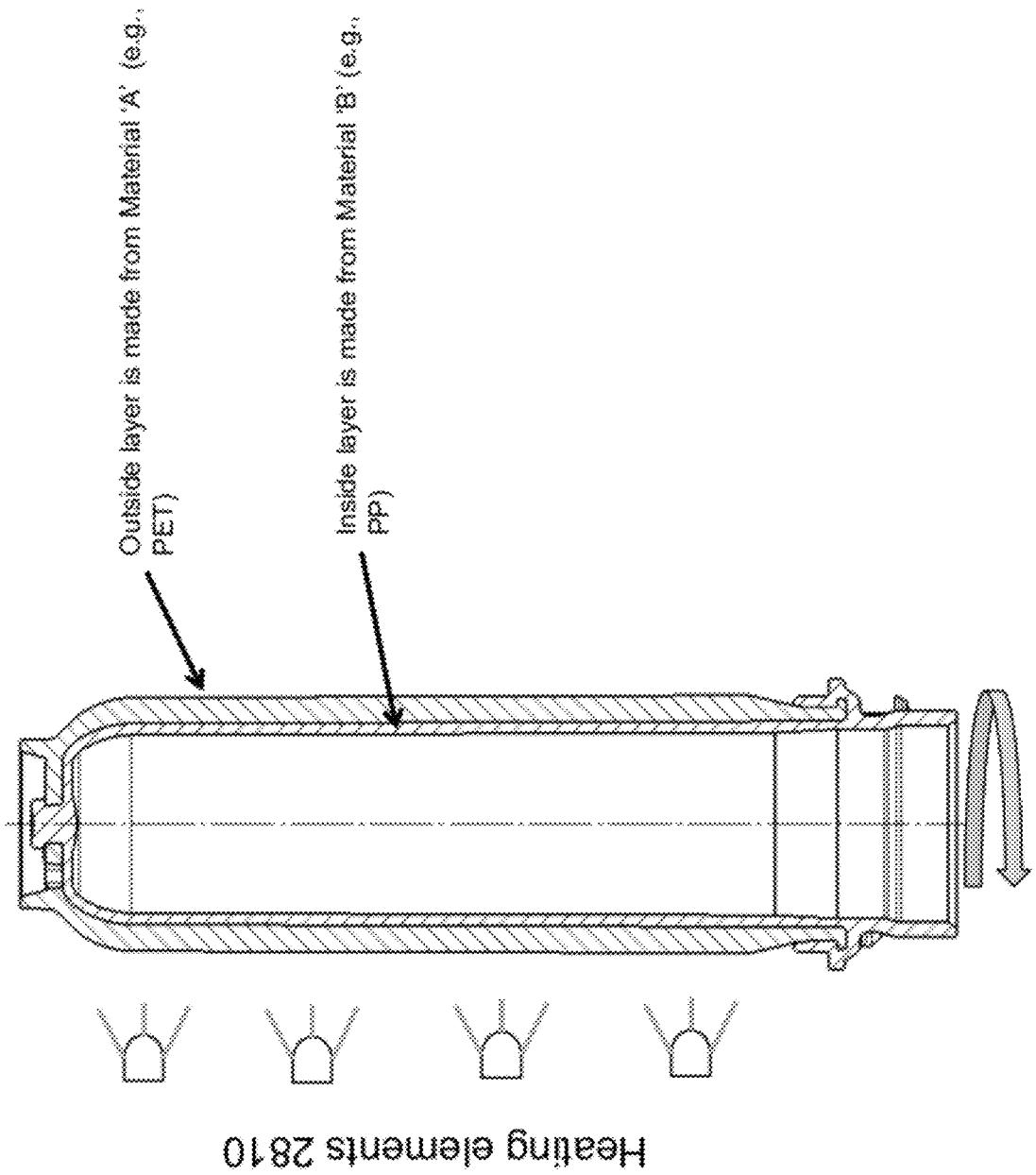
Fig. 28A – Heating Profile Of Preforms During Blowing Process

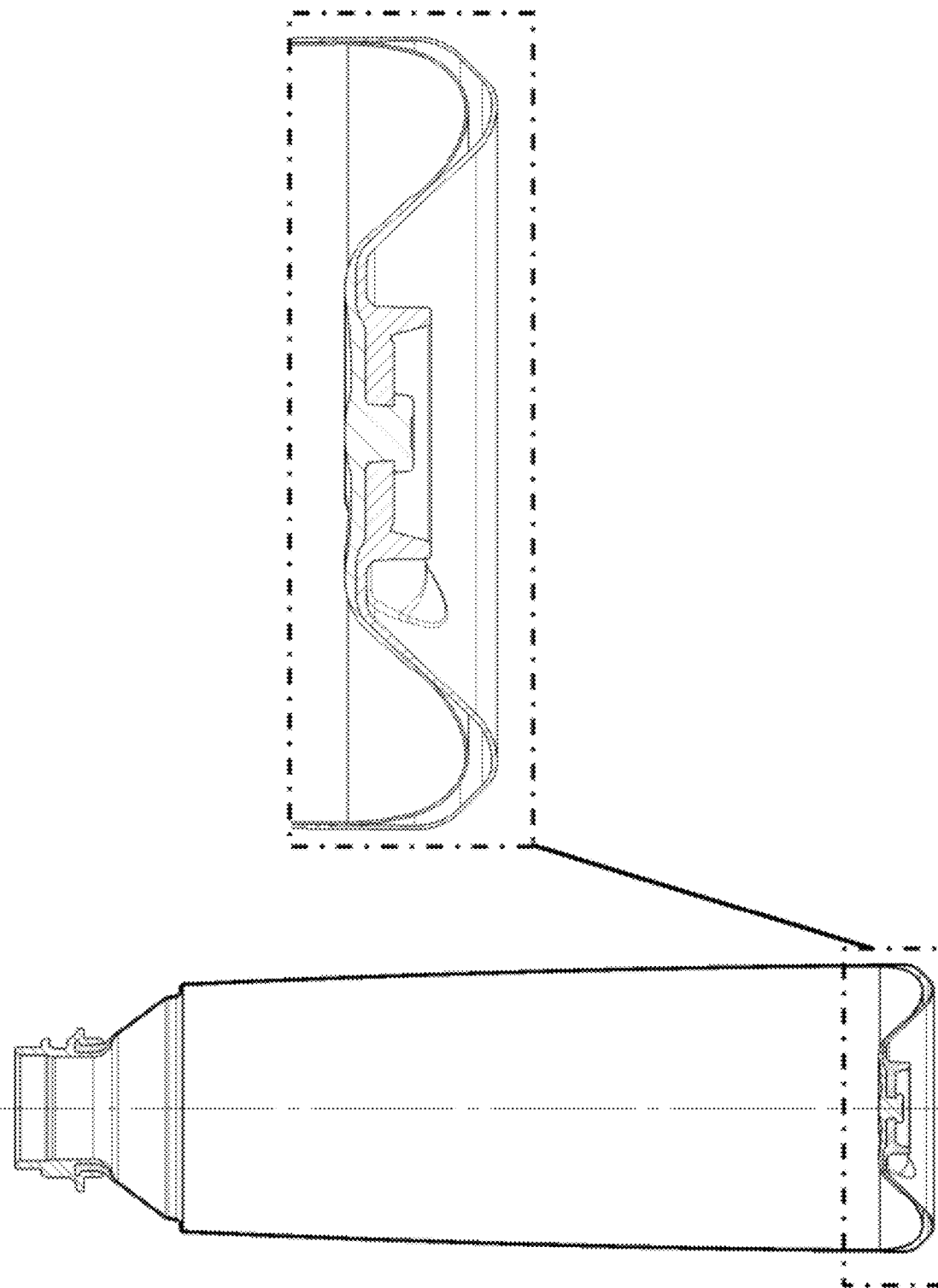
Fig. 28B — Need For Optimal Blowing Temperatures of Outside and Inside Layer

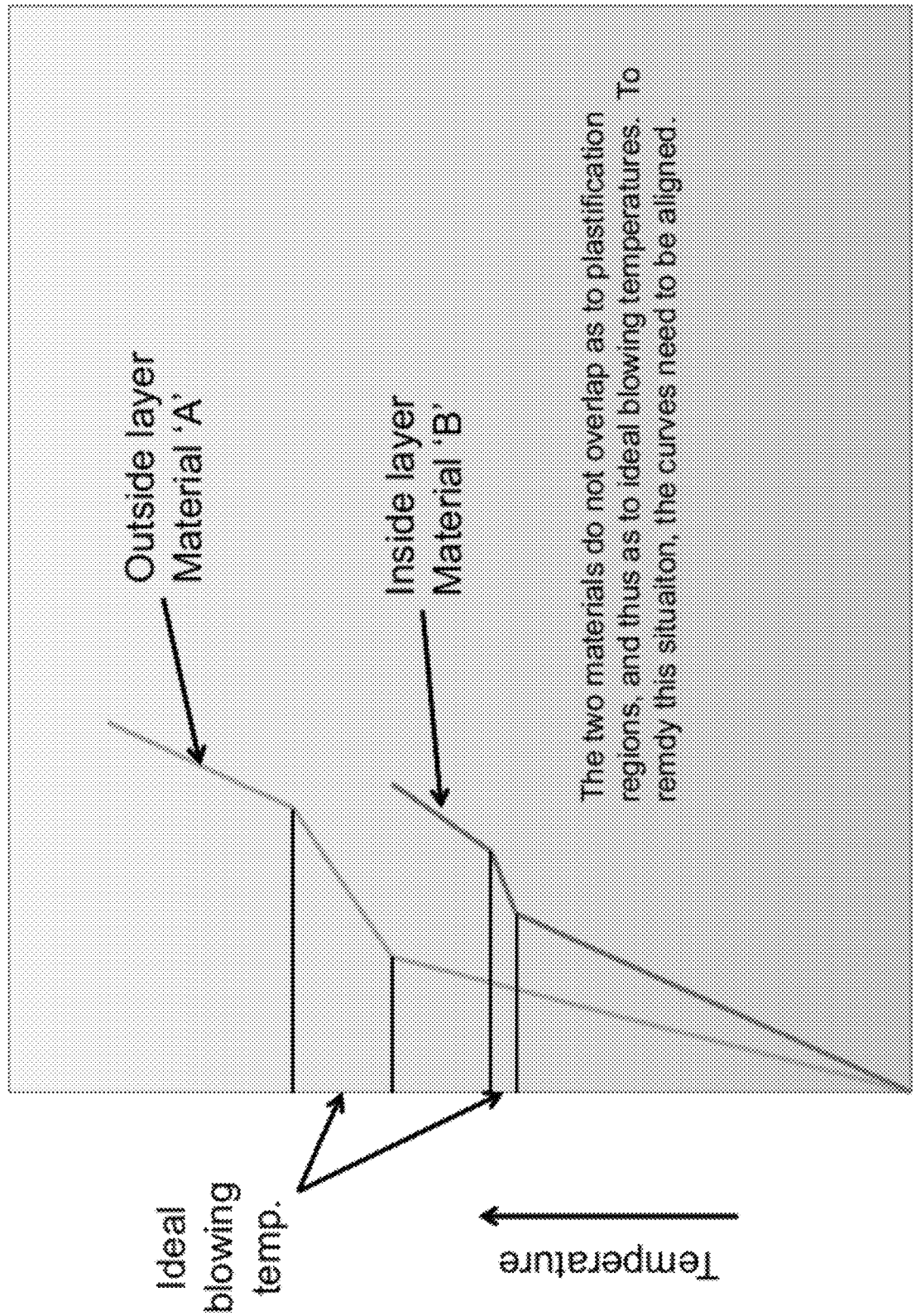
Fig. 28C – Comparison Of Plastification Curves For Different Materials

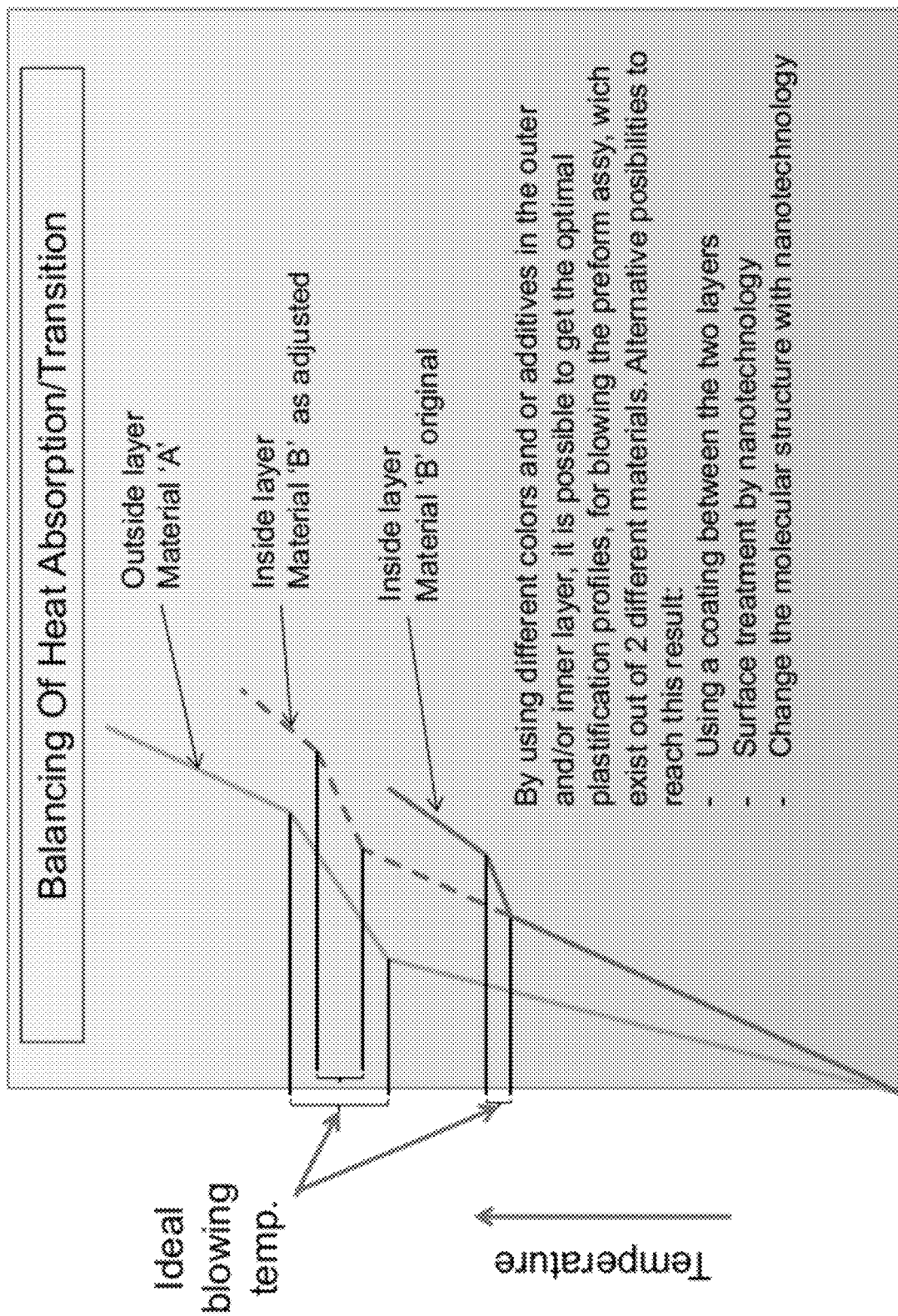
Fig. 28D – Comparison of Plastification Curves for Different Materials

PREFORMS FOR FLAIR APPLICATIONS

CROSS-REFERENCE TO RELATED APPLICATIONS

This application claims the benefit of U.S. Provisional Patent Application No. 61/459,712, entitled "IMPROVED PRE-FORMS FOR FLAIR APPLICATIONS," and filed on Dec. 17, 2010.

TECHNICAL FIELD

The present invention relates to blow molding and dispensing technologies, and in particular to novel pre-forms for use in Flair and Flair-type liquid delivery systems.

BACKGROUND OF THE INVENTION

Flair technology, developed and marketed by assignee hereof, Dispensing Technologies, B.V., of Helmond, Netherlands, utilizes a "bag in a bag," or inner container and outer container system for dispensing products such as liquids, for example. The two containers originate as plastic pre-forms, and are then blown to final size. Sometimes this two container, or two pre-form, system is known as a "bi-layer" container or pre-form, as the case may be. Thus, there is an inner pre-form and an outer pre-form, which, once blown to final size, become an inner container and an outer container. The inner and outer performs can, for example, be made from the same material, such as, for example, a polyolefin, or, for example, they can be made from different materials, such as, for example, PET and a polyolefin, such as, for example, polypropylene ("PP").

Flair technology uses a displacement medium, such as air, for example, to maintain a certain pressure between the inner container and the outer container. This causes the inner container to shrink as the liquid provided inside it is dispensed, and thus precludes the need for the liquid to ever come into contact with the outside air or environment. The two Flair containers are joined at their tops and at the bottom, and there is a passageway for the displacement medium to enter, or to be pumped, between them. The creation and provision of these elements needs to be addressed during the creation of the pre-forms.

When the inner and outer pre-forms are of the same material, or of different materials but having essentially equal molding temperatures, special care must be taken so that the two performs do not fuse along their interface and become bonded to one another. Additionally, in some circumstances, the two performs can be molded in novel and more efficient ways. Various improved methods of molding pre-forms, as well as novel designs and variations for different contexts, are presented.

SUMMARY OF THE INVENTION

Improved pre-forms for Flair and Flair-type applications are presented. In exemplary embodiments of the present invention, if two different materials which do not bond together are used to make a pre-form, then such a pre-form can be made by a bi-injection process, using the same mold. In such exemplary embodiments, first the outer pre-form can be fashioned, and then the inner pre-form can be molded through a center hole provided at the bottom of the outer pre-form. The two pre-forms are then connected to each other. The two materials can be different, such as PET and a polyolefin, or for example, they can even be the same, such as PET/PET, if steps are taken to prevent their bonding during the molding of the second pre-form layer. In such a process, a non-stick coating can be sprayed on the surface that will be between the pre-forms, where the second perform will touch the first one, and after such application, the second container can be molded, also in a 2C process. The order of manufacture can be either outer then inner, or inner then outer, in various exemplary embodiments. If outer then inner, the non-stick coating can be sprayed on the inside of the first molded outer perform, followed by molding of the inner preform. If the reverse, the non-stick coating is sprayed on the outside of the first molded inner perform, then followed by the molding of the outer perform. In exemplary embodiments of the present invention, The material from which the inner container is made, the degree of shrinkage it will experience relative to the outer container, and the concomitant maximum hot fill temperature it can thus support, can all be designed for a given application, use or range of uses.

BRIEF DESCRIPTION OF DRAWINGS

It is noted that the U.S. patent or application file contains at least one drawing executed in color (not applicable for PCT application). Copies of this patent or patent application publication with color drawings will be provided by the U.S. Patent Office upon request and payment of the necessary fee.

FIG. 1 depicts an exemplary bi-layer bottle and preform without an airvalve provided in the containers, for appliances having an airvalve according to exemplary embodiments of the present invention;

FIG. 2 depicts an exemplary bi-layer bottle, with a secure connection between the bottle and an air tube according to exemplary embodiments of the present invention;

FIG. 3 depicts perspective and longitudinal cross-section views of an exemplary bi-layer bottle, provided with an air pressure release mechanism according to an exemplary embodiment of the present invention;

FIG. 3A illustrates an exemplary preform without an air valve, formed using an overmolding process, according to an exemplary embodiment of the present invention;

FIG. 3B illustrates the process of blowing a bottle from a preform according to an exemplary embodiment of the present invention;

FIG. 3C depicts various details of an exemplary bottle without an air valve according to an exemplary embodiment of the present invention;

FIG. 3D are magnified details of cross sections along the lines C-C, D-D and E-E as shown in FIG. 3D;

FIG. 3E illustrates the process of separating the layers in a bottle formed from a preform according to an exemplary embodiment of the present invention;

FIG. 3F illustrates the push pin of the inside layer being contacted with a mating portion of an air supply device according to an exemplary embodiment of the present invention;

FIGS. 3G and 3H illustrate the initiation of layer separation by introducing positive pressure from the air supply device through the hole now created by the push pin;

FIG. 3I illustrates how after the layers have been separated the air supply device can switch to an under pressure to cause the inner layer to follow the shape and contour of outer layer;

FIG. 3L shows the net result of the layer separation process according to an exemplary embodiment of the present invention;

FIG. 4 depicts exemplary inner and outer pre-forms for a PET/PET crimp neck type preform, where the pre-forms are spin welded at the top to connect them according to exemplary embodiments of the present invention;

FIGS. 4A and 4B illustrate the outside and inside layers of a PET/PET preform for a standard Flair system according to an exemplary embodiment of the present invention;

FIG. 4C illustrates how the inside layer is assembled into the outside layer for the PET/PET preform of FIGS. 4A and B.

FIG. 4D shows how the inside layer is connected to the outside layer by means of an ultrasonic deformation of its central pin according to an exemplary embodiment of the present invention;

FIGS. 4E and 4F illustrates a one way valve used in connection with the PET/PET preform of FIG. 4;

FIG. 4G illustrates the connection of the one way valve of FIGS. 4E and 4F onto the PET/PET preform of FIGS. 4A and 4B according to an exemplary embodiment of the present invention;

FIG. 5 depicts steps in assembly of an exemplary bi-layer pre-form as connected to an appliance that has a built-in air-valve according to exemplary embodiments of the present invention;

FIG. 5A shows magnified details of an exemplary preform with and without an exemplary power connector;

FIGS. 6 and 7 depict two stages in the manufacture of a PET/PP pre-form according to exemplary embodiments of the present invention;

FIG. 6A illustrates a first step of 2C molding a PET/PP preform for use in standard Flair applications with hooks to avoid turning according to an exemplary embodiment of the present invention;

FIG. 7A illustrates a second step in the 2C molding of the PET/PEP small standard bayonet preform;

FIG. 7B illustrates methods and geometries to obtain a tight seal connection between the inner and outer layers of the preform of FIGS. 6A and 7A FIGS. 8-10 depict two stages in the manufacture of a PET/PET pre-form according to exemplary embodiments of the present invention where the outside layer is molded first;

FIG. 8A illustrates a first step in molding the outside layer of a standard Flair 2C PET/PEP preform with hooks to avoid turning according to an exemplary embodiment of the present invention;

FIGS. 9 and 9A illustrate depositing a non-stick coating between the layers;

FIG. 10A illustrates the second step of molding the inner layer of the standard Flair bayonet 2C PET/PEP preform;

FIGS. 11-14 depict two stages in the manufacture of a PET/PET pre-form according to alternate exemplary embodiments of the present invention where the inside layer is molded first and a non-stick coating deposited between the layers;

FIGS. 15 and 16 depict an exemplary pre-form with a bayonet neck finish, usable in "OpUs" type sprayers according to exemplary embodiments of the present invention;

FIG. 17 depicts an exemplary PET/PP pre-form with a crimp neck finish according to exemplary embodiments of the present invention;

FIG. 18 depicts various views of an exemplary pre-from with a crimp neck, with an air valve and a dip tube according to exemplary embodiments of the present invention;

FIG. 19 depicts how an exemplary pre-form can be blown into various bottle types, with exemplary dimensions provided for a flat type bottom, according to exemplary embodiments of the present invention;

FIGS. 20-22 depict an exemplary process for 2C molding a "Piston Flair" type PET/PET pre-form according to exemplary embodiments of the present invention;

FIGS. 23-25 depict an alternate exemplary process for 2C molding a "Piston Flair" Bayonet type PET/PET pre-form according to exemplary embodiments of the present invention;

FIGS. 26A-26B illustrate a pre-form with a one way valve according to an exemplary embodiment of the present invention;

FIGS. 26C and 26D respectively illustrate an under pressure situation and an over pressure situation in the pre-form of FIG. 26A;

FIG. 26E illustrates the non-refill functionality of a bottle made from the pre-form of FIG. 26A;

FIGS. 26F through 26H illustrate details of attaching the one way valve to the bottom of the pre-form of FIG. 26A where a layer release button is used in the preform; and FIGS. 27A and 27B illustrate a 3-lug bayonet snap-on neck finish according to exemplary embodiments of the present invention;

FIG. 27C is a top view showing various structures in the neck of FIGS. 27A and B;

FIGS. 27D and 27E show an alternate exemplary embodiment of the present invention with a 4-lug bayonet snap-on neck finish and details thereof;

FIG. 27F shows a top view showing the relationship of various structures of the 4-lug bayonet snap-on neck finish of FIG. 27D;

FIG. 27G illustrates details of a lead in for a snap-on hook on an exemplary lug of the 4-lug bayonet snap-on neck finish of FIG. 27D;

FIGS. 27H and 27I illustrate exemplary 4-lug bayonet snap-on caps according to exemplary embodiments of the present invention;

FIG. 27J illustrates the principle of attaching the four lug bayonet cap of FIGS. 27H and I onto a Flair type bottle provided with a four lug bayonet neck finish according to exemplary embodiments of the present invention;

FIGS. 27K, 27L and 27M are magnified views of each of the images in FIG. 27J for ease of illustration;

FIG. 27N illustrates the 4-lug bayonet cap principle according to exemplary embodiments of the present invention;

FIG. 27O illustrates features of the "end rib" (on all four lugs) and "anti back off rib" (on two lugs), according to exemplary embodiments of the present invention;

FIG. 27P illustrates the four lug bayonet cap principle detailing the interlocking of the hooks of the cap with the lugs of the neck according to exemplary embodiments of the present invention;

FIGS. 27Q, 27R and 27S illustrate further details of the snap-on functionality;

FIG. 27T illustrates an exemplary cap and bottle neck where removable snap-on has been completed, and FIG. 27U illustrates an exemplary cap and bottle neck where non-removable snap-on has been completed;

FIG. 28A shows an exemplary preform, rotating inside a heating oven so that it can be made ready to be blown into a bottle;

FIG. 28B depicts a fully blown bottle, and a detail of the bottom corners, for an exemplary perform according to exemplary embodiments of the present invention;

FIG. 28C depicts a comparison of plastification curves for two exemplary materials used, respectively, as the outer layer and inner layer of a perform, according to exemplary embodiments of the present invention; and FIG. 28D depicts the comparison of FIG. 28C after modifying Material 'B' (inner layer) so that the plastification curves are aligned.

DETAILED DESCRIPTION OF THE INVENTION

Pre-forms for various container within a container applications have an inner layer and an outer layer. Conventionally, these layers are separately molded, and then later brought together and attached by some means, often in a separate process, and often performed by the entity that blows the pre-forms to full size. This can be inefficient. It also means that the manufacture of the pre-forms does not create a finished product, and a further processing step is required to actually join the pre-forms so that they can be used. It is noted that for Flair and similar "bag in a bag" dispensing technologies, the inner container must be sealed to the outer container so that there is no leakage of any liquid from the inner container, and so that said liquid does not contact ambient air or any surroundings.

In exemplary embodiments of the present invention, if two different materials which do not bond together are used to make a pre-form, such as, for example, PET/PP, then such a pre-form can be made by a bi-injection molding process (also known as a "two component" or "2C" process, and so used herein), using the same mold. In such exemplary embodiments, the outer pre-form can first be fashioned, and then the inner pre-form can be molded through a center hole provided at or in the bottom of the outer pre-form. By virtue of the bi-injection molding, the two pre-forms are then connected to each other at the bottom and at the top. Such a bi-injection molding process is more efficient. Additionally, if a perform with both layers comprising the same material is desired, e.g., PET/PET, then the pre-form can also be made using a 2C process if proper steps are taken to prevent the bonding of the inner container to the outer container, such as, for example, application of a non-stick coating between injections, as described below.

Alternatively, the two performs can be separately molded, and then connected, by a variety of possible connection processes, including welding, crimping and the like. In all such processes, a finished pre-form, ready for blowing without additional processing steps results. Various such improved processes and features are next described with reference to the figures.

FIG. 1 depicts an exemplary bi-layer bottle (left image) and pre-form (right image) according to exemplary embodiments of the present invention. The bottle and pre-form do not contain an integrated air valve, as this can be provided in an appliance (referred to as "equipment" in the figure) to which the bottle is intended to be connected to. The bottle can be clamped at the top and bottom, and thus fully sealed within, a dispensing device.

FIG. 2 depicts an exemplary bi-layer bottle with a petaloid bottom (such as is used in 2 L soda bottles and the like) illustrating that the connection between the bottle and an air tube connected to the bottom of the bottle must be secure. The left image illustrates how the inner container is welded to the outer container at the bottom of the bottle. Because there is a pressure maintained between the two layers of the bottle, once the appliance is opened on top (and thus no valve containing the liquid), if the pressure is not released the liquid inside the inner bottle can splash out. Thus, a mechanism is needed to release that pressure when removing the bottle, for example, to replace it. As noted, these bottles do not have an air connector, so this air pressure cannot simply be released by reverse pumping or opening the pump valve to the atmosphere. If there is no closed valve at the top of the bottle and the valves are in the appliance, then it is necessary that the air between the two layers of the bottle be released before the bottle is taken out of the appliance, to avoid splashing of the liquid.

FIG. 3 provides the solution to this problem. FIG. 3 depicts perspective and longitudinal cross-section views of an exemplary bi-layer pre-from, provided with an air pressure release mechanism according to an exemplary embodiment of the present invention. This mechanism is part of the outer layer of the preform, and is attached to it. As seen in FIG. 3, the outer preform has a "U" shaped slit in its bottom, as well as a central hole. When the inner layer is molded, this inner layer protrudes through the hole, as seen in the center image of FIG. 3, and also fills in the indent under the hole, as shown. Prior to removing the bottle form its appliance (as shown in FIG. 2), a user simply presses on the "pusher" or air release mechanism which is built into the outer perform (shown in gray in FIG. 3). Given that the portion of the outer container with in the "U" shaped slit is attached to the inner container at the central protrusion, by pushing on the "pusher" at the vertex of the "U", this releases the air pressure between the inner and outer pre-forms, preventing any air trap. The air simply flows out of the air inlet, as shown in the far right image of FIG. 3, as it is at higher than atmospheric pressure between the containers of the bottle.

The air pressure release mechanism has other functionality. It can be pressed on after blowing the perform into bottle so as to release the inner container from the outer container after blowing. When molding, around the gating of each cavity the temperature will become hotter due to the fact that when the material enters into the cavity the temperature will rise close to the melting temperature of the other material and then the flexible portion of the inner layer will stick to the outer layer. By pressing the button once the bottle is blown, the inner bag will thus release from the outer bag, allowing air or other displacing medium to fill the gap between the containers, and thus facilitating the bag within a bag or "Flair" technology to operate.

FIG. 3A illustrates details of a pre-form such as shown in FIG. 3, also without an air valve. With reference to FIG. 3A, there is a prospective bottom view at (a), and then a bottom view at (b) showing two lines through which cross sections are provided in the right side of the figure. As can be seen in the cross section running through line A-A, at (c), a variant of the pusher of FIG. 3, namely a push pin protrusion, is seen which only appears on one side of the central axis. Such a push pin concentrates the force at one point, thus making it easier to introduce the separation of layers. It is also smaller, and thus easier to mold, inasmuch as it is part of the inner container. The other circular structure (shown between the two ventilation holes) is not functional, rather a gating profile used in the molding process. There are additionally two ventilation holes seen in (b), one of which is seen in the cross section through line B-B, to the right of the central connector, in FIG. 3A(d).

FIG. 3B illustrates how the pre-form of FIG. 3 can be blown to generate a full size bottle, where the neck and the center of the bottom remain at their preform size, and the remainder of the perform is blown to full size. FIG. 3C shows the same preform of FIG. 3A now blown into a bottle. This bottle is without an air valve, the air valve being in the appliance, as described below. FIGS. 3C(a) and (e) provide a number of lines through which cross sections are provided in FIGS. 3C(b), (c) and (d), and respectively magnified in FIG. 3D.

FIG. 3D presents detailed magnification of the bottoms of cross sections through lines C-C, D-D and E-E of FIG. 3C. With reference thereto, in FIG. 3D(b) (as well as in 3C(e) and (c)) there is shown a dimple in the blowing mold. The outside layer follows this shape and the inside layer becomes loose after shrinkage. By creating an air gap once the inner layer shrinks, this feature improves the separation of the layers and avoids "blocking" (sealing) of inside layer against the outside layer when the air has to quickly release. FIG. 3D(c) shows one of the two air inlets, or ventilation holes, for introducing air between the inner layer and the outer layer, as described above.

FIGS. 3E-3L, next described, illustrate the process of separation of the inner layer from the outer layer once the bottle is full blown from the pre-form stage. With reference thereto, FIG. 3E shows the full blown bottle and a detailed magnification of the bottom of the bottle showing the push pin shaped layer separation device as shown in FIG. 3A, section A-A. FIG. 3F shows the push pin of the inside layer being pushed upwards into the bottle as an air supply device (part of the "appliance") is attached to the bottom of the bottle.

FIG. 3G shows how the layers can be separated once the air supply device applies a positive pressure into the gap between the two layers. This pressure flows somewhat through the space created by pushing up the push pin and of course through the ventilation holes. FIG. 3H shows the continuation of this process and, as can be seen, the inner layer in light green has risen above the outer layer (gray). Thus, a gap has been created between them. In general the layer separation can occur right after blowing, once the bottle has cooled to 50-60 degrees Celsius. The process can also be done when the bottle is fully cooled, if waiting is not an issue.

FIG. 3I shows the situation where the air supply device now switches to an under pressure (partial vacuum) and sucks back the air that it had used to separate the layers. This is necessary to allow the inner container to assume its full blown shape, and thus be fully filled with a full measure of the liquid it is designed to carry. Additionally, from a marketing perspective, if an inner bottle does not have its full shape, it may appear to the uninitiated as used and refilled, which is not desirable.

FIG. 3J shows the continuation of the process as shown in FIG. 3I where the inside layer has now assumed the shape of the interior of the outer layer without an air gap, yet the layers remain separable, to thus operate according to the Flair functionality. FIG. 3K shows the culmination of this process where all the air that had been introduced to separate the payers is now removed.

FIG. 3L shows the end result of this process where now the push pin hooks again into the hole within the outside layer and closes the gap. However, given the layer separation process as shown in FIGS. 3F-3K, there is a guaranteed separation of the layers during use (Flair bottles require the gap to be filled with the displacing medium), and thus avoiding blocking or sealing of the inside layer against the outside layer when the air has to quickly release.

FIG. 4 depicts an exemplary perform where both the inner and outer pre-forms are made of PET, and where the pre-forms are separately molded and then assembled. The top connection is an airtight seal made by spin welding, for example, in a clean rom type setup where dust and the like are controlled. These example pre-forms have a crimped neck, and can be used, for example, in home draft beer systems. Additionally, as shown in FIG. 4, besides the inner and outer pre-forms being joined at the top by spin welding, they are also joined at the bottom by a protrusion from the inner container which is then flattened. The lower connection can be done using 2C molding, or, for example, by ultrasonic welding. In addition, a valve can be affixed underneath the two pre-forms, as shown at the bottom of the preform in FIG. 4 and in more detail in the far right image of FIG. 5. The valve can be affixed by, for example, rotation welding, or other affixation techniques.

FIG. 4A-4D provides additional details of a standard Flair type PET/PET pre-form shown in FIG. 4 (the term "standard Flair" is used in contrast to "Piston Flair" where the upper portion of the inner container is affixed to the upper portion of the outer container, such that when dispensing its contents the inner container folds along itself much like a piston). With reference thereto, FIG. 4A(a) shows a perspective view of the outer container of the pre-form and FIG. 4A(b) shows a side view with a line A-A through which a cross section is taken and presented in FIG. 4A(c). Similarly, FIG. 4B shows the inner layer. Visible at the bottom is the plug by means of which the inner container will be affixed to the outer container as shown in FIG. 4, and a side view and a cross section through the line B-B. Similarly, FIG. 4C shows how the inner container is assembled into the outside layer. This process can, for example, be accomplished by initially inserting the inner container into the outer container and then pushing down and spin welding such that there is a melted area at the top of the pre-forms where the inner and outer layers are connected. This is shown in FIG. 4C(c) and (d) as shown. The connection of the inner layer to the outer layer has to be an air-tight connection. Alternatively the two layers can be connected by ultrasonic welding, heat stamp etc., the main requirement being an air-tight connection.

FIG. 4D shows how the central pin of the inner layer protruding through the bottom of the outer layer can be deformed so as to connect the inner and outer layers. This can be done by deformation of the central pin, or for example, by deformation by spin welding, ultrasonic welding, heat stamp. etc. This connection at the bottom need not be air-tight.

In fact, when an air supply device is connected to the bottle, some of the air will travel through this pin connection in various exemplary embodiments.

One Way Valve at Bottom

FIGS. 4E, 4F and 4G illustrate details of a one way valve to be used in connection with exemplary performs as described below. As shown in FIG. 4E, a first step can be injection molding of PET for reason of the spinweld connection with the outer layer of the preform, and a second step can be, for example, soft TPE, not chemically connected to the PET (but mechanically affixed to the bottom of the TPE portion, as shown in FIG. 4F). A soft material can be used for two reasons: (1) good sealing of the valve, and (2) to create a good sealing to the air supply device (which connects to the underside of the TPE portion, for example). As shown in FIG. 4G, the one way valve can be connected to the exemplary preform using spin welding, ultrasonic welding, gluing, etc.

FIG. 5 depicts an exemplary bi-layer pre-form without an air valve, shown by itself, and as connected to an air valve. The air valve can be supplied by, for example, an appliance that has a built in air-valve (shown in purple at bottom), or it can be attached to the bottom of the pre-form as described above, via rotation (spin) welding, for example. Alternatively, it can be attached using other connection methods as may be available, such as ultrasonic welding, gluing, etc. If the air-valve housing and the air-valve are part of the appliance into which the bottle (here shown as a pre-form)

can be inserted, such an appliance can provide the clamping system which seals the bottle, as shown in FIG. 1. FIG. 5A show details of the preform of FIG. 5 with and without a power connector or power pack with a pump and air valve.

Standard Flair PET/PP Preforms

FIGS. 6-7 depict two stages in the manufacture of an exemplary PET/PP pre-form with bayonet type connection at its top, and for use with standard Flair devices. Here the outer PET pre-form is first molded, and then, in a second step, the inner pre-form, made from a polyolefin, for example, polypropylene, can be molded. This can be done in a bi-injection molding process, where (FIG. 7) the inner preform (blue) is injected into the hole in the outer pre-form (grey). By leaving a small protrusion of the inner pre-form on the outside of the outer pre-form, they become attached. FIG. 6A shows how hooks are used, to avoid turning of the inside layer when the bottle is blown and the device is placed or removed by turning.

Thus, in FIG. 7, middle image, there is seen a circular disk like protrusion of the blue inner pre-form at the center of the bottom. This disk like protrusion fastens the inner pre-form to the outer pre-form at the bottom. As noted above, this exemplary outer pre-form has a "pusher" or pressure release mechanism built into its bottom portion. This mechanism works once the pre-form is blown into a bottle.

In connection with FIG. 7 it is also noted that here the inside layer, for example of polypropylene, is used to form the neck of the bottle. Thus, it can be overmolded over the neck of the outer pre-form, and due to the greater shrinkage of the PP inner container as it cools after being blown, the inner container completely seals in a "shrink-wrap" effect, over and around the outer container. FIG. 7A shows details of the inside polypropylene layer. FIG. 7B highlights its novel geometry to obtain a tight sealed connection between the two layers. To get an air tight connection between inner and outer layers, the inner layer has to be over molded OVER the outer preform. For reasons of shrinkage, the inner layer after injection molding is not air tight with the outer layer. However, when the inner layer is OVER the outer layer as shown in FIG. 7B, it creates an air tight sealing between the two layers after blowing. As shown, for best results the inner layer not only covers a protruding ring of the outer layer, as shown in FIG. 7, but alternately, protrudes downward somewhat, making a ring that covers the outer layer for some distance below the upper terminus of the outer layer. Alternative possibilities for this connection can include ultra-sonic connection, glue connection, etc.

It is this same difference in shrinkage between the inner layer and the outer layer that allows another feature of a PET/PP—or similar mix of inner/outer container materials—for a Flair bottle. If, for example, a PET bottle is used with a PP or polyamide bag inside, then, after the pre-forms have been blown into an inner container and an outer container, and allowed to cool, both containers will shrink. However, the inner bag will shrink more, as noted. Therefore, a space develops between the outer PET bottle and, for example, a PP bag or inner container. Often it is desired to "hotfill" a given liquid into its bottle without having to let the liquid cool. Hot filling of, for example, juices or sauces, condiments, etc., involves filling of a container with liquids having temperatures of from about 80° C. to about 120° C. These high temperatures permit simultaneous filling and sanitizing of the interiors of the containers. Moreover, as soon as the liquid is produced in a hot state, it can be bottled and shipped, with no requirement of cooling areas or storing all of the bottles until the liquid cools and only then filling them, etc.

Such hot filling of a product in a PET bottle is impossible, for the reason that PET will deform at temperatures above approximately 60° C. However, other materials used for the inner layer, such as, for example, polypropylene and other polyolefins, or, for example, various polyamides, do not have this problem. They have deforming temperatures generally above 90° C., for example. Thus, such a product can be, for example, hot filled in an inner polypropylene bag made from a pre-form such as is shown in FIGS. 6-7, or as in FIG. 17. The air between the PET outer bottle and the PP inner bag in such a Flair type container serves as a thermal insulator, and thus the, for example, PP inner bag can be filled with hot juices, sauces, condiments, etc. up to approximately 90° C., without any damage to the outer container made of, for example, PET. In exemplary embodiments of the present invention, the exact maximum hot fill temperature will depends on the shrinkage difference between the two layers, and thus the thermal insulation provided by the air or other displacing medium between the two layers. In exemplary embodiments of the present invention, the material from which the inner container is made, and the degree of shrinkage it will experience relative to the outer container, and the concomitant hot fill maximum temperature it can thus support, can all be designed for a given application, use or range of uses, all by proper design and manufacture of the pre-forms.

Standard Flair 2C PET/PET Preforms—Outer Layer First

FIGS. 8-10 depict two stages in the manufacture of an exemplary pre-form made from the same material type, such as, for example, a PET/PET pre-form, according to exemplary embodiments of the present invention. The example pre-form shown here has a "bayonet" type neck (horizontal recesses provided in top portion of inner container to mate with "lugs" or horizontal protrusions of a dispensing head, or the reverse), but the process equally applies to any neck type. In FIG. 8 the outside layer is molded first, for example, from PET. Then, in FIG. 9, before the second layer, i.e., inner layer, is molded, especially because the two materials are the same (and thus tend to fuse at the same temperature), a non-stick coating can be provided on the inside surface of the outer perform. Such a non-stick coating can be sprayed, for example, offset, or can be provided using other techniques as may be available or desirable. FIGS. 8A and 9A show details of these performs, and depict the variant "push pin" type layer separation device of FIGS. 3A-3L. It is noted that if one has the same materials for the inner and outer layers of a preform, or has two materials with the same molding temperature, then it can be useful to mold an inner preform first. Advantage is that it is easier to precisely apply the ono-stick coating to the inner preform than to the outer preform.

Finally, as shown in FIG. 10, the inside layer, also of PET, can then be molded. Because there is a non-stick coating between the two layers, they can later be separated once a displacing medium is introduced between them. FIG. 10A shows details of the inner layer of such a PET/PET perform having the bottom structures of the type of FIGS. 3A-3L.

Standard Flair 2C PET/PET Preforms—Inner Layer First

FIGS. 11-14 depict two stages in the manufacture of a PET/PET pre-form according to alternate exemplary embodiments of the present invention. Here the inside layer is molded first, as shown in FIG. 11. Then, in FIG. 12, before the second, i.e., outer layer, is molded, a non-stick coating is sprayed or otherwise applied, affixed or provided on the outside surface of the inner perform. Finally, as shown in FIG. 13, the outside layer, also of PET, can be molded. However, here, because the inner layer was molded first, and it was not provided with an elongated protruding disk as in the earlier case of the PET/PP pre-form of FIGS. 6-7, a variant means of attaching the two performs together is needed. This is shown, for example, in FIG. 14.

FIG. 14 thus shows a two-step attachment process. First, in Step 1 (left image), a hole can be provided in the inner layer of the inner perform as it is molded. Then, in a Step 2 (right image), when the outer perform is molded, it is provided with a protrusion which protrudes upwards through the inner layer and into the cavity of the inner layer, and thus closes the hole in the inner pre-form and connects the two pre-forms together.

FIG. 15 depicts an exemplary pre-form with a bayonet neck finish according to exemplary embodiments of the present invention. Bayonet type closures use horizontal lugs mating with horizontal recesses, which facilitates turning the dispenser cap for removal. These are described more fully below, in connection with FIG. 27.

FIG. 16 depicts a 2C molded pre-form with the familiar pressure releasing device ("pusher") built into the outer layer, as described above in connection with FIG. 3. FIG. 17 depicts an exemplary PET/PP pre-form with a crimp neck finish according to exemplary embodiments of the present invention, and FIG. 18 depicts various views of an exemplary pre-from with a crimp neck, with an air valve and a dip tube according to exemplary embodiments of the present invention.

FIG. 19 depicts how an exemplary pre-form can be blown into various bottle types, with exemplary dimensions provided for illustration. Exemplary pre-forms according to exemplary embodiments of the present invention can be blown to various shapes and sizes of full-size bottles or containers. For example, the bottle bottom can be flat or round. In the illustrated example, a flat or "champagne" type bottle bottom has a width of 55 mm, a corner radius of curvature R4 of 4 mm, and the bottom of the bottle protrudes vertically 2 mm below the level of the base of the preform, as shown.

Piston Flair 2C PET/PET Preforms—Outer Layer First

FIGS. 20-22 depict an exemplary process for 2C molding a "Piston Flair" type PET/PET pre-form according to exemplary embodiments of the present invention. A Piston Flair system utilizes bonding between the inner and outer performs at the upper portion of the pre-form and thus the finished bottle. Thus, as the displacing medium enters between the layers, the inner layer is pushed up towards the dispensing head, and folds on itself so as to move upwards along the walls of the outer container, much like a piston. The Piston Flair system is described in U.S. Published Patent Application No. US 2011/0024450, the disclosure of which is hereby incorporated herein by reference. Thus, non-stick coating is only wanted for the bottom portion of a "Piston Flair" pre-form, inasmuch as the upper portion is desired to bond together so as to achieve this "folding on itself" piston effect.

In this example the outer pre-form is molded first, and a non-stick coating only applied on the bottom portion of the inner/outer interface. Then the inner pre-form is molded, with the end as result shown in FIG. 22, where a non-stick coating has been provided between the layers, but only on the bottom portion of the pre-form. As noted, if one has 2 of the same materials, or 2 materials with the same molding temperature, then it can be advantageous to mold the inner preform first. This has the advantage that it is easier to precisely deposit a coating on the outside of the inner preform than on the inside of an outer preform, as shown here.

Piston Flair 2C PET/PET Preforms—Inner Layer First

Thus, FIGS. 23-25 depict an alternate exemplary process for 2C molding a "Piston Flair Bayonet" type PET/PET pre-form according to exemplary embodiments of the present invention. Here the inner pre-form is molded first, as shown in FIG. 23, and then, as shown in FIG. 24, a non-stick coating is sprayed on the outside of the inner pre-form. The result, as shown in FIG. 25, is the same as the example of FIGS. 20-22, but the spraying of the non-stick coating on the outside of the inner pre-form is often preferred, inasmuch as it is easier to precisely deposit the non-stick coating on the outside of an inner pre-form than it is to deposit it on the inside of an outer pre-form, as shown in FIG. 21, due to the freedom of movement of the spraying device/robot in the former case.

Preform with One Way Valve

FIGS. 26A through 26H illustrate an exemplary preform with a one-way valve according to exemplary embodiments of the present invention. With reference to FIG. 26A, a cross section of the preform with valve attached is shown and the same figure is replicated in FIG. 26A(b) with an area of detail indicated—Detail A—which will be presented in the following figures. FIG. 26A(c) and (d) show side-views with the preform standing vertically and horizontally, so as to show the bottom. Similarly, FIG. 26A(e) shows a close-up bottom view with two lines A-A and B-B through which cross sections will be presented.

FIG. 26B is the magnification of the Detail A region indicated in FIG. 26A(b). It illustrates that to avoid refilling of the bottle after use it is possible to provide the preform with a one-way valve. Such a valve can be, for example, a loose plate of flexible plastic, such as, for example, an elastomeric disc, TP, or PE caught in a PET valve seat which can be connected to the preform for example by spin welding. FIGS. 26C through 26E illustrate the function of this one way valve. As seen with reference to FIG. 26C, when there is an under pressure in the bottle the two layers separate (being the inner container and outer container, corresponding to the inner and outer layers of the preforms, as described above) and air can flow in from the ambient air at the bottom through the one way valve to allow the Flair system to operate (displacement medium between two containers), as shown by the arrow at the bottom.

FIG. 26D shows what happens when the inverse occurs, i.e. when there is an overpressure in the bottle. Here the air between the layers tries to flow back out through the bottom (as shown by the arrow at the bottom) but the one way valve blocks the air flow. These principles can be used for a "Squeeze Flair" type of system, where a user squeezes on the outer container to dispense a liquid from the inner container, and as that occurs the underpressure between the containers sucks in air through the one way valve. However, the one way valve lets air in, but does not allow it to escape, thus maintaining the pressure on the inner container for dispensing. Additionally, as shown in FIG. 26E, such a one way valve provides an anti-refilling functionality. When the bottle is empty and a consumer tries to refill the bottle, for example, he finds it to be impossible to do inasmuch as when the inner container is refilled (form the top, for example) the air between the layers tries to flow back through the one way valve at the bottom but the one way valve blocks the air flow. Moreover, the central hole in the valve housing is so small that it is impossible to force the valve open by even a small pin. Even when pushing a small pin in the center, for example, the valve will block the flow of air outwards, unless a user actually punctures the disc, which renders the device unusable in any event. This makes it impossible to refill the bottle inasmuch as the pressure between the layers maintains the inner layer in a shrunken position, i.e. the one it had as it dispensed the last portion of the fluid or liquid that was in. Thus, try as they might, a consumer cannot refill the bottle. This necessitates purchasing a replacement bottle and of course generating a fee for the seller, as well as insuring quality control and preventing refilling and resale by unauthorized merchants.

FIG. 26F illustrates how a one way valve with a layer separation/release button, as described above in connection with FIG. 3, operates. When a layer separation/release button is used (such as when layer release is not accomplished with a coating), a one way valve cannot be connected to the preform prior to blowing the preform into the bottle, due to the protruding pin which is used in layer separation after blowing. Rather, the one-way valve has to be spin welded onto the bottle after the layers have been separated by an over-pressure, as described above and illustrated with reference to FIG. 3. Accordingly, with reference to FIG. 26G, after blowing the preform into a bottle the manufacturer must first push in the layer separation button (it has already performed its function) and then subsequently, as shown in FIG. 26H, attach the one-way valve to the now blown bottle by spin welding.

Exemplary Snap-on Neck

FIGS. 27A through 27C illustrate a 3-lug snap-on neck finish for the inner container of the exemplary preform according to exemplary embodiments of the present invention. The three lug bayonet finish allows a shroud to be fixed to the top of the inner container, which can have a dispensing head or a sprayer head, as the case may be. FIG. 27B similarly shows the view from a different angle of the three lug bayonet finish and FIG. 27C illustrates how the three lugs are not symmetric around the perimeter of the neck but rather are provided in asymmetric constellation. As shown in FIG. 27C, which is a top view of the snap-on neck finish of FIGS. 27A and 27B, it can be easily seen that there are two lugs having approximately 90 degrees between them and then each of them has approximately 135 degrees between their center and the center of the third lug which is shown at the far left of FIG. 27C. The 3-lug configuration of sprayer heads has been described in U.S. published patent application US 2010/0018999, under common assignment herewith.

In FIGS. 27A and B, a 3-lug bayonet/snap-on neck finish on the preforms and bottles is shown. The 3-lug version has only ONE position (orientation) which is correct, i.e., in which a cover or dispensing head can be fitted on it. It is noted that in combination with flat bottles, such as sprayers, with a defined front portion (nozzle) and a rear portion, this is often useful, as it is easy to properly orient a flat type bottle on a filling line so that this unique orientation is assumed prior to filling and attaching of the shroud. The ONE position is there for the reason that the 3 lugs are not equally spaced around the perimeter of the neck, as in (3×120°), but are rather spaced with 135°-90°-135° subtended angles, as noted in U.S. patent application Ser. No. 12/448,132, published as U.S. Patent Application Publication No. 2010/0018999, the disclosure of which is hereby fully incorporated herein by reference.

However, this can present a problem when using round bottles. In a filling line, for example, as well as after the consumer has done a refill action, the connection of the cap or device on the round bottle shroud is difficult for reason there is no easily identifiable orientation (round bottle). To avoid this problem a novel 4 lug bayonet/snap-on neck finish has been developed, as next described.

Four (4)—Lug Bayonet Neck and Snap-on Cap

In contrast to the three lug bayonet snap-on neck finish, FIGS. 27D through 27G depict a novel 4-lug bayonet snap-on neck finish according to exemplary embodiments of the present invention. FIG. 27D shows a front perspective view of such an exemplary bottle with such an exemplary four lug bayonet snap-on neck finish, and FIG. 27E illustrate different views of the same bottle, the left image looking head on into a lug with a lead-in structure and the right image showing a standard lug (vertical rib on right and horizontal bar connected to it). With reference to FIG. 27D, the 4-Lug version bottle finish has 4 bayonet/snap-on lugs. Two of the lugs are provided with lead-in and lead-out guidance ribs (this type of lug is shown in left image of FIG. 27E). In exemplary embodiments of the present invention, two out of four lugs being equipped with the lead-in and lead-out sloping structures are sufficiently functional, as well as appropriate for molding reasons, inasmuch as to make 4 lugs with lead-in/lead-out ribs is not possible with two slides in a mold. It would require four slides and increase complexity, but can be done, for example, if special reasons make it the best choice.

Moreover, also as shown in FIG. 27D, In the upper, for example, 4 mM of the bottle finish, no ribs are allowed; otherwise there would occur sink marks at the inner sealing surface, and in order to obtain a tight seal, a cap needs some vertical "lead in" space so that the top of the cover fits snugly on the top of the neck.

FIG. 27F shows a top view of the snap-on neck finish where it can easily be seen that there are four lugs provided symmetrically with 90 degrees between their centers around the parameter of the bottle neck. The lugs at the top and bottom of the figure have the lead-in and lead-out structures, and the ones at 3 and 9 o'clock (right and left) have just the plain lugs. Thus, one can exploit this symmetry and need not necessarily line up a dispensing head or a sprayer head or similar cap in any particular one orientation relative to the neck, as was required with the 3-lug system described above. FIG. 27G shows that a lead in for a snap-on hook and snap-on upper cap (no rotation, just pushing downwards) is also possible, where on an assembly line, for example you line the cover or cap up above the four lugs and simply push down, the hooks on the cover each gliding down the sloped lead-in to hook into the slot on the lug (under the horizontal bar), as opposed to using the lead-in to guide in a rotational sense and lock in the lugs that way. However, the bottle has to be lined up correctly for such a snap-on (no rotation) hook attachment method, which requires more precision and complexity.

FIGS. 27H and 27I illustrate an exemplary cap or cover arranged to mate with the 4 lugs on the bottle's neck, according to exemplary embodiments of the present invention. Such a cap has four identical bayonet type snap-on hooks to mate with the four lug bayonets of the neck, as shown in FIGS. 27D through 27G. With reference to FIG. 27H there is a side view of an exemplary snap-on cap and in each of these views is drawn a line through which a cross section will be presented. The cross section through line A-A shows that the cap has four identical bayonet snap-on hooks, and similarly, the cross section through line B-B illustrates what it looks like when a slice is cut between any two lugs, essentially bisecting the 90 degree angle between them. Similarly, FIG. 27I show perspective drawings of the four lug bayonet snap-on cap. FIG. 27J shows the principle of attaching the four lug bayonet cap of FIGS. 27H and I onto a Flair type bottle provided with a four lug bayonet neck finish, as described above. As can be seen with reference to FIG. 27J, which shows cut-away views of such an exemplary cap, the cap can be attached to the neck from any of four equivalent positions simply by making a vertical downwards and a radial movement. The vertical movement pushes the cap in line such that each of the hook bayonet snap-on hooks are set somewhere between two adjacent lugs and a twisting or radial movement locks each of them into its corresponding lug. The hooks attach under the vertical bar of each lug, after being guided downwards to the proper vertical level by the lead-in structures of the two embellished ribs. Because of the symmetry, as shown in FIG. 27F, there are actually four orientations with which a cap can be initially placed in assembly, all of which will result in the same result of the four lug bayonet cap being properly attached with each hook in the cap mated to a corresponding lug on the neck. FIGS. 27K, L and M are simply magnified views of each of the images in FIG. 27J for ease of inspection.

FIG. 27N illustrates an exemplary cap attaching to a neck. Here in FIG. 27N(a) a hook of the cap is guided leftwards by the underside of a lead-in structure, and in FIG. 27N(b) it has attached between the two vertical ribs of this embellished lug. FIG. 27O illustrates features of the "end rib" on each lug (left side of the lug in each figure) and the "anti back off rib" (right side of an embellished lug) on two of the lugs (the ones with the lead-in structures). The end rib prevents a cap from turning too far, and the anti back off rib creates a certain minimum amount of force needed to remove the cap. To remove the cap, i.e., rotate it the counter-clockwise direction, the hook has to push over and across the anti back off rib, which requires some force to accomplish. As can be seen, the end rib protrudes farther outward radially than the anti back off rib, and thus a user cannot turn further clockwise past this barrier. FIG. 27P, showing a cross section through two lugs and hooks (spaced 180 degrees apart) of a cap attached to a neck, illustrates the four lug bayonet cap principle as described above, showing the interlocking of the hooks of the cap with the lugs of the neck, nicely positioned under the horizontal bar of each lug. It is also noted that the depicted neck has the overmolded feature of inner container over outer container, as shown in FIG. 7B above. FIGS. 27Q, R and S illustrate further details of the snap-on principle. FIG. 27Q shows in its upper panel how if one lines up the cap, four identical positions are possible (between lugs at any relative orientation of cap and bottle neck). FIG. 27R shows how the vertically sloping horizontal portions of the lugs can be used as vertical lead-in structures for a pure snapping on attachment (no turning), but in this case one must line up the cap so that the four hooks are right over the 4-lugs. Finally, FIG. 28T illustrates an exemplary cap and bottle neck where snap-on has been completed. When a consumer removes the cap by turning it counter clockwise, the cap can be replaced according the bayonet principle, as illustrated above i.e., can be removed and replaced repeatedly.

FIG. 27U illustrates the case where the cap is desired to be irrevocably attached, so that a user may not remove it and refill the contents on his or her own. To create an non removable snap-on connection between bottle and device, the two anti-back-off ribs of the normal snap-on embodiment of FIGS. 27S and 27T (said anti back off ribs being provided on the two lugs with lead-in structures) have to be increased in diameter (i.e., in their radial outward protrusion), to equal the radial outward protrusion of the end ribs such that when the snap-on hook of the device is locked in place in between the ribs it is not possible to further turn the device the other way to remove it (one can never turn further clockwise to push past the end ribs; the non removable snap-on connection simply extends this feature to the anti back off rib as well).

Matching Pre-form Heating Profiles for Blowing

As noted above, in various exemplary embodiments of the present invention, a preform is often made using different materials for the inner container and the outer container. This presents a technical problem however, in that different materials, say, for example, PET and PP, have different optimal blowing temperature ranges for accomplishing that blowing. As described above, after being molded, a preform is then blown to its final shape to be used in a Flair type bottle. Thus, both the inner perform and the outer perform are blown together. In order to accomplish the blowing process such that both layers, inner and outer, blow out completely to their final shape, the blowing temperatures of both layers need to be closely matched.

FIG. 28 illustrate details of this process and the proper matching of the materials of an exemplary inner container and outer container. With reference to FIG. 28A, an exemplary perform is shown, rotating inside a heating oven so that it can be made ready to be blown into a bottle. The exemplary perform has an outer layer of Material 'A', PET for example, and an inner layer of Material 'B', polypropylene, for example. In general, each material type has its own optimal blowing temperature, which is a function of this plasticization and heat transfer profile. As shown in FIG. 28A, the heat for the inside layer has to come through the outside layer, inasmuch as the preform is placed inside a heating oven. Thus, as shown, heating elements 2810 are on the outside of the outer container. Thus, to get the optimal blowing temperature for the outside layer one can adjust the intensity of the heating elements and the speed of heat transfer of the heating oven, but this optimum adjustment for the outside layer does not in general give the optimum blowing temperature for the inside layer, especially when the inside layer is made of an other material type than the outside layer.

FIG. 28B illustrates the reason why it is so crucial to optimize the blowing temperatures of the inside and outside layers. FIG. 28B depicts a fully blown bottle, and a detail of the bottom corners, for an exemplary perform such as that shown in FIG. 7A, above. To blow the bottle in the given shape, both of the layers have to blow out completely. If the internal layer cannot completely stretch to the shape of the outer corner, the outer layer will also not reach its intended shape for the reason that the bottle is blown out from the inside. This phenomenon will happen if the temperature of the inner layer is too low. On the other hand, if the temperature of the inside layer is too high, then both layers can assume the desired shape, but the cycle time of the blowing process increases significantly. As a result, the inner layer has to be cooled down enough so that it does not pull back by reason of shrinkage. A temperature that is too high can also easily cause other blowing failures.

Finally, FIG. 28C depicts a comparison of ideal blowing temperatures for two exemplary materials used, respectively, as the outer layer and inner layer of a perform. Their respective plastification and heat transfer profiles are plotted with varying temperature. Here the outer layer is Material 'A', and the inner layer Material 'B'. As can be seen from the graph of FIG. 28C, Material A has a broader ideal temperature range for blowing, (even though it has a greater slope). Material B has a rather narrow ideal temperature range, and thus a correspondingly narrow interval during which it is within this range.

By using different colors and or additives in the outer and/or inner layer, it is possible to get the optimal plastification profiles, for blowing an exemplary preform assembly that is made out of two different materials. For example, adding a black or brown pigment to Material 'B' and a white one to Material 'A' will cause less heat absorption by the latter, and more by the former. Other additives can also affect the plastification temperature ranges and the heat transfer properties. This can also be done, alternatively, by using a coating between the two layers, via surface treatment by nanotechnology, and/or by change the molecular structure using nanotechnology. FIG. 28D depicts such a modification, where Material 'B' has now been changed so that its plastification region (and thus its optimal range of blowing temperatures) now lies within the plastification region (and thus optimal range of blowing temperatures) of Material 'A.'

For example, PET has a higher plastification temperature than PP and other polyolefins. Thus, for blowing a preform made out of a PET outer layer and a PP (polypropylene) inner layer, there can be a significant mismatch. By adding a black or brown color tot he PP and a white color to the PET, given that brow/black absorbs approximately 70% more heat than white, one can broaden and raise the temperature range of PP, and lower that of PET, such that there will be a temperature interval, as shown in FIG. 28D, within which both layers can optimally be blown. Of course, one wants to set the blowing temperature at the center of the available temperature interval, so that given a Gaussian distribution curve, for example, or preforms and/or areas within them, as many preforms as possible will lie fully within the range, and blowing will be successful.

Thus, in exemplary embodiments of the present invention, in order to get a wide process window during the blowing process the plastification curves of the preform layers which can be made out of different materials, can be changed. Once such change is effected, a multi-layer preform can be blown as if it were composed of one material.

It is further noted than in various exemplary embodiments, there can be three or even more layers to a preform. In such case, all three layers, or all N, for an N layer preform, need to be adjusted such that there is a range of blowing temperatures which is common to all three, or all N, as the case may be, materials that comprise the various layers.

The above-presented description and figures are intended by way of example only and neither are intended to limit the present invention in any way except as set forth in the following claims. It is particularly noted that persons skilled in the art can readily combine the various technical aspects of the various exemplary embodiments described.

What is claimed is:
1. A pre-form for a liquid dispensing device, comprising:
an inner layer; and
an outer layer,
the inner layer connected to the outer layer at a top portion of the pre-form;
the inner layer connected to the outer layer at a bottom portion of the pre-form,
the inner layer comprising a protrusion that extends through an opening in a bottom surface of the outer layer through the entire thickness of the outer layer at a position of the opening and beyond the bottom surface of the outer layer, the protrusion flattened so as to provide a connection between the inner layer and the outer layer, the connection being not air tight, the flattened portion of the protrusion having a larger diameter than any diameter of the opening,
wherein the outer layer includes an air inlet or ventilation hole in its bottom portion, and
wherein the outer layer is provided with an integrally molded pusher protruding from its bottom surface, adjacent to the air inlet, to push up against the outer surface of the inner layer when pressure is applied to a distal end of the pusher by a user, to separate the inner layer from the outer layer.
2. The pre-form of claim 1, wherein the inner layer and the outer layer are formed of the same material.
3. The pre-from of claim 1, wherein one of:
both the inner and outer layers are made of PET;
the inner layer is made of PET and the outer layer is made of a polyolefin; or
the inner layer is made of a polyolefin and the outer layer is made of PET.
4. The pre-form of claim 1, wherein the inner layer and the outer layer are made by bi-injection molding.
5. The pre-form of claim 4,
wherein the two layers are of the same material, or of different materials but have molding temperatures that are close enough such that the two layers would at least in part bond during molding, and
wherein a non-stick coating is applied to at least a portion of a first layer to be molded prior to molding the other layer.
6. The pre-form of claim 5, wherein the outer layer is molded first and wherein the non-stick coating is applied to the inside of the outer layer.
7. The pre-form of claim 5, wherein the non-stick coating is only applied to a lower portion of the first layer to be molded.
8. The pre-form of claim 4, wherein the inner layer and the outer layer are joined at the neck and at the bottom at the completion of the bi-injection molding process.
9. The pre-form of claim 4, wherein the outer layer is molded first, a hole is left in the center of the bottom of the outer layer, and the inner layer is molded by injection into said hole.
10. The pre-form of claim 4, wherein at least one of:
the inner layer is made from one of a polyolefin and a polyamide;
the inner layer is arranged to shrink relative to the outer layer;
the inner layer is molded first, a hole is left in the bottom of the inner layer, and the outer layer is overmolded onto the inner layer; or
the inner layer is molded first, a hole is left in the bottom of the inner layer, the outer layer is overmolded onto the inner layer, and the hole in the bottom of the inner layer is filled by a vertical protrusion from the inside bottom of the outer layer, thus joining the two layers.
11. The pre-form of claim 1, wherein the inner layer and the outer layer are formed of different materials.
12. The pre-form of claim 1, blown so as to create an outward protruding dimple in the bottom portion of the outer layer, to facilitate separation of the inner layer from the outer layer after blowing.
13. The pre-form of claim 4, blown so as to create an outward protruding dimple in the bottom portion of the outer layer, to facilitate separation of the inner layer from the outer layer after blowing.
14. The pre-form of claim 5, wherein the inner layer is molded first and wherein the non-stick coating is applied to the outside of the inner layer.
15. The pre-from of claim 1, wherein one of:
both the inner and the outer layers are made of PET;

one layer is made of PET and the other layer is made of a polyolefin; or the inner layer is made of a polyolefin and the outer layer is made of PET.

16. The pre-form of claim 1, wherein the inner layer and the outer layer are made by bi-injection molding.

17. The pre-form of claim 16, wherein the two layers are of the same material, or have molding temperatures that are close enough such that they would bond, at least in part, during molding, and wherein a non-stick coating is applied to at least a portion of a first layer to be molded prior to molding the other layer.

18. A pre-form for a liquid dispensing device, comprising:
an inner layer and an outer layer;
the inner layer having a connection to the outer layer at each of a top portion of the pre-form and a bottom portion of the pre-form;
the inner layer comprising a protrusion that extends through an opening in a bottom surface of the outer layer through the entire thickness of the outer layer at a position of the opening and beyond the bottom surface of the outer layer, the protrusion flattened so as to provide a connection between the inner layer and the outer layer, the connection being not air tight, the flattened portion of the protrusion having a larger diameter than any diameter of the opening.

19. The pre-form of claim 18, wherein the outer layer includes an air inlet or ventilation hole in its bottom portion, and wherein the outer layer is provided with an integrally molded pusher protruding from its bottom surface, adjacent to the air inlet, to push up against the outer surface of the inner layer when pressure is applied to a distal end of the pusher by a user, to separate the inner layer from the outer layer.

* * * * *